United States Patent

Miyoshi et al.

Patent Number: 5,944,007
Date of Patent: Aug. 31, 1999

[54] WIRE TYPE SLICING MACHINE AND METHOD

[75] Inventors: Kotaro Miyoshi; Toshiyuki Suzuki; Koyoshi Takahashi; Yasuharu Goto; Akihiro Chiba, all of Kitakami; Sizuo Wada, Tokyo, all of Japan

[73] Assignee: Tokyo Rope Mfg. Co., Ltd., Tokyo, Japan

[21] Appl. No.: 08/952,146

[22] PCT Filed: Feb. 28, 1997

[86] PCT No.: PCT/JP97/00622

§ 371 Date: Oct. 28, 1997

§ 102(e) Date: Oct. 28, 1997

[87] PCT Pub. No.: WO97/31765

PCT Pub. Date: Sep. 4, 1997

[30] Foreign Application Priority Data

| Feb. 8, 1996 | [JP] | Japan | 8-45668 |
| Feb. 8, 1996 | [JP] | Japan | 8-45669 |
| Feb. 28, 1996 | [JP] | Japan | 8-091699 |
| Sep. 30, 1996 | [JP] | Japan | 8-276932 |

[51] Int. Cl.⁶ .................................................. B28D 1/02
[52] U.S. Cl. .................................. 125/13.01; 125/13.02; 125/16.02; 125/21; 83/821
[58] Field of Search .......................... 125/13.01, 13.02, 125/21, 16.02, 16.01; 83/821–829, 762, 763, 651.1

[56] References Cited

U.S. PATENT DOCUMENTS

| 4,848,200 | 7/1989 | McGehee | 83/821 |
| 5,099,820 | 3/1992 | Stricot | 125/16.02 |
| 5,201,305 | 4/1993 | Takeuchi | 125/16.02 |
| 5,628,301 | 5/1997 | Katamachi | 125/16.02 |

FOREIGN PATENT DOCUMENTS

| 2-232156 | of 0000 | Japan . |
| 2-48163 | of 0000 | Japan . |
| 54-163491 | of 0000 | Japan . |
| 60-12665 | of 0000 | Japan . |
| 61-100414 | of 0000 | Japan . |
| 61-117060 | of 0000 | Japan . |
| 7-178660 | of 0000 | Japan . |
| 7-205017 | of 0000 | Japan . |
| 7-205141 | of 0000 | Japan . |
| 7-304029 | of 0000 | Japan . |
| 7-314436 | of 0000 | Japan . |
| 9-29734 | of 0000 | Japan . |
| 9-94755 | of 0000 | Japan . |

OTHER PUBLICATIONS

Microfilm of Japanese Utility Model Application No. 131184/1976.

*Primary Examiner*—Robert A. Rose
*Assistant Examiner*—George Nguyen
*Attorney, Agent, or Firm*—Morrison & Foerster LLP

[57] ABSTRACT

Two grooved rolls 11 and 12 among three grooved rolls 11~13 engaged by a saw wire 14 are arranged one above the other and the saw wire 14 is made to travel vertically between the grooved rolls 11 and 12. A workpiece 9 is moved horizontally and pushed against the vertically traveling wire 14. It is preferred that the grooved roll 13 be disposed at a height approximately the same as that of the lower grooved roll 12.

34 Claims, 45 Drawing Sheets

WIRE TYPE SLICING MACHINE AND METHOD

TECHNICAL FIELD

This invention relates to a wire-type slicing machine and method suitable for cutting a so-called brittle material such as a semiconductor material, magnetic material or ceramic into wafer-shaped slices.

PRIOR ART AND PROBLEMS THEREOF

As shown in FIGS. 50 and 51, a wire-type slicing machine, which is also referred to as a wire saw, has three grooved rolls 601, 602 and 603 arranged in parallel to one another at positions which correspond to the vertices of a triangle having a shape near that of a regular triangle. A cutting wire 604 is engaged with the grooves of the grooved rolls 601~603 under tension such that the turns of the wire lie parallel and at regular intervals. While the wire 604 is being made to travel in one direction and a working fluid which contains an abrasive (grain) is blown from a nozzle (not shown), a workpiece 600 is pushed against the horizontally traveling wire 604 and is cut crosswise into slices.

In FIG. 50 the workpiece 600 is held below the grooved rolls 603 and 602. The workpiece 600 is sliced by being pushed upward toward the wire 604 traveling horizontally between the grooved rolls 603 and 602. In FIG. 51 the workpiece 600 is held above the grooved rolls 602 and 603. The workpiece 600 is sliced by being pushed downward toward the wire 604 traveling horizontally between the grooved rolls 602 and 603.

An increase in semiconductor wafer diameter is desired in order to improve productivity especially in the semiconductor industry. A large-diameter semiconductor crystal rod (workpiece) is prepared in order to manufacture a large-diameter wafer. It goes without saying that the wire-type slicing machine also is increased in size in order to slice a large-diameter rod.

In a machine for slicing a workpiece while the workpiece is moved up or down, as shown in FIGS. 50 and 51, an increase in the diameter of the workpiece inevitably results in an apparatus having a large height. When the apparatus is made large in height, the frame, etc. is required to have a high rigidity so that a high accuracy is maintained. There is also a decline in operability, such as the handling of the cutting wire and the mounting and unmounting of the workpiece. Furthermore, the working fluid containing the abrasive accumulates and solidifies in grooves cut in the workpiece in the apparatus having the configuration shown in FIG. 50, as a result of which slicing efficiency declines. Another problem is that in the apparatus having the configuration shown in FIG. 51, the working fluid trickles down and does not readily penetrate to the cut surface.

DISCLOSURE OF THE INVENTION

An object of the present invention is to provide a wire-type slicing machine and method in which the height of the machine can be reduced.

Another object of the present invention is to provide a wire-type slicing machine and method in which operability is improved.

A further object of the present invention is to provide a wire-type slicing machine and method as well as a grooved roll unit through which maintenance is facilitated.

A further object of the present invention is to prevent or reduce deflection of a cutting wire which travels between two grooved rolls.

A further object of the present invention is to so arrange it that the tension of the cutting wire can be adjusted continuously.

A further object of the present invention is to lighten the weight of a bobbin which takes up the cutting wire.

A further object of the present invention is to stabilize the travel of the cutting wire in a mechanism, such as a dancer mechanism or capstan mechanism, which includes a plurality of rolls, wherein the cutting wire is engaged with the rolls a plurality of times.

A further object of the present invention is to provide a workpiece holder in which the angular position of a workpiece is capable of being adjusted stably in two directions.

A further object of the present invention is to provide a winding direction sensor capable of automatically sensing the winding direction of a wire wound upon a bobbin.

A further object of the present invention is to make possible stable traverse control on the take-up side of the cutting wire.

A wire-type slicing machine according to the present invention, in which a workpiece is sliced by engaging a cutting wire with a plurality of grooved rolls arranged in parallel, causing the cutting wire to travel by rotatively driving at least one of the grooved rolls and supplying a working fluid containing an abrasive, is characterized in that at least two of the grooved rolls among the plurality thereof are arranged one above the other in such a manner that the cutting wire travels substantially vertically between these grooved rolls, and a workpiece feeding apparatus is provided for advancing and withdrawing the workpiece substantially horizontally toward and away from the cutting wire which travels substantially vertically.

A wire-type slicing method according to the present invention in which a workpiece is sliced by engaging a cutting wire with a plurality of grooved rolls arranged in parallel, causing the cutting wire to travel by rotatively driving at least one of the grooved rolls and supplying a working fluid containing an abrasive, is characterized by arranging at least two of the grooved rolls among the plurality thereof one above the other whereby the cutting wire is made to travel substantially vertically between these grooved rolls, and advancing and withdrawing the workpiece substantially horizontally toward and away from the cutting wire which travels substantially vertically.

In this specification, "substantially vertical" covers an inclination of up to ±450° with respect to the vertical, and "substantially horizontal" covers an inclination of up to ±45° with respect to the horizontal. Further, "roll" covers rollers and all other rotating means.

In accordance with the present invention, a cutting wire is made to travel substantially vertically and a workpiece is sliced by this wire traveling substantially vertically. The workpiece is pushed against the substantially vertically traveling wire while the workpiece is being moved substantially horizontally. Accordingly, the height of the machine can be reduced in comparison with the conventional machine which moves the workpiece upward or downward. As a result, operability such as wire handling and mounting/unmounting of the workpiece is improved. Since the working fluid containing the abrasive supplied to the location of contact between the workpiece and the cutting wire, namely to the cutting location, drips down along the cut surface of the workpiece, the working fluid is allowed to penetrate satisfactorily and the working fluid does not clog the grooves.

In an embodiment of the present invention, a third grooved roll is provided in addition to the two grooved rolls arranged one above the other, and the third grooved roll is placed at a height substantially the same as that of the lower of the two grooved rolls. More specifically, the three grooved rolls are disposed at positions which substantially correspond to the vertices of a right triangle having vertical and horizontal sides. The cutting wire travels substantially horizontally between the two grooved rolls situated at the lower side.

While the workpiece is being moved substantially horizontally, it is sliced by the cutting wire traveling substantially vertically, as described above. As a result, the workpiece penetrates the interior of the right triangle as cutting proceeds. Cutting scraps produced when the workpiece is sliced drop downward. Since the two grooved rolls situated at the lower side are arranged at substantially the same height in spaced-part relation, a receptacle for the cutting scraps can be provided between these grooved rolls and it is possible for the cutting scraps to be easily removed from between the two grooved rolls.

There are a variety of methods of driving the plurality of grooved rolls, as will be described in detail in embodiments set forth later. In the embodiment in which the three grooved rolls are placed at positions substantially corresponding to the vertices of a right triangle, it is preferred that an arrangement be adopted in which the third grooved roll is adopted as a driving roll driven by a motor and the rotating power of this driving roll is transmitted to the two grooved rolls via a power transmission mechanism. The driving motor can be placed below.

The power transmission mechanism is constituted by e.g. belt wheels provided in correspondence with respective ones of the two grooved rolls, arranged one above the other, and the third grooved roll, and a belt engaged with these belt wheels.

The third grooved roll is the driving roll. The cutting wire engaged with the two grooved rolls that are arranged one above the other and with the third grooved roll, as well as the belt engaged with the belt wheels corresponding to these grooved rolls, changes direction at the location of the third grooved roll so as to form an acute angle. Accordingly, the length of the cutting wire that is in contact with the grooves in the circumferential surface of the third grooved roll and the length of the belt that is in contact with the circumferential surface of the belt wheel corresponding to the third grooved roll are comparatively long. This means that the driving force of the third grooved roll is transmitted to the cutting wire and belt effectively.

The above-described power transmission mechanism preferably includes two couplings the torques of which are capable of being controlled. The torque-controllable couplings are provided between the shafts of the two upper and lower grooved rolls and the belt wheels provided in correspondence with these grooved rolls. The belt wheel provided in correspondence with the third grooved roll is secured to the shaft of the third grooved roll.

Such a drive system is as follows when expressed from a different standpoint. Specifically, the drive system of the grooved rolls is constituted by a motor for rotatively driving the third grooved roll, a power transmission mechanism, which has output shafts corresponding to the above-mentioned two grooved rolls, for transmitting the rotating power of the motor to the output shafts, and torque-controllable couplings provided between the shafts of the above-mentioned two grooved rolls and the output shafts corresponding thereto.

Such a drive system has the following features: Specifically, there is almost no slip between the cutting wire and the grooved rolls because all of the grooved rolls are rotatively driven. Since almost no slip occurs, there is little grooved roll wear and the degree of wear among the plurality of grooved rolls is equalized. Furthermore, even if there is some disparity among the diameters of the grooved rolls, the transmitted torque in the couplings can be adjusted in such a manner that the rotational friction that acts upon the above-mentioned two grooved rolls becomes zero or substantially zero. As a result, error in the perimeters of the plurality of grooved rolls is allowable.

Further, it is preferred that the two upper and lower grooved rolls and the third grooved roll be freely rotatably supported on a frame and that the frame be freely removably attached to a base of the wire-type slicing machine. The frame and the three grooved rolls supported on it construct a grooved roll unit.

By arranging the plurality of grooved rolls as a unit and arranging it so that the unit may be freely attached to and detached from the base makes it possible to detach the grooved roll unit from the base in maintenance so that the unit can be carried away from the slicing machine. Since the grooved roll unit can be placed in a large area, operation such as replacement of the grooved rolls and repair of the surface grooves of the grooved rolls is facilitated.

In an arrangement wherein the grooved rolls are thus constructed as a unit, an output shaft of a drive device of the machine and the shaft of at least one of the grooved rolls are coupled by a freely attachable and detachable shaft coupling when the grooved roll unit is mounted on the base.

Furthermore, in a preferred embodiment, annular resilient seals are provided on the frame so as to surround the shafts of the grooved rolls that project from the frame. When the grooved roll unit has been attached to the base, the annular resilient seals contact the peripheries of holes provided in a partitioning wall of the frame and through which the shafts are passed. The partitioning wall partitions the side of the drive unit from a cutting chamber in which the grooved rolls are disposed. The working fluid containing the abrasive is blown toward the wire, as set forth above, within the cutting chamber. Cutting scraps are produced. The presence of the annular seals prevents such foreign matter from finding its way into the compartment in which the drive unit is provided.

In a preferred embodiment, a wire delivery mechanism which feeds the cutting wire into the grooved rolls and a wire take-up mechanism which takes up the cutting wire from the grooved rolls are both disposed on one side of the grooved rolls.

The length of the machine can be shortened in comparison with an arrangement in which the wire delivery mechanism and wire take-up mechanism are disposed on both sides of the grooved rolls.

An arrangement according to the present invention capable of preventing or reducing deflection of the cutting wire that travels between two grooved rolls resides in a wire-type slicing machine in which a workpiece is sliced by engaging a cutting wire with at least two grooved rolls arranged in parallel and causing the cutting wire to travel by rotatively driving at least one of the grooved rolls and supplying a working fluid containing an abrasive, characterized in that a wire guide is provided in close proximity to at least one of the grooved rolls and is formed, or is capable of being formed, to have a groove through which the cutting wire is passed. (The groove may be formed by the traveling wire.)

The two grooved rolls may be placed one above the other, as in the above-described wire-type slicing machine, or side by side. That is, the wire guide is capable of being applied to a wire-type slicing machine of the type in which the cutting wire travels vertically or to a wire-type slicing machine of the conventional type in which the cutting wire travels horizontally.

Slicing accuracy can be raised because deflection of the cutting wire that travels between the two grooved rolls can be prevented or reduced owing to the presence of the wire guide. Further, the working fluid containing the abrasive and the cutting scraps are prevented from attaching themselves to the grooved rolls, thus making it possible to prolong the life of the grooved rolls.

The wire guide preferably is provided on both sides of the path along which the workpiece is transported. In order to prevent the working fluid and cutting scraps from attaching themselves to the grooved rolls, the wire guide is placed at a position between the workpiece transport path and at least one grooved roll, this position lying along the traveling direction of the cutting wire upstream relative to the workpiece transport path.

An arrangement according to the present invention capable of adjusting the tension of the cutting wire automatically is as follows:

Specifically, a wire-type slicing machine having a grooved roll group which includes a plurality of grooved rolls arranged in parallel and engaged by a cutting wire, a wire delivery mechanism for supplying the cutting wire to the grooved roll group, and a wire take-up mechanism for taking up the cutting wire from the grooved roll group is characterized in that at least one of the wire delivery mechanism and wire take-up mechanism is provided with a dancer mechanism for adjusting the tension of the cutting wire, the dancer mechanism includes a freely rotatable stationary roll and a movable roll free to move up and down, the cutting wire extends between and is engaged with both of these rolls and the movable roll is supported by a continuously positionally adjustable mechanism.

A mechanism which includes an air cylinder is one example of the continuously positionally adjustable mechanism. The air cylinder is controlled based upon a detection signal from a tension sensor, which is provided at the location where tension is to be adjusted.

In accordance with this arrangement, the tension of the cutting wire is capable of being adjusted at will, and not in stepwise, even while the cutting wire is traveling.

An arrangement according to the present invention capable of reducing the weight of a bobbin which takes up the cutting wire is as follows:

Specifically, a wire-type slicing machine having a grooved roll group which includes a plurality of grooved rolls arranged in parallel and engaged by a cutting wire, a wire delivery mechanism for supplying the cutting wire to the grooved roll group, and a wire take-up mechanism which includes a bobbin for taking up the cutting wire from the grooved roll group is characterized in that, of the wire delivery mechanism and wire take-up mechanism, only the wire take-up mechanism is provided with a capstan mechanism, and the wire tension on the side of the take-up bobbin is adjusted by the capstan mechanism so as to be less than the wire tension on the side of the grooved roll group.

The tension on the side of the grooved roll group can be set to a value suited to the slicing of the workpiece, and the tension on the take-up side can be set to a value smaller than the aforesaid value. Since tension on the take-up side is comparatively small, the take-up bobbin need not be particularly rigit and can therefore be reduced in weight and lowered in cost.

In the wire-type slicing machine, which has a cutting wire capable of traveling back and forth, there are provided a device for driving at least one of the above-mentioned two rolls in a direction in which the cutting wire is pulled from the grooved roll group toward the wire take-up mechanism at forward travel in which the cutting wire is fed from the wire delivery mechanism to the wire take-up mechanism via the grooved roll group, and a device for braking rotation of at least one of the above-mentioned two rolls at travel which is the reverse of forward travel.

In a case where the drive device is a motor, the motor will act as a braking device when the cutting wire travels in the reverse direction if the motor is made to rotate in one direction at all times. The result is a simple arrangement.

In a tension adjusting mechanism which includes two rolls with which a cutting wire is engaged a plurality of times, a structure according to the present invention capable of stabilizing travel of the wire is such that a shaft of either of the rolls is skewed with respect to a shaft of the other roll in such a manner that the turns of the cutting wire engaged with the two rolls are rendered parallel.

A dancer mechanism and a capstan mechanism are examples of the tension adjusting mechanism.

In accordance with the present invention, wire tension is stabilized and a high-speed operation is possible because the wire travels correctly in the grooves of the rolls. In addition, the wear of the rolls is reduced and the life thereof prolonged.

A workpiece holder according to the present invention capable of adjusting the angle of the workpiece in two directions includes a supporting body, a first rotary body and a second rotary body, the supporting body has a portion for supporting the first rotary body so as to be free to rotate about a first axis, the first rotary body has a portion for supporting the second rotary body so as to be free to rotate about a second axis perpendicular to the first axis, and the second rotary body has a portion for supporting the workpiece.

The workpiece is held on the second rotary body and the second rotary body is capable of rotating about the second axis. The first rotary body is capable of rotating about the first axis, which is perpendicular to the second axis. Accordingly, the workpiece can be rotated through any angle about the two axes and the angle can be adjusted in two directions. Further, a high rigidity can be maintained because each rotary body is provided so as to be rotatable in one direction. In particular, a rigid structure is obtained by adopting an arrangement in which the first and second axes intersect perpendicularly.

An apparatus according to the present invention for automatically sensing winding direction of a wire wound upon a bobbin has a pad member provided on a distal end portion of a movable body included in a traverse mechanism and capable of being moved parallel to a shaft of the bobbin, a supporting body held on the pad member so as to be free to slide axially of a delivery bobbin, a traverse sheave freely rotatably provided on the supporting body by a shaft lying parallel to the shaft of the delivery bobbin, and a sensor provided between the pad member and the supporting body for sensing a component force in the axial direction of the delivery bobbin that acts upon a cutting wire delivered from the delivery bobbin and engaged with the traverse sheave.

When the wire that has been wound upon the bobbin is paid out, the wire paid out becomes skewed depending upon the winding direction of the wire and, hence, a component force acts in the axial direction of the bobbin. The winding direction of the wire can be detected by sensing the direction of the component force. Since the winding direction of the wire can be detected automatically, it is possible to automate traverse control in the delivery of the wire.

A traverse mechanism according to the present invention capable of performing stable traverse control on the take-up side of a cutting wire includes a movable body to move in parallel with the shaft of a wire take-up bobbin, a traverse sheave provided on a distal end portion of the movable body, and a motor for driving movement of the movable body, wherein the motor is a servomotor and is controlled in accordance with a predetermined traverse traveling speed and amount of movement.

The servomotor is capable of being controlled in accordance with a predetermined traverse traveling speed and amount of movement. A sensor for sensing the position of the end of the bobbin is not required owing to control of the traverse direction (i.e. owing to a changeover in direction). Overrun or the like produced when control is performed using this sensor is eliminated. The range of speed control is widened and a finer winding pitch can be realized as well.

BRIEF DESCRIPTION OF THE DRAWINGS

FIGS. 1 through 8 illustrate a first embodiment of the present invention, in which:

FIG. 1 schematically illustrates the overall construction of a wire-type slicing machine;

FIG. 2 is a perspective view showing, in enlarged form, a group of grooved rolls in the wire-type slicing machine;

FIG. 3 is a perspective view showing, in enlarged form, the construction of saw wire delivery and take-up mechanisms in the wire-type slicing machine;

FIG. 4 is a perspective view showing a third driving scheme of grooved rolls;

FIG. 5 is a circuit diagram showing a motor drive circuit;

FIG. 6 is a circuit diagram showing another example of a motor drive circuit;

FIG. 7 is a perspective view showing a fourth driving scheme of grooved rolls; and FIG. 8 schematically illustrates a grooved roll drive unit;

FIGS. 9 through 49 illustrate a second embodiment of the present invention, in which:

FIG. 9 is a perspective view showing, in enlarged form, a group of grooved rolls in a wire-type slicing machine;

FIG. 10 schematically illustrates the overall arrangement and part of a control system of the wire-type slicing machine;

FIGS. 11 through 15 illustrate a grooved roll unit and a drive system thereof, in which;

FIG. 11 is a front view showing, in partially broken away form, the grooved roll unit and the drive system thereof;

FIG. 12 is a side view of the grooved roll unit, in which part of the unit is broken away;

FIG. 13 is a front view showing the overall drive system;

FIG. 14 is a longitudinal sectional view showing, in enlarged form, a portion of the drive system; and FIG. 15 is a side view of part of the grooved roll unit and shows, in partially broken away form, the circumstances when a workpiece is being sliced;

FIGS. 16 and 17 illustrate a workpiece feeding apparatus, in which FIG. 16 is a side view showing the apparatus in partially broken away form and FIG. 17 is a back view;

FIGS. 18 through 28 illustrate the details of a workpiece holder, in which;

FIG. 18 is a plan view showing the workpiece holder in partially broken away form;

FIG. 19 is a sectional view taken along line XIX—XIX of FIG. 18;

FIG. 20 is a sectional view taken along line XX—XX of FIG. 18;

FIG. 21 is a side view showing the workpiece holder in partially broken away form;

FIGS. 22 through FIG. 24 illustrate a workpiece holding member, in which FIG. 22 is a plan view, FIG. 23 a front view and FIG. 24 a bottom view;

FIGS. 25 through 27 illustrate a tightening piece, in which FIG. 25 is a plan view, FIG. 26 a side view and FIG. 27 a front view;

FIG. 28 is a front view showing a state in which the tightening piece has been attached to the workpiece holding member;

FIGS. 29 through 35 illustrates a capstan mechanism, a dancer mechanism on a take-up side and a tension sensing device included in a saw wire take-up mechanism, in which:

FIG. 29 is a front view of the capstan mechanism, dancer mechanism on the take-up side and sheaves;

FIG. 30 is a sectional view taken along line XXX—XXX of FIG. 29;

FIG. 31 is a sectional view taken along line XXXI—XXXI of FIG. 29;

FIG. 32 is a sectional view taken along line XXXII—XXXII of FIG. 29;

FIG. 33 is a sectional view taken along line XXXIII—XXXIII of FIG. 29;

FIG. 34 is a sectional view taken along line XXXIV—XXXIV of FIG. 29; and FIG. 35 is a sectional view taken along line XXXV—XXXV of FIG. 29;

FIGS. 36 through 39 illustrate a dancer mechanism and a length measuring unit, on a delivery side, included in a saw wire delivery mechanism, in which:

FIG. 36 is a front view of the dancer mechanism and length measuring unit on the delivery side;

FIG. 37 is a sectional view taken along line XXXVII—XXXVII of FIG. 36;

FIG. 38 is a back view of the length measuring unit; and

FIG. 39 is a sectional view taken along line XXXIX—XXXIX of FIG. 36;

FIG. 40 is a front view of a traverse mechanism on the delivery side and a traverse mechanism on the take-up side;

FIGS. 41 through 44 illustrate the traverse mechanism on the delivery side, in which:

FIG. 41 is a sectional view taken along line XXXXI—XXXXI of FIG. 40;

FIG. 42 is a sectional view taken along line XXXXI-I–XXXXII of FIG. 40;

FIG. 43 is a sectional view taken along line XXXXII-I–XXXXIII of FIG. 41 or FIG. 42; and FIG. 44 is an enlarged perspective view illustrating a linkage mechanism and a drive mechanism of a movable shaft;

FIG. 45 illustrates a traverse traveling speed pattern for describing traverse control on the take-up side;

FIG. 46 illustrates the principle of winding direction detection;

FIGS. 47 through 49 illustrate a winding direction sensing unit, in which:

FIG. 47 is a longitudinal sectional view of the winding direction sensing unit;

FIG. 48 is a sectional view taken along line XXXXVIII—XXXXVIII of FIG. 47; and

FIG. 49 is a sectional view taken along line XXXXIX—XXXXIX of FIG. 47; and

DESCRIPTION OF THE PREFERRED EMBODIMENTS

[First Embodiment]

Figure 1:
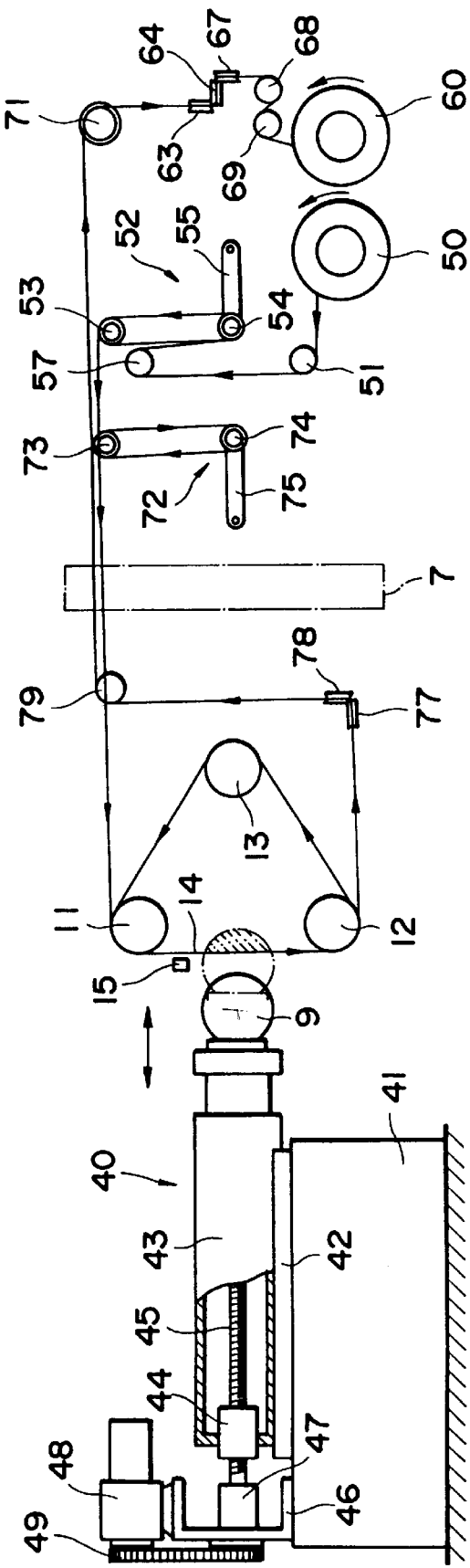

FIG. 1 schematically illustrates the overall construction of a wire-type slicing machine (wire saw). A group of grooved rolls (or rollers) in the wire-type slicing machine is shown in enlarged form in FIG. 2, and the construction of wire delivery and take-up mechanisms is shown in enlarged form in FIG. 3.

Figure 2:
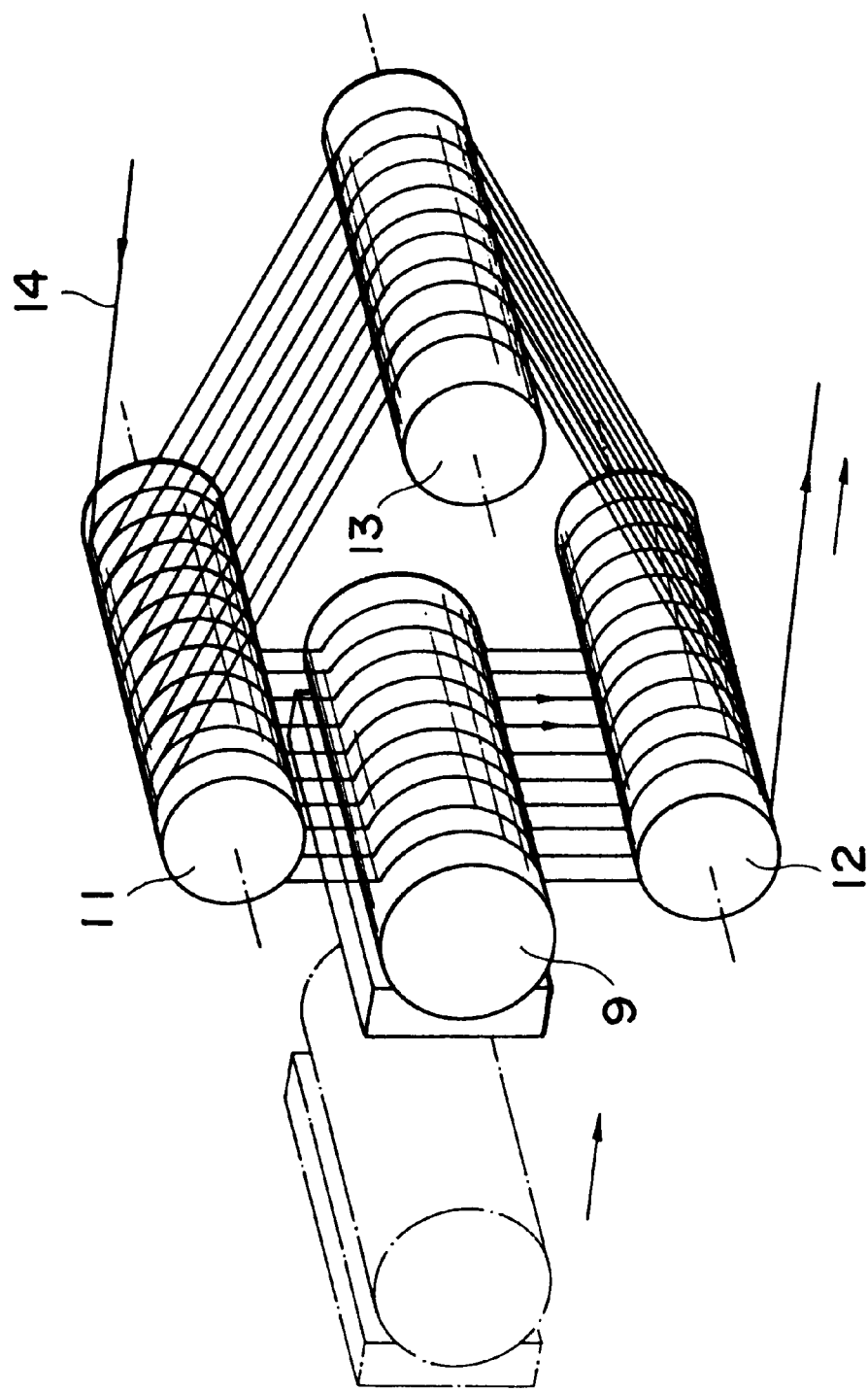
Figure 3:
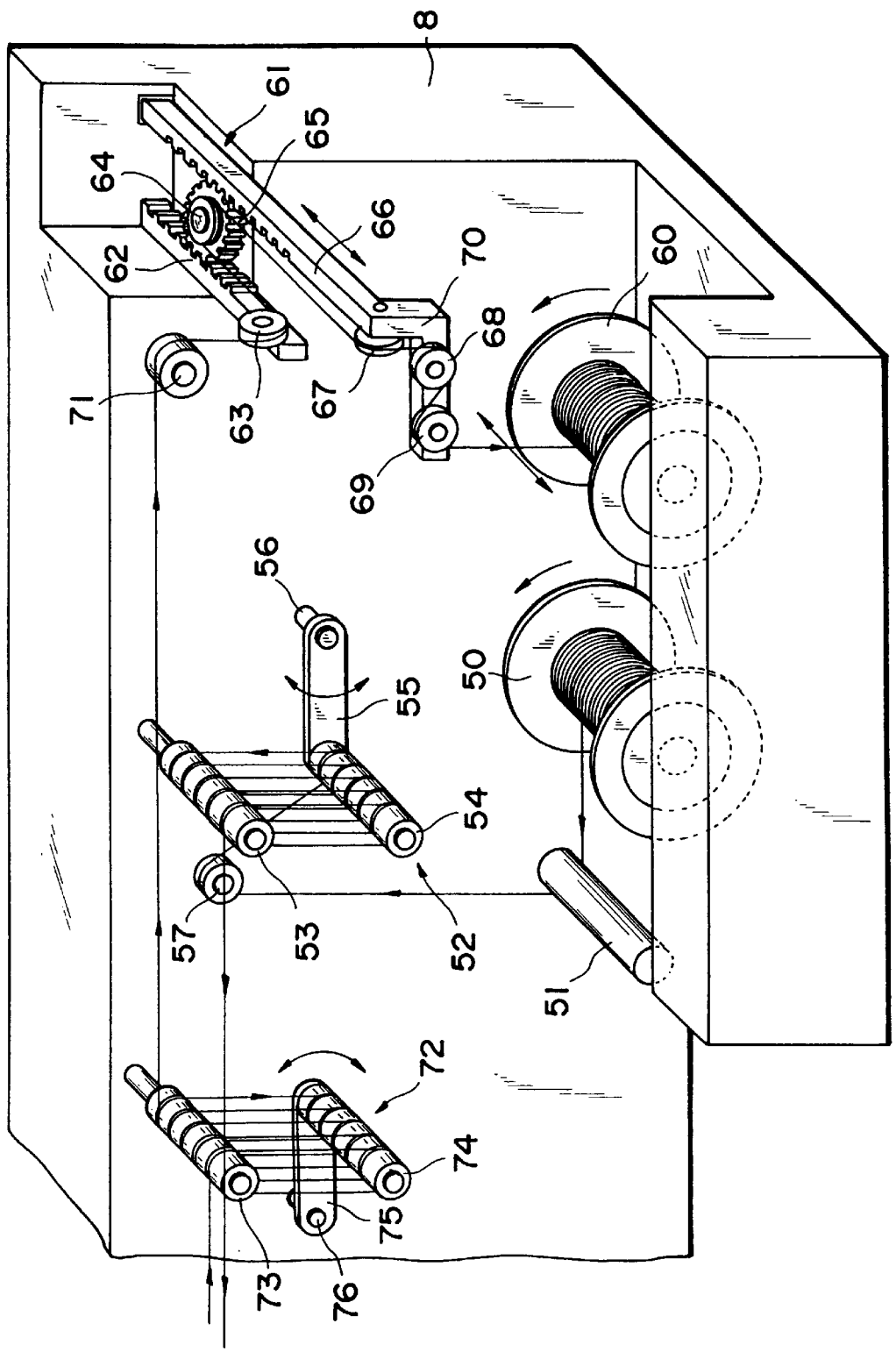

As shown in these diagrams, three grooved rolls 11, 12 and 13 are freely rotatably supported in parallel with one another on a frame (not shown in FIGS. 1 and 2). The grooved roll 11 is at a position directly above the grooved roll 12, and the grooved roll 13 is at a position whose height is intermediate those of the grooved rolls 11 and 12, this position being spaced away from the grooved rolls 11, 12 to one side thereof.

The circumferential surface of each of the grooved rolls 11~13 is formed to have grooves at regular intervals. The groove spacing decides the thickness of wafers formed by slicing. (In FIG. 2, the groove spacing is depicted as being fairly large in order to facilitate the drawing of the figures.) A cutting wire (saw wire) 14 is engaged with the grooved rolls 11~13 successively along the grooves thereof and is wound about the grooved rolls a number of times equal to the number of grooves in each grooved roll.

The grooved rolls 11 and 12 are disposed one above the other in spaced-apart relation, as mentioned above. Accordingly, the saw wire 14 travels vertically downward (or upward) between the grooved rolls 11 and 12.

An apparatus (workpiece feeding apparatus) 40 for feeding a material to be sliced is placed at the side (the left side in FIG. 1) of the saw wire 14 which travels vertically between the grooved rolls 11 and 12. The feeding apparatus 40 includes a moving body 43 supported so as to be free to move horizontally along a guide 42 provided on a support base 41. A workpiece (material to be sliced) 9 is held on the distal end of the moving body 43 by a well-known holding device so as to freely attachable and detachable.

A ball screw 45 is held horizontally on a support member 46, which is fixed on the support base 41, by a bearing 47 in a freely rotatable manner. The ball screw 45 extends into the interior of the moving body 43 and is threadedly engaged with a ball screw block 44 provided on the moving body 43. The ball screw 45 is rotatively driven by a motor 48, which is fixed on the support member 46, via a toothed belt (use can be made of a chain, a timing belt or other means capable of transmitting rotating power accurately) 49.

The ball screw 45 is rotated by rotating the motor 48, as a result of which the moving body 43 moves horizontally along the guide 42. The workpiece 9 held by the moving body 43 moves horizontally and is made to perpendicularly approach and withdraw from the saw wire 14 traveling vertically between the grooved rolls 11 and 12. At the time of slicing, the workpiece 9 is pushed perpendicularly against the vertically traveling wire 14.

Besides the arrangement utilizing the ball screw as described above, it is possible to utilize as the workpiece feeding apparatus 40 an arrangement utilizing a feed screw, an arrangement utilizing a rack-and-pinion mechanism or an arrangement utilizing a hydraulic or pneumatic cylinder, etc.

Provided diagonally above the location (the slicing location) at which the saw wire 14 contacts the workpiece 9 penetrated by the wire 14 is a nozzle 15 which supplies a working fluid containing an abrasive diagonally downward toward the slicing location. The nozzle may be situated at a position diagonally below the slicing location and may supply the working fluid diagonally upward toward the slicing location.

As will be described later, any one of the three grooved rolls 11~13 is rotatively driven by a motor. Owing to rotation of the grooved rolls 11~13 in the same direction, the saw wire 14 provided on the grooved rolls 11~13 in a tensioned state travels in one direction. The workpiece 9 is moved horizontally toward the wire 14 little by little and is pushed against the wire 14 traveling vertically between the grooved rolls 11 and 12, and the working fluid containing the abrasive is supplied from the nozzle 15 to the machining location where the wire 14 and the workpiece 9 contact each other. As a result, the workpiece 9 is sliced into a plurality of wafers of fixed width.

The saw wire 14 travels vertically between the grooved rolls 11 and 12. The workpiece 9 approaches and withdraws horizontally from the vertically traveling saw wire 14. Accordingly, the height of the slicing machine can be reduced in comparison with the conventional apparatus in which the workpiece 9 is moved up and down. As a consequence, in comparison with a case in which the frame is provided with a large height, the rigidity of the frame may be reduced. This makes it possible to lighten the frame. Further, operations for handling the saw wire 14 (such as winding the wire 14 on the grooved rolls 11~13) and for attaching and detaching the workpiece 9 are made easier to perform. Furthermore, since the working fluid containing the abrasive flows along the cut surface of the workpiece 9, it will not clog the grooves of the workpiece and will penetrate to the cut surface sufficiently, thereby improving slicing efficiency.

A delivery mechanism for paying out the saw wire 14 and a mechanism for taking up the wire are provided on the side of the grooved rolls 11~13 opposite the feeding apparatus 40 of workpiece 9.

The delivery mechanism of the saw wire 14 includes a delivery bobbin (a reel or drum) 50 about which the saw wire is wound, a delivery roll 51 and a tension adjusting mechanism 52. The delivery bobbin 50 is held on a frame 8 in a freely rotatable manner. The delivery bobbin 50 can also be provided with a tension adjusting device. The wire 14 pulled from the bobbin 50 is fed to the tension adjusting mechanism 52 via the delivery roll 51.

The tension adjusting mechanism 52 includes two horizontally disposed grooved rolls 53 and 54. The grooved roll 53 is supported on the frame 8 so as to be free to rotate, and the grooved roll (dancer roll) 54 is supported on the distal end of an arm 55 so as to be free to rotate. The arm 55 is secured at its base end to a shaft 56 of a tension adjusting device (not shown). The grooved rolls 53, 54 are each formed to have a plurality of grooves. The saw wire 14 heads toward the grooved roll 11 after several turns are first wound between the two grooved rolls 53 and 54 in the grooves thereof via a stationary sheave 57 freely rotatably provided on the frame 8.

The tension adjusting device includes an angle sensor for sensing the angle of rotation of the shaft 56, and a drive device (an air cylinder or the like) for driving the arm 55 via the shaft 56 in such a manner that the arm 55 is held in a substantially horizontal attitude (neither device is shown). In response to reception of a tension signal from a load cell (not shown) which senses the tension of the wire supplied to the grooved roll 11, the air cylinder is driven, thereby swinging the arm 55, in such a manner that the sensed tension is made substantially equal to a set value at all times. If the arm 55 is swung upward or downward from the horizontal attitude through an angle in excess of a fixed angle, this is sensed by the angle sensor, in response to which drive of the delivery bobbin 50 is controlled in such a manner that the arm 55 is held in the substantially horizontal attitude at all times.

The take-up mechanism of the saw wire 14 also includes a tension adjusting mechanism 72. The latter has the same construction as that of the tension adjusting mechanism 52. The saw wire 14 is fed from the grooved roll 12 to the tension adjusting mechanism 72 via direction changing sheaves 77, 78 and 79. The wire 14 is fed to a traverse mechanism 61 after being wound about the grooved rolls 73 and 74 a plurality of times in the tension adjusting mechanism 72. The grooved roll (dancer roll) 74 is freely rotatably mounted on the distal end of an arm 75 secured to a shaft 76 of a tension adjusting device (not shown). The tension of the saw wire 14 pulled from the grooved roll 12 is held substantially constant at all times by the tension adjusting mechanism 72.

The traverse mechanism 61 includes two racks 62 and 66. One rack 62 is horizontally secured to the frame 8. The other rack 66 is held parallel to the rack 62 so as to be movable longitudinally thereof. The teeth of the racks 62 and 66 face each other.

A pinion 65 is placed between the racks 62 and 66 so that the teeth of the pinion 65 mesh with the teeth of both racks 62, 66.

An arm 70 is attached to the distal end of the movable rack 66. A sheave 67 is provided on the distal end of the movable rack 66 so as to be free to rotate, and sheaves 68, 69 are provided on the arm 70 so as to be free to rotate. A concentric sheave 64 is further secured to the pinion 65. A sheave 63 is also attached also to the distal end of the stationary rack 62 so as to be free to rotate. The wire 14 reeved around the sheave 63 of the stationary rack 62 via a freely rotatable sheave 71 attached to the frame 8 from the tension adjusting mechanism 72 and further around the sheave 64 of the pinion 65. The wire 14 is reversed at the sheave 64 and then reeved around the sheaves 67, 68, 69 of the movable rack 66, after which the it is wound around a take-up bobbin (a reel or drum) 60.

The movable rack 66 is driven back and forth in its longitudinal direction by a reciprocating drive unit (a cylinder, or motor and a mechanism for changing direction of motion) (not shown). Both the pinion 65 and sheave 64 move half the traveling distance of the movable rack 64 according to the reciprocating drive of the movable rack 66. The sheave 69 at the distal end of the movable rack 66 is located directly above the take-up bobbin 60 and moves in the axial direction of the bobbin 60. As a result, the saw wire 14 is taken up by the take-up bobbin 60 while being kept in alignment. It goes without saying that the take-up bobbin 60 is rotated in the take-up direction by a rotational drive unit (equipped with a tension adjusting mechanism if necessary).

Since the delivery mechanism and take-up mechanism of the saw wire 14 are both disposed on one side of the grooved rolls 11~13, the overall length of the machine can be reduced in comparison with the case in which these mechanisms are placed on both sides of the grooved rolls. This also contributes to a reduction in the size of the machine.

In the example cited above, the saw wire 14 travels in one direction from the delivery mechanism to the take-up mechanism via the grooved rolls 11~13. If necessary, the saw wire 14 can be made to travel back and forth. At least the following two methods are available as methods of causing the saw wire to travel back and forth.

The first method involves feeding all of the wire that has been wound upon the wire delivery bobbin from the wire delivery side to the wire take-up side and taking up the wire on the wire take-up bobbin, this being accomplished by travel in one direction. This is followed by adopting the wire take-up side as the new wire delivery side, adopting the wire delivery side as the new wire take-up side and causing the wire to travel in the opposite direction. The feature of this method is that a clear cut surface is obtained because the workpiece can be sliced by travel of the wire in one direction. Since the wire delivery mechanism acts as the new wire take-up mechanism during wire travel in the return direction, a traverse mechanism would be provided.

The second method involves causing the saw wire to travel a prescribed length (e.g. about 100~200 m) from the wire delivery side to the wire take-up side, then rewinding the saw wire over a length slightly less than the above-mentioned prescribed length (preferably a length that is half the prescribed length) from the wire take-up side to the wire delivery side. This wire take-up and wire rewind operation is repeated until the wire is eventually taken up on the wire take-up side. This method is advantageous in that a comparatively short wire can be used as a substantially long wire. A traverse mechanism need not necessarily be provided on the wire delivery side. The reason for this is that a length of wire shorter than the above-mentioned prescribed length is taken up on the wire delivery side only temporarily. The wire delivery bobbin on the wire delivery side is provided with a bobbin traverse mechanism if this is required. The bobbin traverse mechanism takes up the wire while the entire wire delivery bobbin is moved in the axial direction thereof.

Furthermore, a wire cleaning unit 7 (see FIG. 1) is disposed between the grooved rolls 11~13 and the wire delivery and take-up mechanisms if required. It will suffice if the wire cleaning unit 7 is placed at one location even in a case where the wire is made to travel back and forth.

The attitude of the saw wire 14 which travels between the grooved rolls 11 and 12 is not limited to the vertical attitude; it may be disposed somewhat obliquely. In view of the fact that the exact midpoint between the vertical and the horizontal (in the example of the prior art) is an inclination of 45°, the saw wire 14 which travels between the grooved rolls 11 and 12 may be inclined at an angle of ±45° with respect to the vertical. Likewise, the direction along which the workpiece 9 is advanced and withdrawn may also be inclined at an angle of ±45° with respect to the horizontal. It is preferred that the direction along which the workpiece 9 is advanced and withdrawn perpendicularly intersects the traveling direction of the saw wire. However, depending upon the slicing method, the direction along which the workpiece 9 is advanced and withdrawn may be inclined to have an angle other than a right angle with respect to the traveling direction of the saw wire.

The number of grooved rolls engaged by the saw wire is not limited to three; two (grooved rolls 11 and 12) or four or more may be used.

Various methods of driving the grooved rolls 11~13 are available. Typical methods will now be described.

A first method is to drive one roll for causing the other two rolls to be driven. One grooved roll 13 is rotatively driven by a motor via a reduction gear or other power transmission mechanism (not shown). The other two grooved rolls 11, 12 are received in bearings so as to be free to rotate. The rotational driving force of the grooved roll 13 is transmitted to the other grooved rolls 11, 12 by the saw wire 14 engaged with the three grooved rolls 11~13.

A second method is a synchronous rotation method. Toothed wheels are secured to respective ones of the shafts of the three grooved rolls 11~13 and a toothed belt is engaged with these toothed wheels. One grooved roll, namely grooved roll 13, is driven by a motor and the power of the motor is transmitted to the other grooved rolls 11, 12 by the belt and toothed wheels. There are also arrangements in which transmission of rotational power is performed by pulleys and a belt, by gears and a chain, etc.

Figure 4:
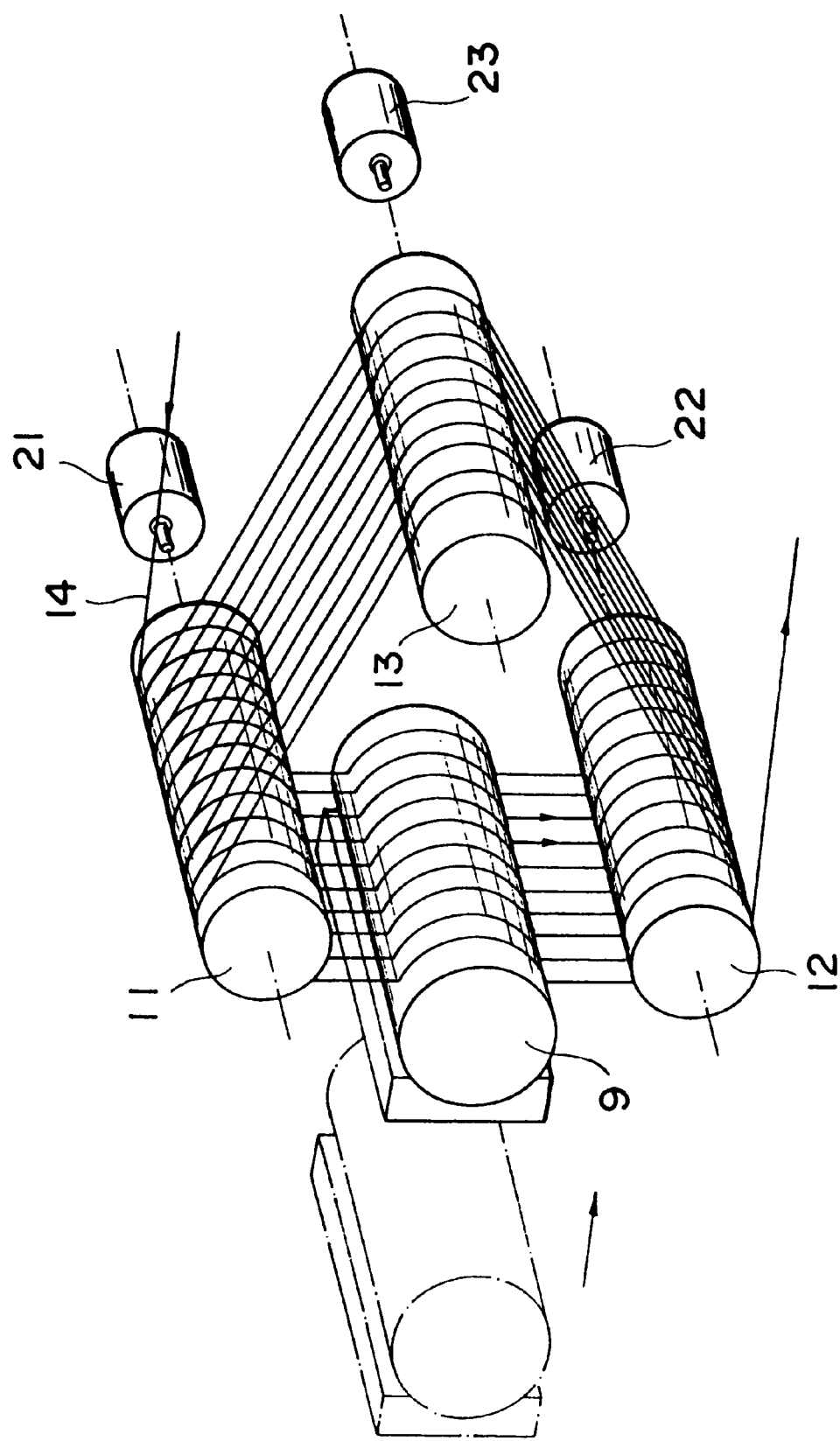

A third method is to drive three rolls. As shown in FIG. 4, the three grooved rolls 11, 12 and 13 are provided with motors 21, 22 and 23, respectively, for driving these rolls individually. The motors 21~23 are rotatively driven so as to generate identical torques, as will be described later. The grooved roll 11 is rotatively driven by the motor 21 either directly or via an appropriate mechanism (not shown) which transmits the rotational power. The grooved rolls 12 and 13 are likewise rotatively driven by the motors 22 and 23, respectively.

Figure 5:
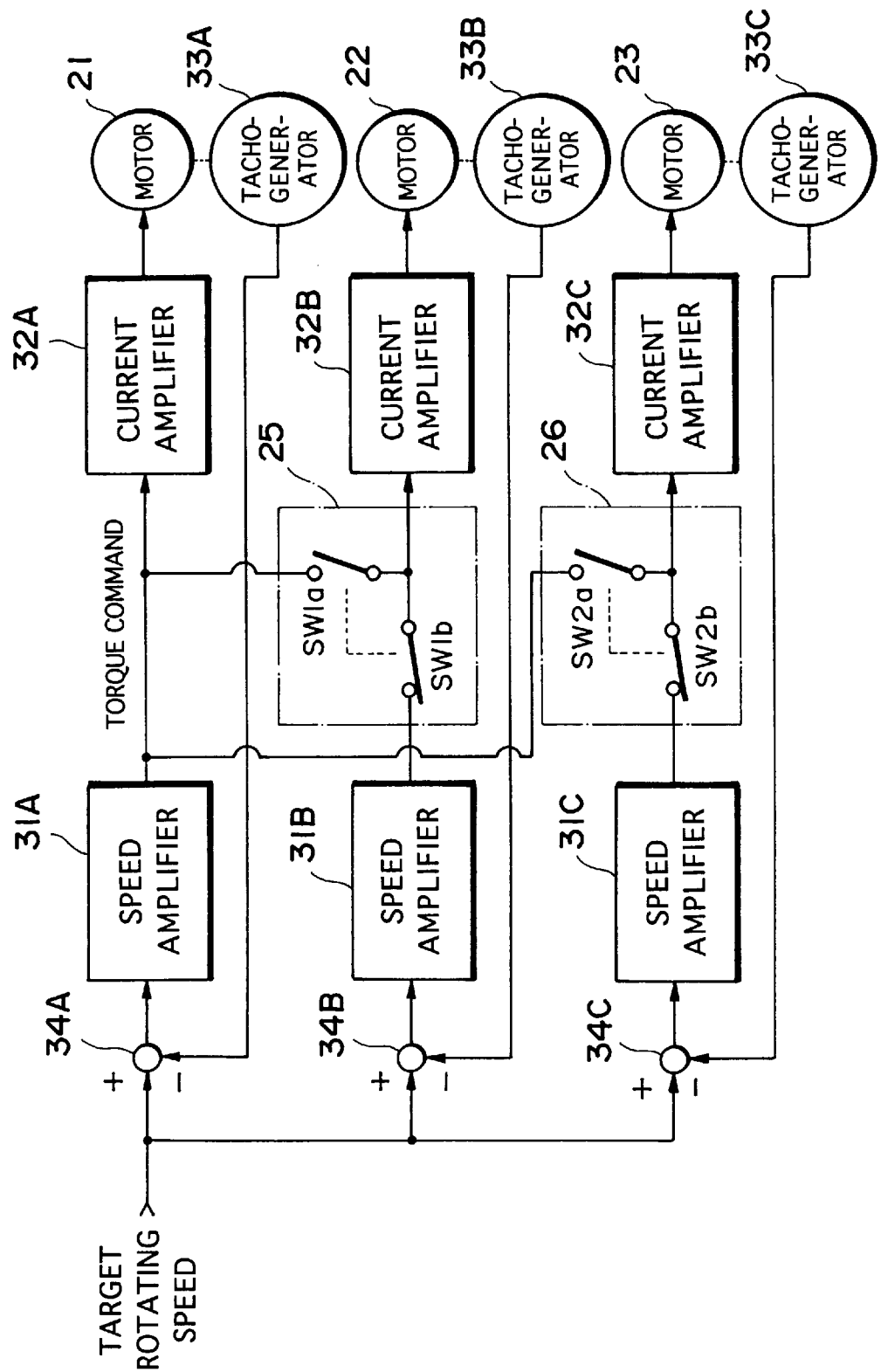

FIG. 5 illustrates a drive control circuit for the motors 21~23.

The three motors 21~23 are provided with feedback control systems (feedback control circuits) for performing control to hold rotating speed constant. A common target rotating speed (speed target value) is applied to these feedback control systems.

The feedback control system of the motor 21 will be described. The system is provided with a tachogenerator (rotating speed sensor) 33A for sensing the rotating speed (rpm) of the motor 21. A deviation from the target rotating speed of the sensed rotating speed is detected by a subtractor circuit 34A, which applies a signal representing this deviation to a speed amplifier 31A. The output of the speed amplifier 31A is converted to a drive current by a current amplifier 32A. The current flows into the motor 21. As a result, the motor 21 is controlled in such a manner that its rotating speed will agree with target rotating speed that has been set.

The feedback control systems of the motors 22 and 23 also have constructions basically the same as that of the feedback control system of the motor 21. The tachogenerators which detect the respective rotating speeds of the motors 22 and 23 are indicated at reference characters 33B and 33C, respectively. The subtractor circuits are indicated at 34B and 34C, the speed amplifiers at 31B and 31C, and the current amplifiers at 32B and 32C.

The drive circuit further includes changeover circuits 25 and 26. The changeover circuit 25 is constituted by a switch SW1*b* provided between the output side of the speed amplifier 31B and the input side of the current amplifier 32B, and a switch SW1*a* provided between the output side of the speed amplifier 31A and the input side of the current amplifier 32B (but closer to the input side than the switch SW1*b*). The switches SW1*a* and SW1*b* are operatively associated; when the switch SW1*a* is on, the switch SW1*b* is off, and when the switch SW1*a* is off, the switch SW1*b* is on.

As opposed to the changeover switch 25, which is provided in the feedback control system of the motor 22 and at a point between this feedback control system and the feedback control system of the motor 21, the changeover circuit 26 is provided in the feedback control system of the motor 23 and at a point between this feedback control system and the feedback control system of the motor 22.

The changeover circuit 26 includes two switches SW2*a* and SW2*b* that are operatively associated and turn on and off in opposition to each other. The switch SW2*a* is connected between the input side of the current amplifier 32B and the input side of the current amplifier 32C. The switch SW2*b* is connected between the output side of the speed amplifier 31C and the input side of the current amplifier 32C.

Figure 6:
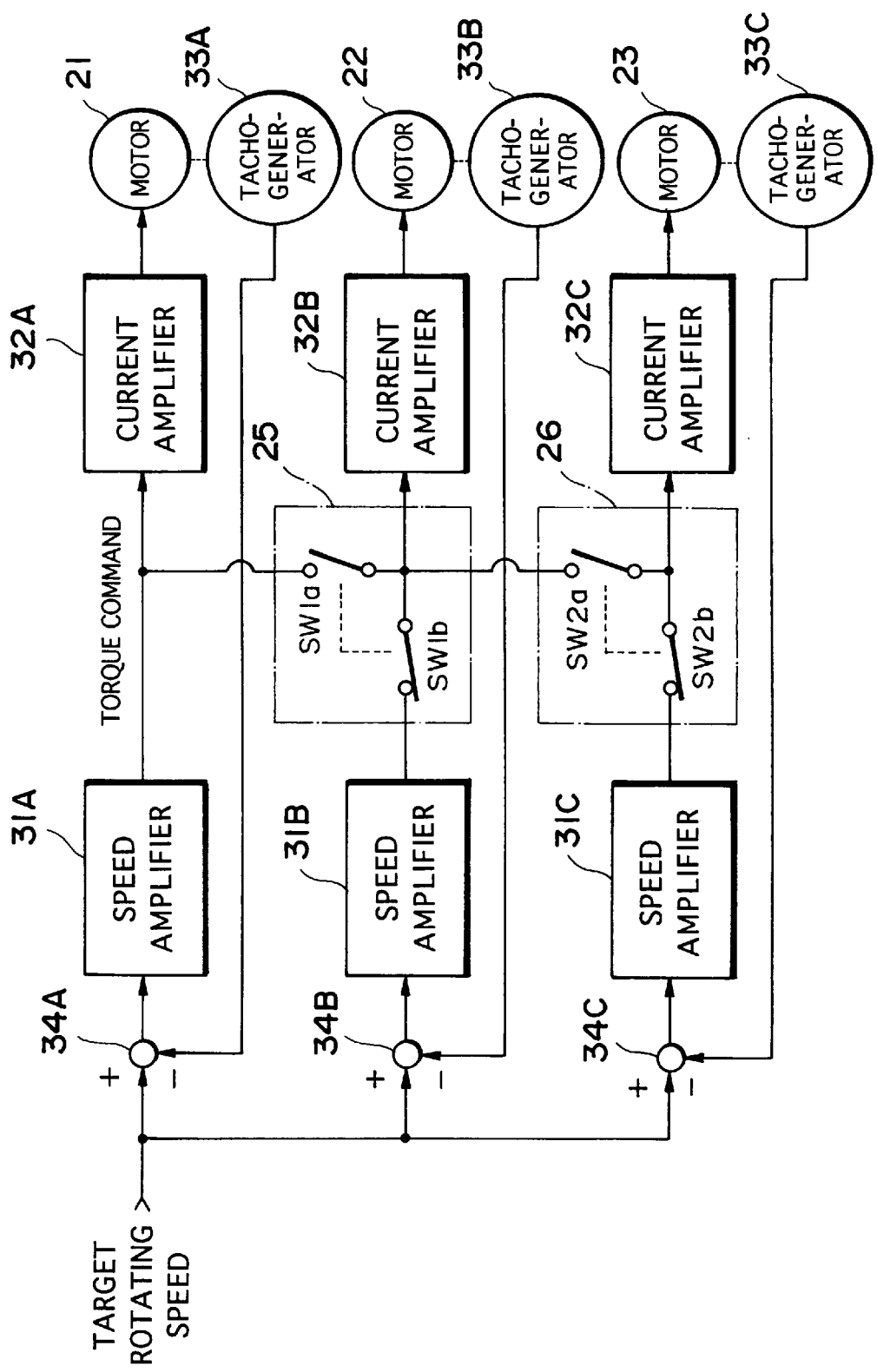

As shown in FIG. 6, the changeover circuit 26 may be provided in the feedback control system of the motor 23 and at a point between this feedback control system and the feedback control system of the motor 21. That is, the switch SW2*a* of the changeover circuit 26 may be connected between the output side of the speed amplifier 31A and the input side of the current amplifier 32C. Other aspects of the arrangement are that same as those shown in FIG. 5.

Though these switches SW1*a*, SW1*b*, SW2*a*, SW2*b* are illustrated as switches with contacts, semiconductor switches can be used as a matter of course.

When the workpiece 9 is sliced by the wire 14, the switches SW1*a* and SW2*a* are turned on and the switches SW1*b* and SW2*b* are turned off. As a result, the feedback control system of the motor 21 operates and the feedback control systems of the other motors 22 and 23 are opened. The motor 21 is controlled in such a manner that its rotating speed comes into agreement with the target rotating speed. A torque command generated by the feedback system of the motor 21 (i.e. the output signal of the speed amplifier 31A) is applied to the current amplifiers 32B and 32C for driving the motors 22 and 23. Accordingly, the motors 22 and 23 are driven so as to generate torques the same as that of the motor 21.

The grooved rolls 11, 12 and 13 are rotatively driven at identical torques by the motors 21, 22 and 23, respectively. Since there is no rotational resistance, in comparison with the first drive method described above, there is almost no slipping between grooved rolls 11~13 and the wire 14. As a result, the wear of the grooves of the grooved rolls 11~13 is reduced greatly. In addition, the degree of wear of the three grooved rolls can be equalized.

The three grooved rolls 11~13 are driven at a constant torque. If for some reason the groove diameter of one of the grooved rolls should happen to become smaller, this grooved roll will accelerate because the torque is constant. As a result, even if the groove diameter diminishes, the peripheral speed of the groove and the traveling velocity of the wire are maintained at substantially equal values. Slip, therefore, does not readily occur. In comparison with the second drive method, therefore, a disparity in the diameters of the grooves rolls is allowable.

When the switches SW1*a* and SW2*a* are both turned off and the switches SW1*b* and SW2*b* are both turned on, the feedback control systems of the motors 22 and 23 also operate. This is effective when the three motors 21, 22 and 23 are driven individually at the same target rotating speed. For example, this is used when the wire 14 is wound upon the three grooved rolls 11~23 or when he motors 21~23 are idling in the absence of a wire.

A fourth method is the driving of one roll and the variable-torque driving of two rolls.

Figure 7:
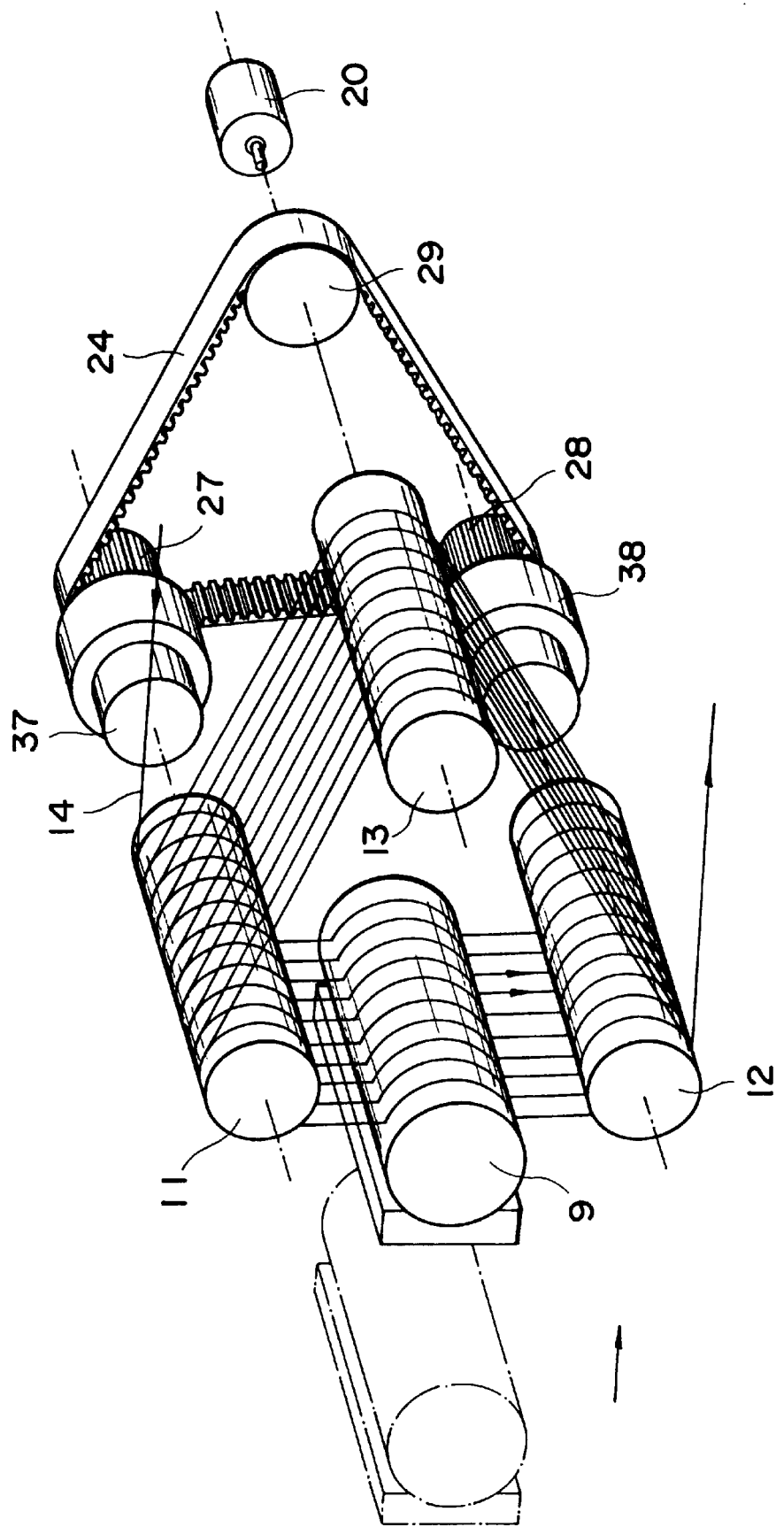
Figure 8:
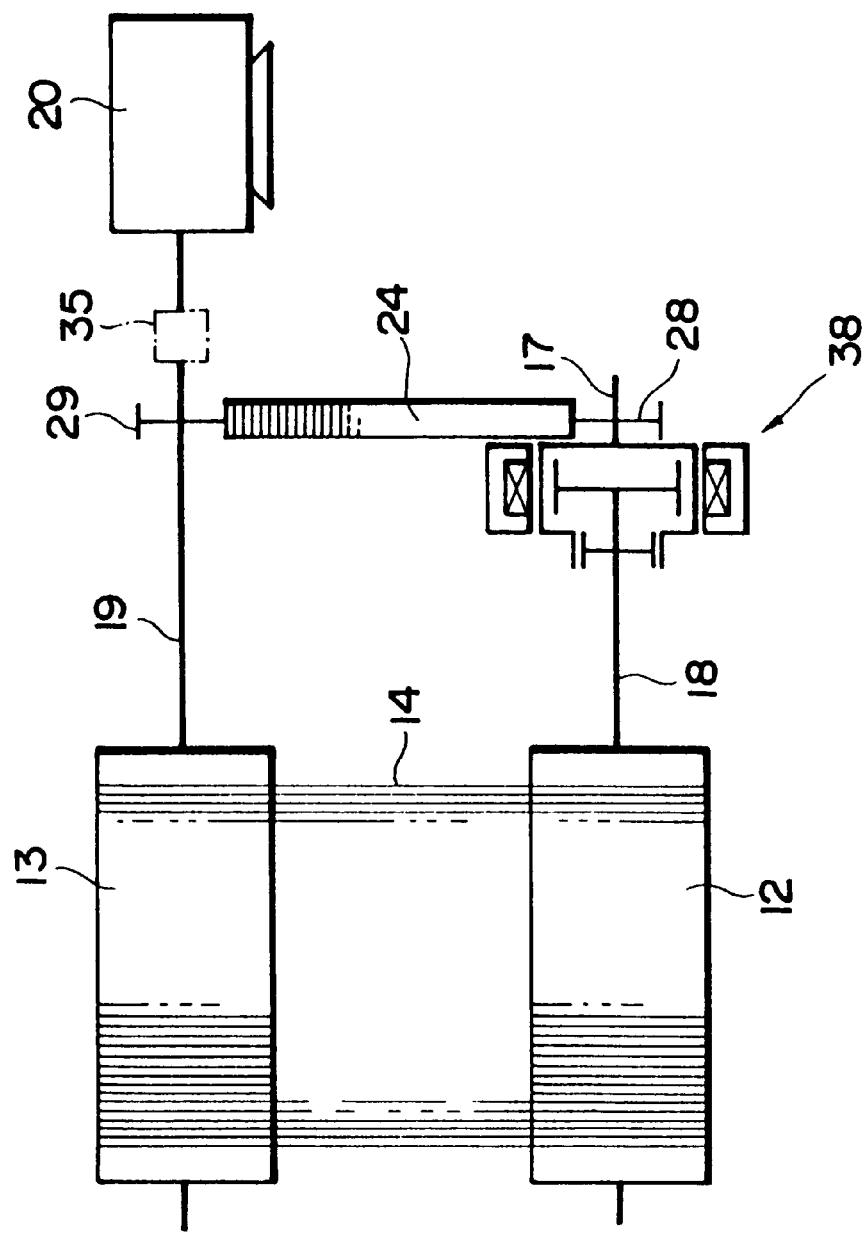

As shown in FIGS. 7 and 8, a motor 20 is provided for rotatively driving the three grooved rolls 11, 12 and 13. The grooved roll 13 is rotatively driven by the motor 20 either directly or via an appropriate mechanism 35 (shown in FIG. 8 only) which transmits rotational power. The rotational power of the motor 20 is transmitted to the grooved rolls 11, 12, whereby the grooved rolls 11, 12 are rotatively driven, via the power transmission mechanism and couplings 37, 38 the torques of which can be controlled.

The above-mentioned power transmission mechanism is constituted by three toothed wheels 27, 28 29, and a toothed belt 24 engaged with the toothed wheels 27, 28, 29. The toothed wheel 29 is secured to the shaft 19 (shown in FIG. 8 only) of the grooved roll 13 or to a shaft connected to this shaft. The other toothed wheels 27. 28 are secured to rotary shafts provided in correspondence with the grooved rolls 11, 12, respectively (only a rotary shaft 17 corresponding to the grooved roll 12 is shown in FIG. 8).

The toothed wheels 27. 28 have diameters smaller than that of the toothed wheel 29, and the toothed wheels 27, 28 rotate slightly faster than the toothed wheel 29 (e.g. about 10% faster).

The power transmission mechanism can be realized by combination of gears, a combination of pulleys and a belt or a combination of gears and a chain.

The rotation of the toothed wheels 27, 28 is transmitted to the corresponding grooved rolls 11, 12 via the couplings 37, 38, respectively.

The coupling 38 will now be described as a representative coupling with reference to FIG. 8. The coupling 38 is a powder clutch, by way of example. The driving side of the powder clutch 38 is attached to the shaft 17 of the toothed wheels 28. The driven side of the powder clutch 38 is attached to the shaft 18 (or to a shaft connected thereto) of the grooved roll 12. The rotating force of the shaft 17 is transmitted to the shaft 18 of the groove roll 12 via the powder clutch 38.

The powder clutch 37 has the same construction and is the intermediary through which the rotation of the shaft of toothed wheel 27 is transmitted to the shaft of the groove roll 11.

Rotational resistance is produced in the bearings of the grooved rolls 11, 12. The transmitted torque in the powder clutches 37, 38 is adjusted in such a manner that enough rotational torque to negate this rotational resistance will be transmitted to the shafts of the grooved rolls 11, 12. More specifically, enough rotational torque to make the rotational resistance of the grooved rolls 11, 12 zero or almost zero is transmitted from the motor 20 to the grooved rolls 11, 12 via the toothed wheels 29, 27, 28, toothed belt 24 and powder clutches 37, 38.

The grooved roll 13 is driven by the motor 20 and the other grooved rolls 11, 12 are rotatively driven by the motor 20 via the power transmission mechanisms and powder clutches. In comparison with the first drive method described above, the grooved rolls 11, 12 meet no or almost no rotational resistance, as a result of which there is almost no slip between the grooved rolls 11~13 and the wire 14. This means that the wear of the grooves of the grooved rolls 11~13 is reduced greatly. In addition, the degree of wear of the three grooved rolls 11~13 can be equalized. Furthermore, even if there is some disparity in the groove diameters of the grooved rolls 11~13, or even if a disparity in the groove diameters develops, the transmitted torque in the powder clutches 37, 38 can be adjusted, whereby the rotational resistance of the grooved rolls 11, 12 can be made zero or almost zero. In comparison with the second drive method, therefore, a disparity in the diameters of the grooved rolls is allowable.

[Second Embodiment]

(1) Placement of grooved rolls

Figure 9:
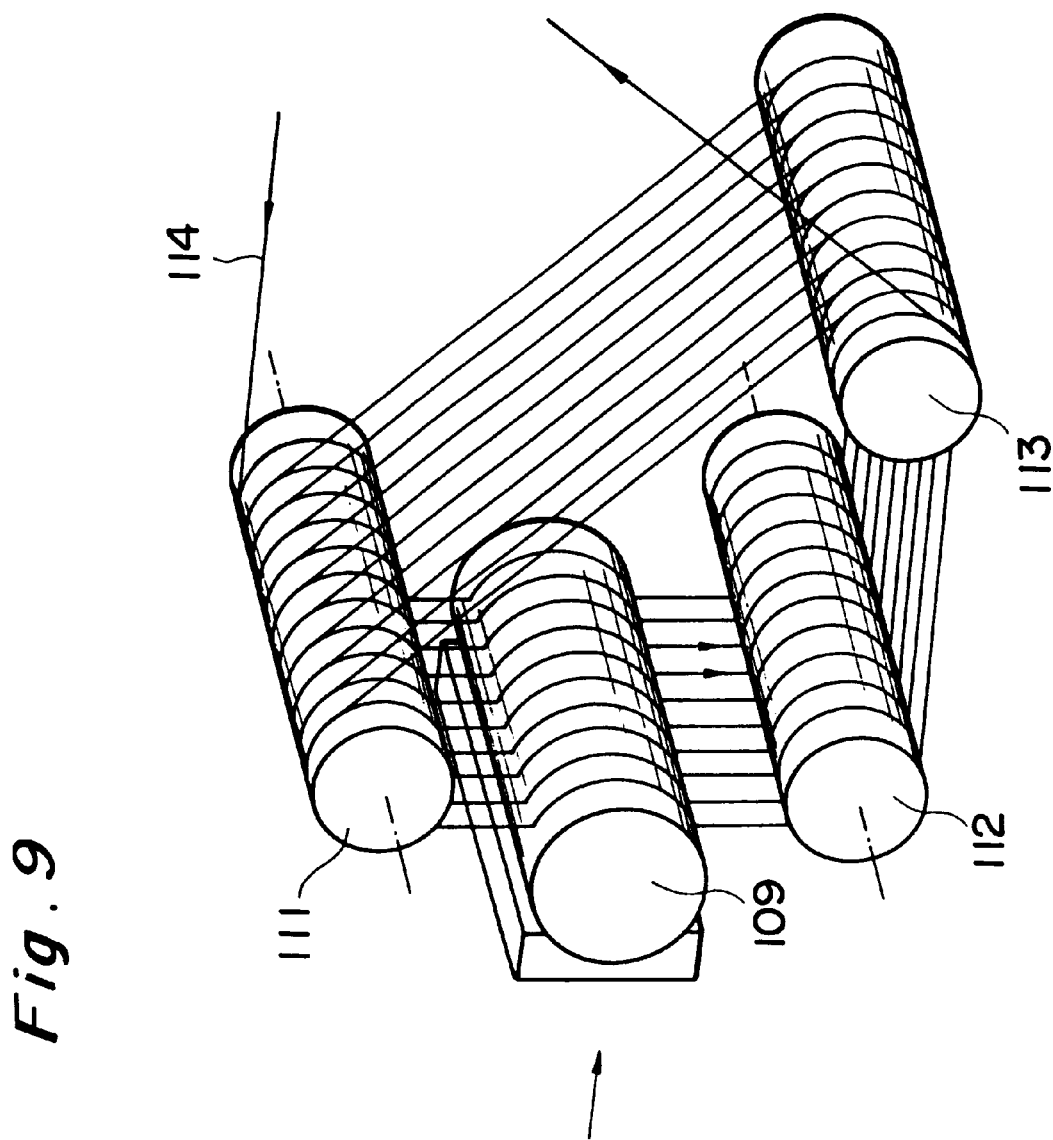

The placement of the three grooved rolls used in the wire-type slicing machine (wire saw) of the second embodiment is illustrated in FIG. 9.

Grooved rolls 111 and 112 are disposed so as to maintain the relationship in which one is placed above the other. A grooved roll 113 is located at a height the same as that of the lower grooved roll 112. The grooved rolls 111~113 are placed at positions corresponding to the vertices of a right triangle having vertical and horizontal sides as seen from the side. A saw wire 114 travels vertically downward between the grooved rolls 111 and 112 and travels horizontally between the grooved rolls 111 and 113.

This arrangement of the grooved rolls has a number of advantages. One is that the arrangement is effective when the grooved roll 113 is made the driving roll (in the above-mentioned method of driving one roll for causing the other two rolls to be driven, the synchronous rotation method, or the method of driving one roll and of variable-torque driving two rolls). As will be understood from FIG. 9, the saw wire 114 engaged with the driving grooved roll 113 defines an acute angle and the length of the saw wire 114 (or the angle through which wrapped about the roll) in contact with the grooved roll 113 (the grooves thereof) is large. This means that the rotational driving force of the grooved roll 113 is transmitted to the saw wire 114 sufficiently. Also in a case where a drive system is provided in which a power transmitting belt wheel is mounted on the shaft of the driving roll 113 and the rotating force is transmitted to the other grooved rolls 111, 112 by a belt (a specific example describe case will be described later), the circumferential length of the belt that is in contact with the belt wheel is enlarged so that sufficient driving force can be transmitted.

The second advantage is that since the driving roll 13 is placed at the lower part of the machine, the motor that drives the driving roll 113 can be placed at the lower part of the machine.

The third advantage is that the space between the grooved rolls 112 and 113 can be utilized. The workpiece 109 is sliced by the vertically traveling saw wire 114. As cutting progresses, the workpiece 109 penetrates the interior of the right triangle defined by the three grooved rolls 111~113. Cutting scraps are produced and drop when the workpiece 109 is sliced. Since the grooved rolls 112 and 113 situated at the lower part of the machine are spaced apart and disposed at substantially the same height, a receptacle (described later) for the cutting scraps can be provided between the grooved rolls 112 and 113 so that the cutting scraps can be removed with ease.

A much more effective arrangement is obtained by adopting a set-up in which the three grooved rolls are arranged as a single unit and the unit is attached to the base of the wire-type slicing machine in a freely detachable manner.

(2) Overall construction

Figure 10:
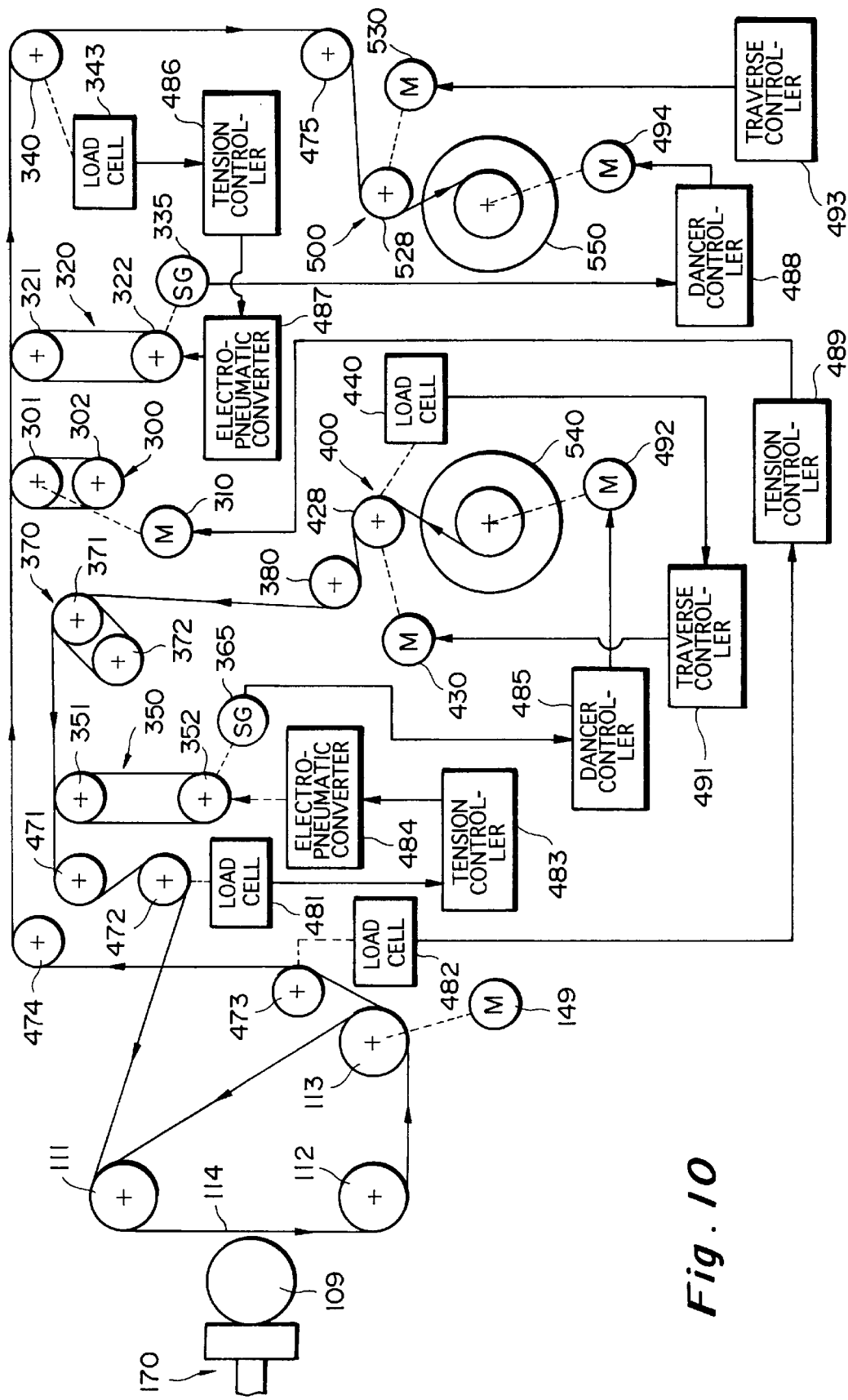
Figure 11:
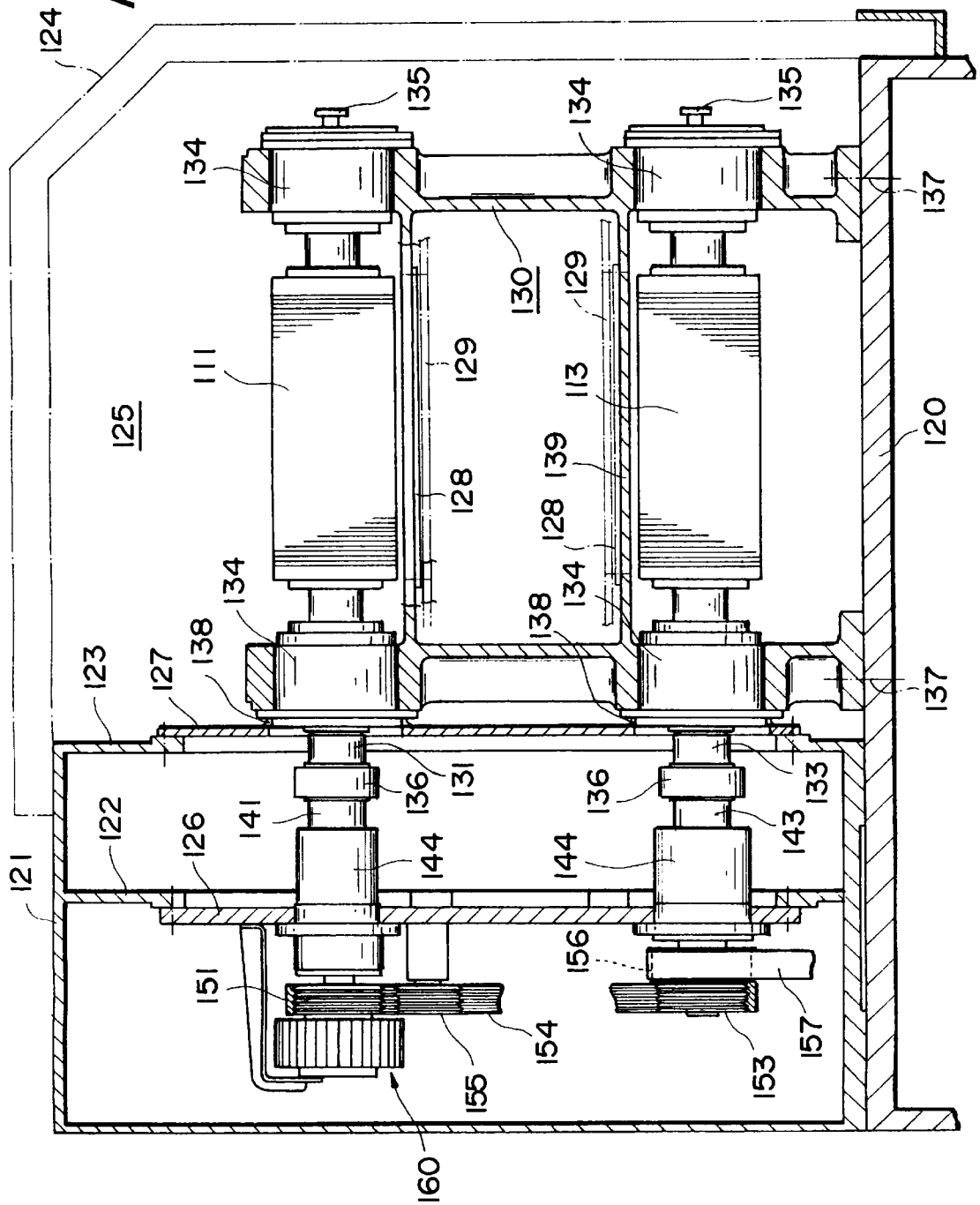
Figure 12:
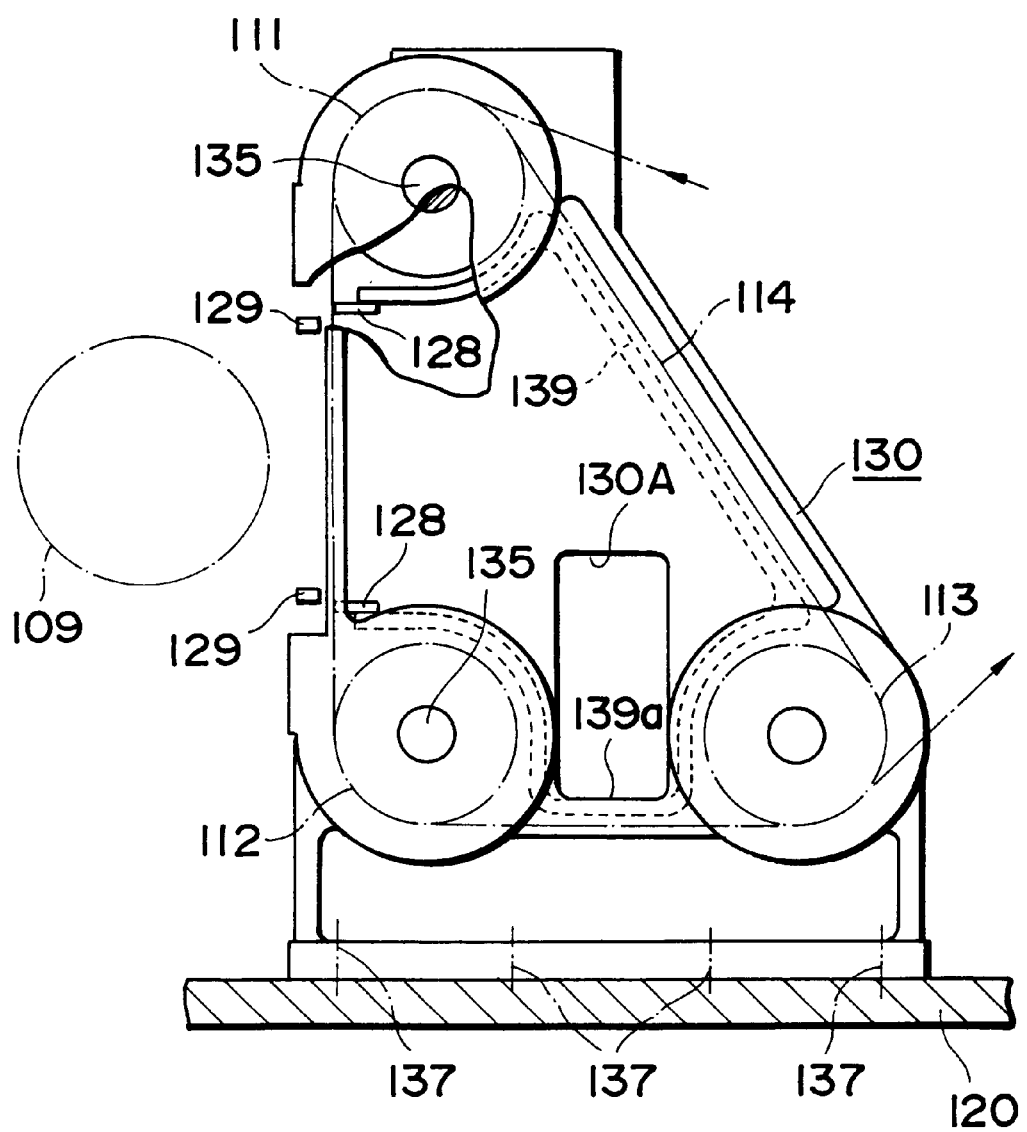
Figure 13:
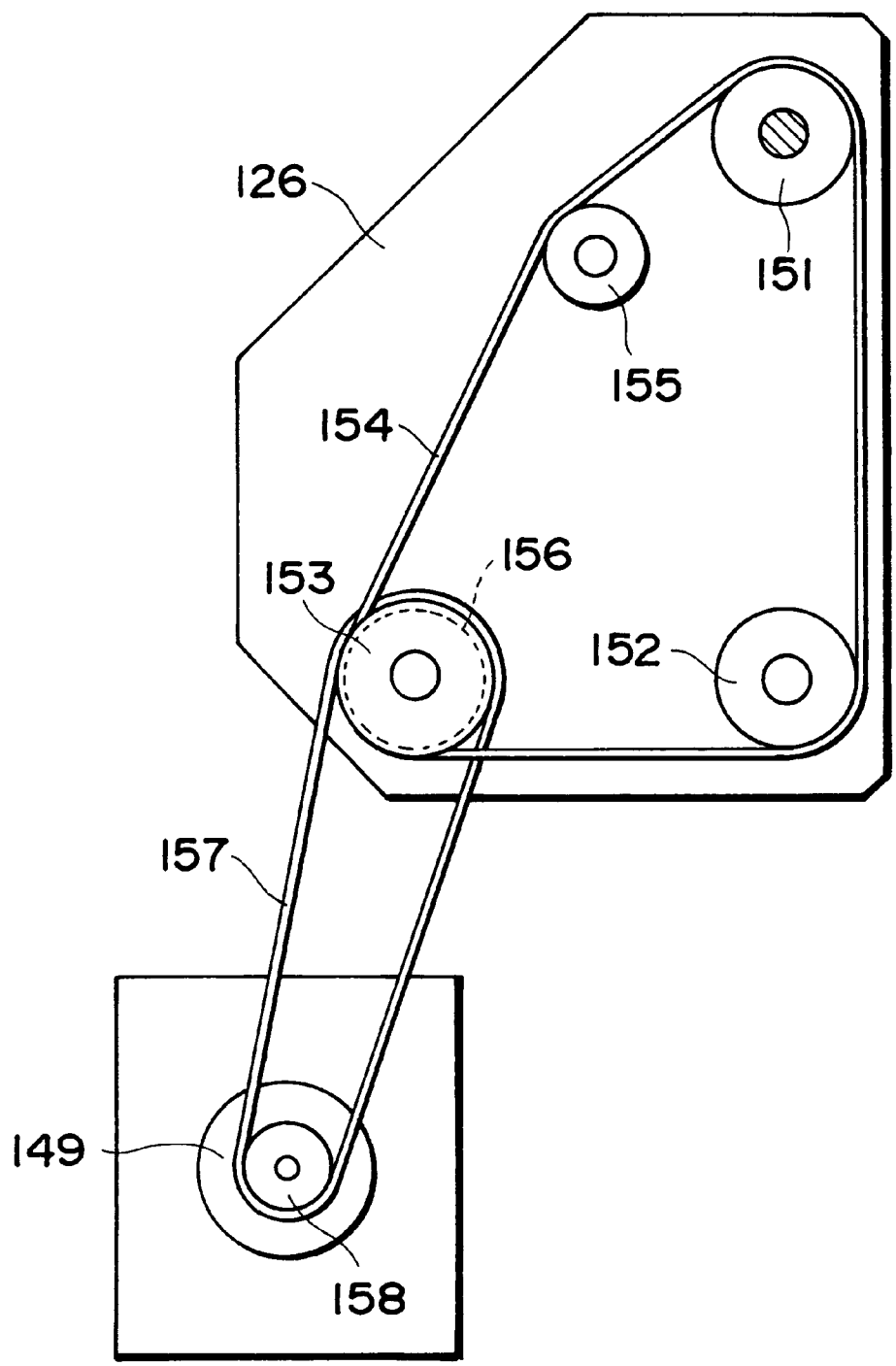
Figure 14:
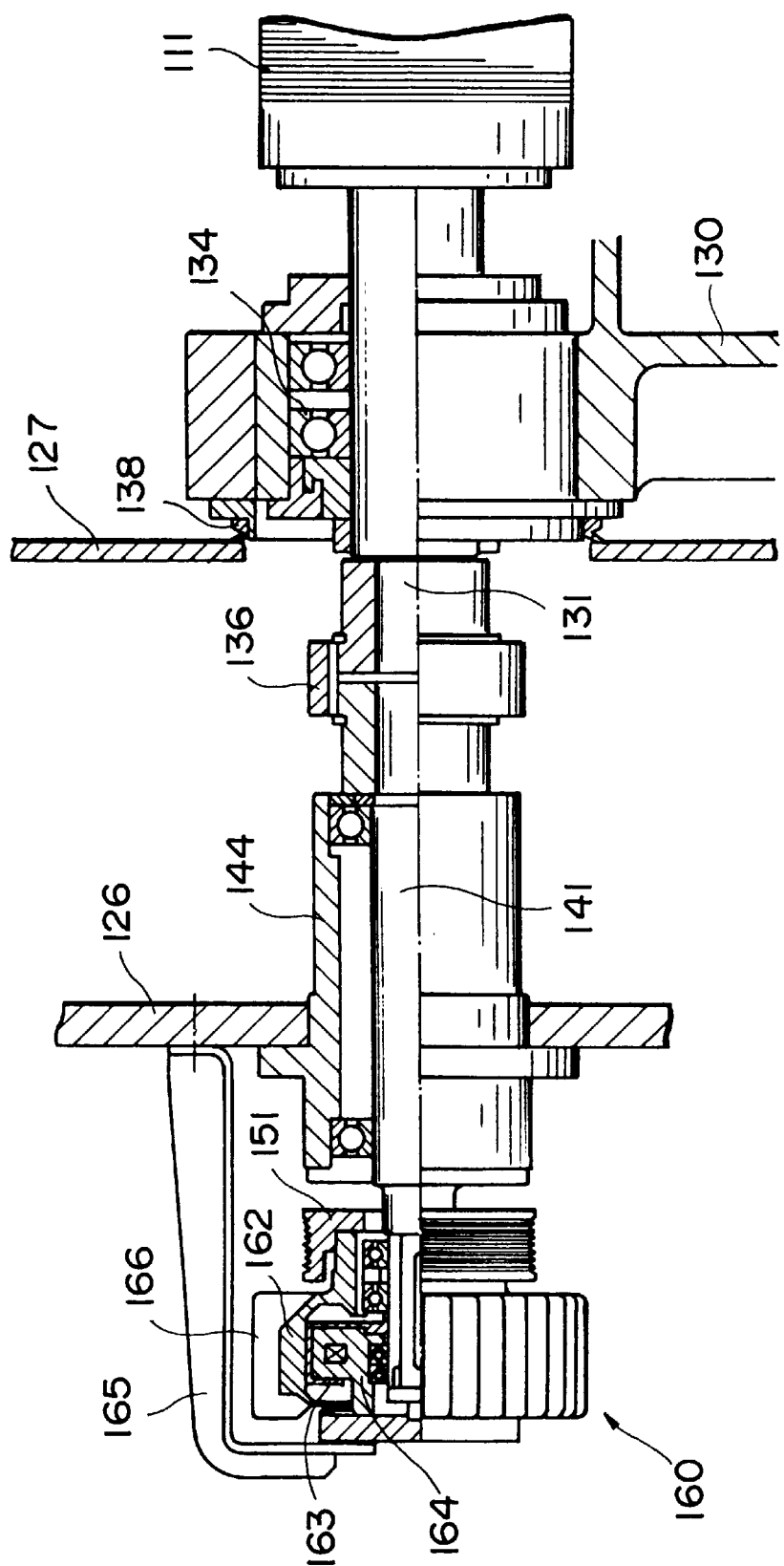
Figure 15:
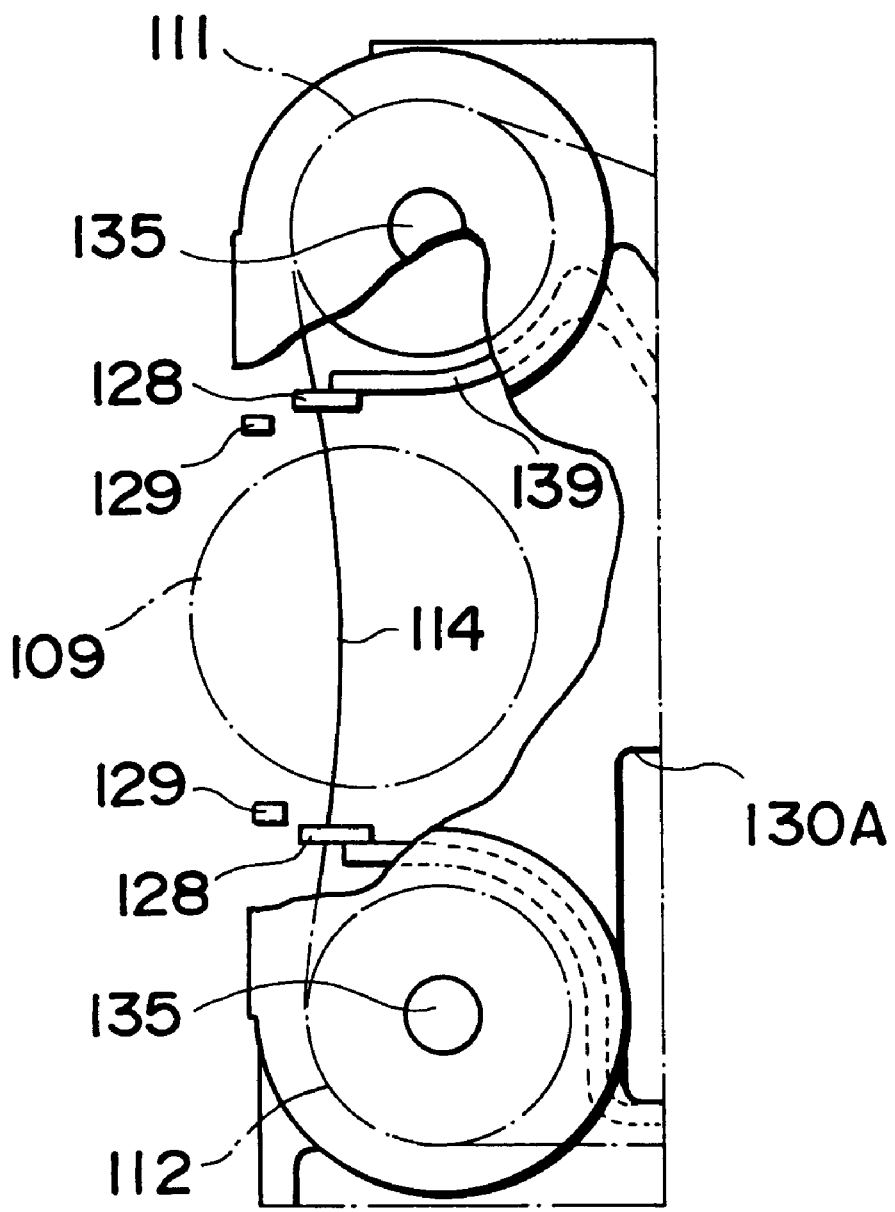

FIG. 10 schematically illustrates the overall arrangement and part of the control system of a wire-type slicing machine according to the second embodiment.

The workpiece 109 is held on the distal end of a workpiece feeding apparatus 170 and is made to approach and withdraw from the saw wire 114 traveling vertically between the grooved rolls 111 and 112.

The saw wire 114 that has been wound on a delivery bobbin 540 is supplied to the upper grooved roll 111 of the grooved roll group via a traverse mechanism 400 on the delivery side, a sheave 380, a length measuring unit 370, a dancer mechanism 350 on the delivery side and sheaves 471, 472 (these construct the saw wire delivery mechanism).

The cutting wire 114 is reeved around the three grooved rolls 111~113 successively and is wound about the grooved rolls a number of times equal to the number of grooves in each grooved roll. The grooved roll 113 is driven by a driving motor 149, and the saw wire 114 is pulled from the grooved roll 113 and fed into a take-up mechanism. The take-up mechanism includes a sheave 473, other direction changing sheaves, a sheave 474, a capstan mechanism 300, a dancer mechanism 320 on the take-up side, sheaves 340, 475, a traverse mechanism 500 on the take-up side and a take-up bobbin 550.

The tension of the wire supplied to the group of grooved rolls is controlled by the dancer mechanism 350 on the delivery side so as to take on a substantially constant value (a set value) at all times. The tension of the saw wire 114 at the entrance to the grooved roll group is sensed by a tension sensor 481 inclusive of a load cell provided on a support member of a sheave 472. The dancer mechanism 350 on the delivery side includes a stationary roll 351 and a dancer roll 352, with the saw wire 114 being wound about the rolls 351, 352 a plurality of times. The dancer roll 352 is supported on an arm and swinging of the arm is controlled by an air cylinder. The detection output of the tension sensor 481 is compared with a set value in a tension controller 483, which provides an electropneumatic converter 484 with a command conforming to the error between the two compared signals. The electropneumatic converter 484 controls the air pressure applied to the air cylinder. As a result, the height of the dancer roll 352 is adjusted in such a manner that the error between the sensed tension and set value will approach zero. The details of the dancer mechanism 350 on the delivery side will be described later.

The height of the dancer roll 352 is detected by a synchro generator 365. The detection signal from this device is applied to a dancer controller 485. The latter controls a motor (a servomotor) 492 which rotates the delivery bobbin 540. Specifically, the amount of wire paid out from the bobbin 540 is regulated in such a manner that the height of the dancer roll 352 will be held substantially constant at all times.

The length measuring unit 370 includes two sheaves 371, 372, which are provided so as to be free to rotate, engaged by the saw wire 114 that is paid out. The amount of rotation of the sheave 371 is sensed and the amount of the saw wire 114 paid out (the amount supplied) is calculated in accordance with this amount of rotation. The details of construction of the length measuring unit 370 will also be described later.

A sensor 440 for sensing the winding direction of the wire 114 paid out by the delivery bobbin is provided at the mounting location of a sheave 428 included in the traverse mechanism 400 on the delivery side. The sensor 440 includes two load cells. The direction in which the wire is moved by the traverse mechanism 400 is controlled in dependence upon the winding direction sensed. Specifically, the rotating direction of a driving motor 430 in the traverse mechanism 400 on the delivery side is controlled by a traverse controller 491. The details of the structure of the winding direction sensor 440 and control of the traversal traveling direction will be described later.

The tension in the saw wire 114 paid out from the grooved roll group is controlled by the capstan mechanism 300 so as to take on a substantially constant value (set value) at all times. In general, the tension of the wire 114 on the exit side of the grooved roll group and the tension of the wire 114 on the entrance side are controlled so as to be equal.

The tension in the wire 114 on the exit side of the grooved roll group is sensed by a tension sensor 482 including a load cell provided on a support member of the sheave 473. The capstan mechanism 300 includes stationary rolls 301, 302 provided so as to be free to rotate. The wire 114 is wound about these rolls 301, 302 a plurality of times. Rotation of the roll 301 is controlled by a motor 310. The tension sensed by the load cell is compared with a set value (which is set to a value the same as the value set in the tension controller 483) in a tension controller 489. The motor 310 is controlled in dependence upon the error between the two signals in such a manner that the error will approach zero. The details of the capstan mechanism 300 will be described later.

A feature of the capstan mechanism 300 is that it separates tension at its entrance from tension at its exit. Tension at the entrance of the capstan mechanism 300 (at the exit of the grooved roll group) is set to a value suited to drive of the grooved roll group (to slicing of the workpiece), as mentioned above. On the other hand, the tension of the wire 114 wound on the take-up bobbin 550 preferably is smaller than the wire tension in the grooved roll group. Accordingly, the exit-side tension of the capstan mechanism 300 (the tension on the side of the take-up bobbin 550) is set to be lower than the tension on the entrance side.

The tension of the wire 114 taken up by the take-up bobbin 550 is controlled by the dancer mechanism 320 on the take-up side. The dancer mechanism 320, the construction of which is basically the same as that of the dancer mechanism 350 on the delivery side, has a stationary roll 321 and a dancer roll 322. Tension sensed by a tension sensor 343 inclusive of a load cell provided on a support member of the sheave 340 is applied to a tension controller 486. The tension controller 486 controls an electropneumatic converter 487 in such a manner that the error between the sensed tension and the set tension (which is smaller than the set value in the tension controllers 483, 489) will approach zero, whereby the dancer roll 322 is moved up or down via a cylinder and arm. The details of the dancer mechanism 320 on the take-up side will be described later.

The height of the dancer roll 322 is detected by a synchro generator 335. A take-up driving motor 494 is controlled by a dancer controller 488 in dependence upon the detected height, whereby the amount of wire take-up is regulated so as to hold the height of the dancer roll 322 substantially constant at all times.

A traverse motor 530 of the traverse mechanism 500 on the take-up side is controlled by a traverse controller 493. The details of the construction of the traverse mechanism 500 and traverse control will be described later.

Methods of controlling the travel of the saw wire 114 are of two types, namely unidirectional and bidirectional, as described in the first embodiment. In this embodiment, use is made of a method (referred to as "intermittent two-way travel" for the sake of convenience) in which the wire is made to travel a suitable length (e.g. 100~200 m) from the delivery side to the take-up side (this shall be referred to as "forward travel"), after which the wire is rewound in the opposite direction by a length that is half the above-mentioned length (this shall be referred to as "reverse travel"), with this two-way travel being repeated. The wire 114 is used evenly three times (forward, reverse and forward passes), regardless of the portion of the wire, in order to slice the workpiece 109.

In intermittent two-way travel control of the saw wire 114, it goes without saying that in conformity with the forward and reverse drive of the driving motor 149 of the grooved roll group, the driving motors 492, 494 of the delivery bobbin 540 and take-up bobbin 550 also are driven in the forward and reverse directions in the same manner.

The above-described tension controllers 483, 486, 489, dancer controllers 485, 488 and traverse controllers 491, 493 can be implemented by one or a plurality of computers or controllers. The computer or controller would also carry out intermittent two-way travel control of the saw wire 114.

The saw wire is a steel wire of which one having the following specifications can be used:

1. Carbon content: 0.72~1.02 C %

A carbon content (percent by weight) of less than 0.72 C % would afford insufficient tensile strength while a carbon content in excess of 1.02 C % would result in a brittle wire. A trace amount of chrome may be included.

2. Wire diameter: 0.010~0.300 mm

A wire diameter of less than 0.010 mm would result in insufficient strength while a diameter in excess of 0.300 mm would lead to excessive loss of the workpiece (wafer).

3. Diameter deviation: 0.0005~0.0100 mm

A diameter deviation of 0.0005 mm is the limit on manufacturing accuracy. The surface precision of wafers formed by slicing tends to be unacceptable when 0.0100 mm is exceeded.

4. Plating (brass plating)

Copper: 0.50~0.70%

Zinc: 0.30~0.50%

Remainder: 0.01~0.50%

Plating thickness: 0.0001~0.01000 mm

The surface plating of the saw wire is helpful in introducing the abrasive (diamond) to the sliced surface (the cutting location). The surface plating of the saw wire is not limited to brass plating and may be copper plating, zinc plating or nickel plating.

5. Tensile strength: 2800~4800N/mm$^2$

Since breakage of the wire is fatal, a certain degree of tensile strength is required.

Standard specifications are as follows:

1. Carbon content: 0.82 C %
2. Wire diameter: 0.180 mm
3. Diameter deviation: 0.002 mm
4. Plating (brass plating)

Copper: 0.63%

Zinc: 0.35%

Remainder: 0.02%

Thickness: 0.0020 mm

5. Tensile strength: 3200N/mm$^2$ (3) Grooved roll unit and drive system thereof FIGS. 11 through 15 illustrate a grooved roll unit and its drive system.

A frame 121 is provided on a base 120 of the wire-type slicing machine. The interior of the frame 121 is partitioned into three compartment by partitioning walls 122 and 123. The largest compartment is a cutting chamber 125, which is converted by a freely attachable and detachable cover 124. The grooved roll unit is placed inside the cutting chamber 125.

The grooved roll unit includes one frame 130. The frame 130 is equipped with three pairs of bearings 134 for supporting the shafts of the grooved rolls 111~113 at both ends thereof so that the shafts are free to rotate. The grooved rolls 111~113 are supported by the bearings 134 at positions substantially corresponding to the vertices of a right triangle in a manner the same as that shown in FIG. 9.

The frame 130, with the exception of one side penetrated by the advancing workpiece 109, is provided with a cover 139 extending from below the upper grooved roll 111 to above the lower grooved roll 112 along the inclined side of the frame opposite the penetrated side, the upper part of the lower grooved roll 113 and the bottom side of the frame 130. The portion of the cover 139 on its bottom side defines a receptacle 139a for receiving cutting scraps. Both side faces of the frame 130 are also covered by plates. The lower portion of one side face is provided with an extraction window 130A. Working fluid containing an abrasive used when the workpiece 109 is sliced and cutting scraps resulting from slicing are prevented by the cover 139 and side plates from scattering about the surroundings. Any matter which drops is received by the cutting scrap receptacle 139a. Cutting scraps and the like on the cutting scrap receptacle 139a are externally removed from the extraction window 130A. The cutting scrap receptacle 139a can thus be provided between the two lower rolls 112 and 113.

Wire guides 128 are attached to that end of the cover 139 situated below the upper grooved roll 111 and to that end of the cover 139 situated above the lower grooved roll 112. The wire guides 128 extend the full width (length) of the grooved rolls and are provided so as to substantially contact the saw wire 114 traveling vertically between the two grooved rolls 111 and 112 or so as to project slightly outwardly of the frame from the position traversed by the traveling wire 114. In the process of having the workpiece 109 pushed against it in order that the workpiece 109 will be sliced, the traveling saw wire 114 flexes slightly inwardly of the frame (see FIG. 15 in particular). The wire guides 128 are each formed to have grooves at the positions traversed by the saw wire 104. The saw wire 104 passes through the grooves. Alternatively, each wire guide 128 per se is partially cut by the traveling saw wire 104 to have grooves formed thereon. The wire guides 128 preferably are made of a non-metal such as nylon or plastic.

The wire guides 128 play several roles. One is to prevent or reduce deflection of the vertically traveling saw wire 114. As a result, the accuracy with which slicing is performed by the saw wire 114 can be improved. The second role is to prevent the working fluid containing the abrasive as well as the cutting scraps from becoming attached to the grooved rolls 111, 112. The life of the grooved roll is prolonged as a result.

Nozzles 129 for spraying the working fluid containing the abrasive toward the traveling saw wire 114 are provided below the upper wire guide 128 and above the lower wire guide 128 (preferably as close as possible to the traveling path of the workpiece 109) at positions outwardly of the traveling path of the saw wire 114 traveling vertically between the grooved rolls 111 and 112. The nozzles are secured to the frame 130. The upper nozzle 129 is for forward travel of the saw wire 114 and the lower nozzle 129 is for reverse travel of the saw wire 114. Each of the nozzles 129 includes an orifice formed at least over a width traversed by the saw wire 114 and supplies the saw wire 114 with working fluid uniformly. The working fluid supplied to the saw wire 114 is carried to the cutting location of the workpiece 109 as the saw wire 114 travels.

The shafts (only those indicate at 131, 133 are shown) of the grooved rolls 111~113, specifically the ends thereof on the driving side, protrude outwardly of the frame 130. Seal members 138 each comprising an annular resilient body (e.g. rubber) are fixed to the frame 130 so as surround the protruding shafts 131, 133 at the locations of the bearings 134 of frame 130. Each seal member 138 flares outwardly from its tip. A shielding plate 127 is attached to the partitioning wall 123 and is provided with holes through which the shafts 131, 133 are passed. The seal members 138 are in intimate contact with the peripheries of these holes provided in the shielding plate 127. The working fluid containing the abrasive comes into contact with the slicing wire 114 and workpiece 109 in the cutting chamber 125 and cutting scraps are produced in the chamber. The seal members 138 prevent the working fluid and cutting scraps from penetrating into the interior of the compartment on driving side from the cutting chamber 125.

The frame 130 is provided on the side opposite the driving side with handles 135 at locations corresponding to the bearings 134. The frame 130 supporting the grooved rolls 111~113 is secured on the base 120 internally of the cutting chamber 125 by nuts and bolts (indicated only by the dot-and-dash lines 137). Removing the nuts and bolts 137 allows the frame 130 to be detached from the base 120 and removed to the exterior of the wire-type slicing machine. The handles 135 are used to move and position the frame 130 in the operation for attaching and detaching the frame 130.

Since the frame 130 inclusive of the grooved rolls 111~113 can be carried to a large area outside the wire-type slicing machine, an operation such as repair of the surface grooves of the grooved rolls 111~113 can be carried out in this large area. This facilitates maintenance.

A drive unit mounting plate 126 is secured to the other partitioning wall 122 of the frame 121. Three bearings 144 are secured to the mounting plate 126 at positions corresponding to the grooved rolls 111~113. The bearings 144 receive respective shafts (only those indicated by 141, 143 are shown) so that the shafts are free to rotate. The shafts 141, 143 and the shafts 131, 133 of the grooved rolls 111~113 are coupled by gear couplings 136.

Two grooved belt wheels 153, 156 are secured to the driving shaft 143 coupled to the shaft 133 of the grooved roll 113. The driving motor 149 is secured to the base 120 and a grooved belt wheel 158 is secured to the output shaft thereof. A grooved belt 157 is engaged with the belt wheels 156 and 158 so that the rotational driving force of the motor 149 is transmitted to the shaft 143. The grooved roll 113 is rotatively driven as a result.

A grooved belt wheel 151 is freely rotatably supported on the shaft 141 (hereinafter the description deals with the representative drive system that corresponds to the grooved roll 111) coupled to the shafts of the other two grooved rolls 111, 112 and received in the bearing 144. The grooved belt wheel 151 constitutes part of a powder clutch 160.

The powder clutch 160 includes an annular electromagnet 164 (inclusive of an excitation coil) secured to the mounting plate 126 by a bracket 165. A driven rotary body 163 comprising a thin metal plate is provided so as to surround an electromagnet 164. The rotary body 163 is secured to the shaft 141. A driving rotary body 162 is provided outboard of the rotary body 163 so as to surround the same and is secured to the belt wheel 151. A number of fins 166 are provided on the outer circumferential side of the rotary body 162.

A tension pulley 155 is provided on the mounting plate 126 so as to be free to rotate. A grooved belt 154 is engaged with the belt wheels 151, 152 (which corresponds to the grooved roll 112), 153 and the tension pulley 155. The rotational driving force of the driving shaft 143 is transmitted to the grooved rolls 111, 112 through the belt 154, belt wheels 151, 152, powder clutches 160 and shafts 141.

There are various ways of using the powder clutch 160 depending upon the principal purpose. One is to make the rotational resistance of the grooved rolls 111, 112 zero or substantially zero by adjusting the transmission torque, as described in the first embodiment. The other is to mitigate the inertial effects of the grooved rolls 111, 112 upon the saw wire 114 at the time of acceleration and deceleration. The saw wire 114 is driven in accordance with intermittent two-way travel. When the traveling direction is reversed, first the wire is decelerated, stopped temporarily and then accelerated. The grooved rolls have a large inertia because of their weight. If the transmission torque of the powder clutch 160 is set to an appropriate value, the influence of the inertia of the grooved rolls on the saw wire 114 can be reduced. The transmission torque of the powder clutch 160 can also be adjusted in advance in conformity with a small disparity in the diameters of the grooved rolls, or control may be performed in such a manner that the transmission torque is increased at acceleration and deceleration and decreased when a steady state prevails. To attain this object, the diameters of the belt wheels 151, 152 and 153 corresponding to the respective grooved rolls 111, 112 and 113 may be the same. In any case, feedback rotation control is performed in such a manner that the motor 149 of the driving grooved roll 111 will attain the target rpm.

The drive system consisting of the belt wheels 151~153, 156, bearings 144 and powder clutches 160, etc., is provided on the mounting plate 126. Accordingly, the entire mounting plate 126 can be replaced.

It is preferred that the spacing of the grooved rolls 111~113 be changed in dependence upon the size (diameter) of the workpiece 109. In the case of a large-diameter workpiece 109, it is required that the spacing of the grooved rolls 111~113 be enlarged. This in turn makes it necessary to modify the drive system.

A plurality of types of grooved roll units having sizes commensurate with the size of the workpiece 109 are prepared beforehand. Likewise, drive systems (the mounting plate 126) of a plurality of types are also prepared in advance in conformity with the grooved roll units. This means that if a grooved roll unit and drive system suited to the size of the workpiece 109 are adopted and mounted on the base, a wire-type slicing machine conforming to the size of the workpiece 109 can be manufactured with ease.

(4) Workpiece feeding apparatus and workpiece holding apparatus

Figure 16:
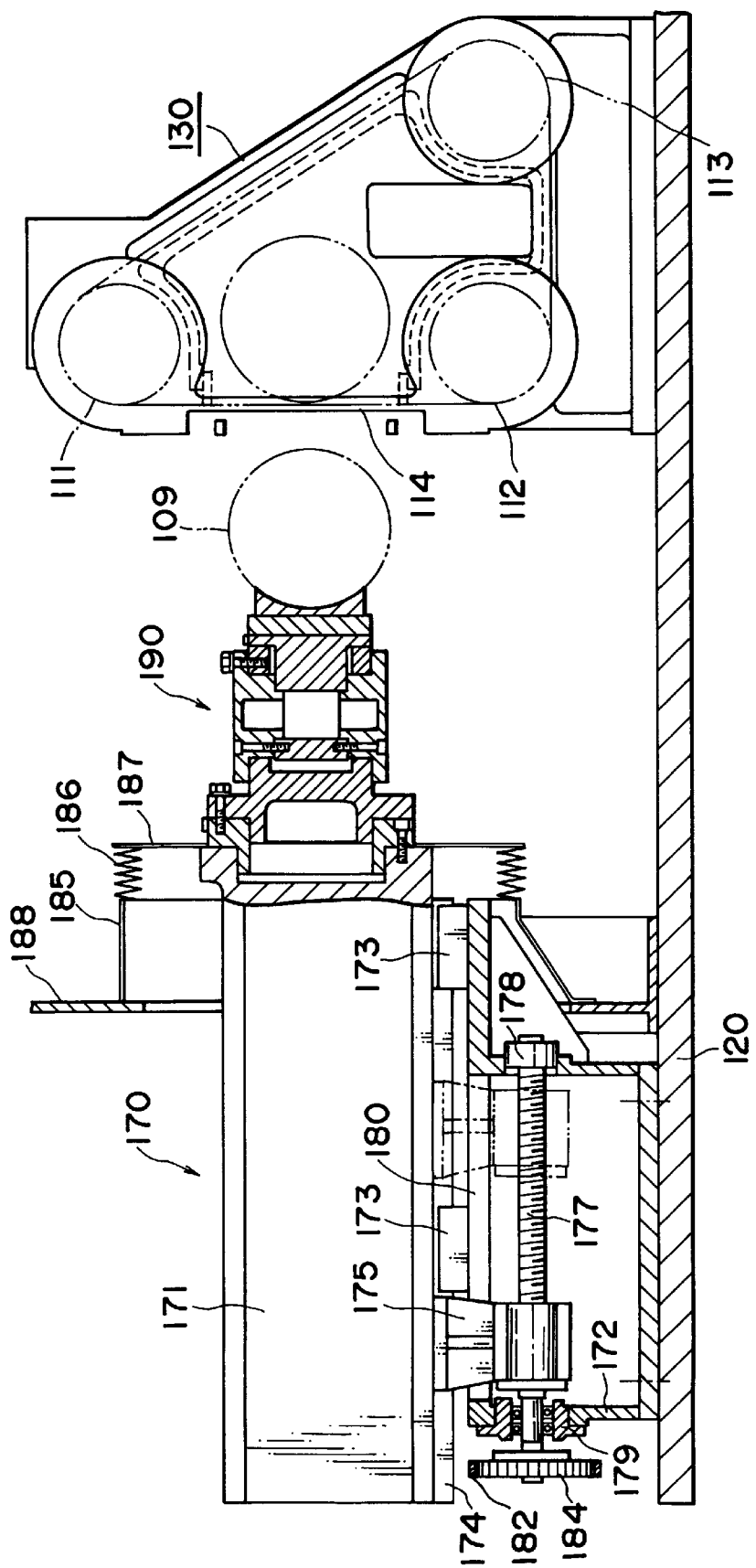
Figure 17:
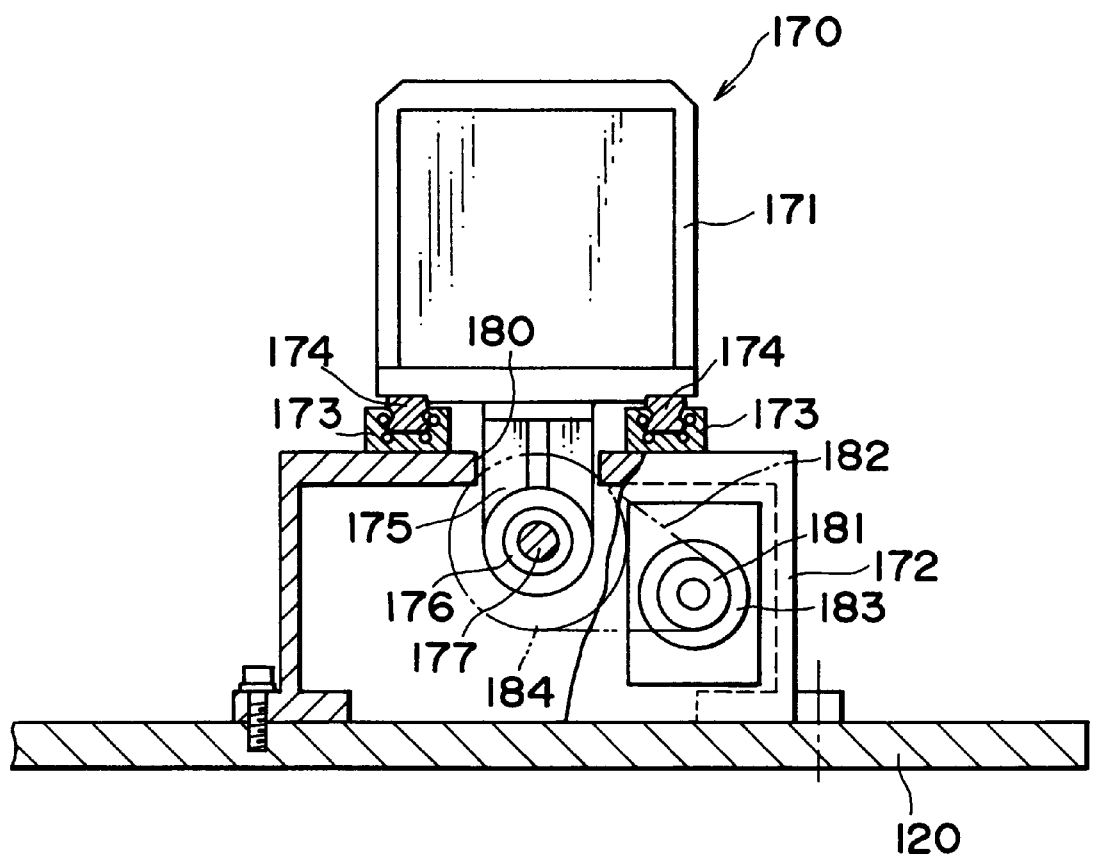
Figure 18:
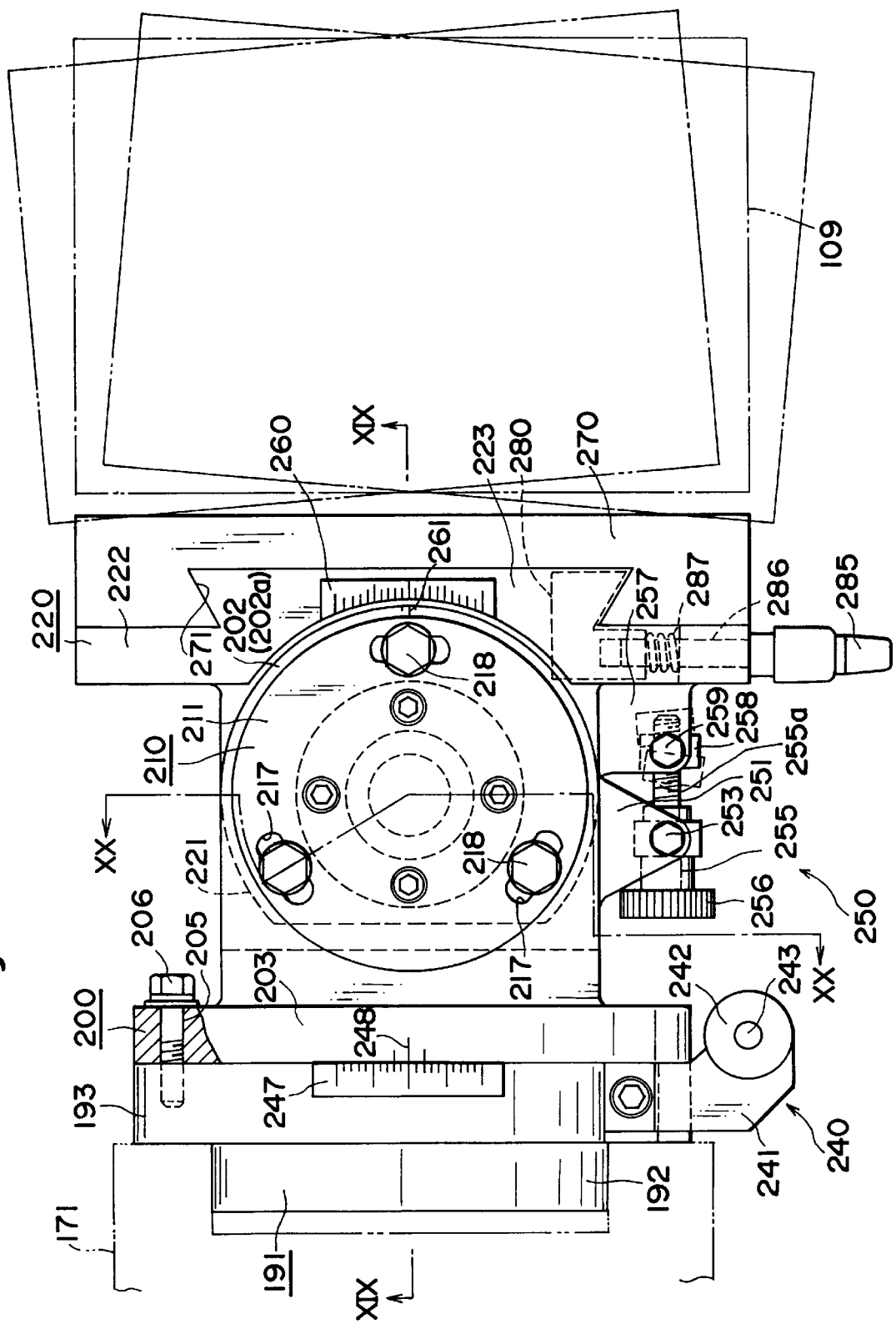
Figure 19:
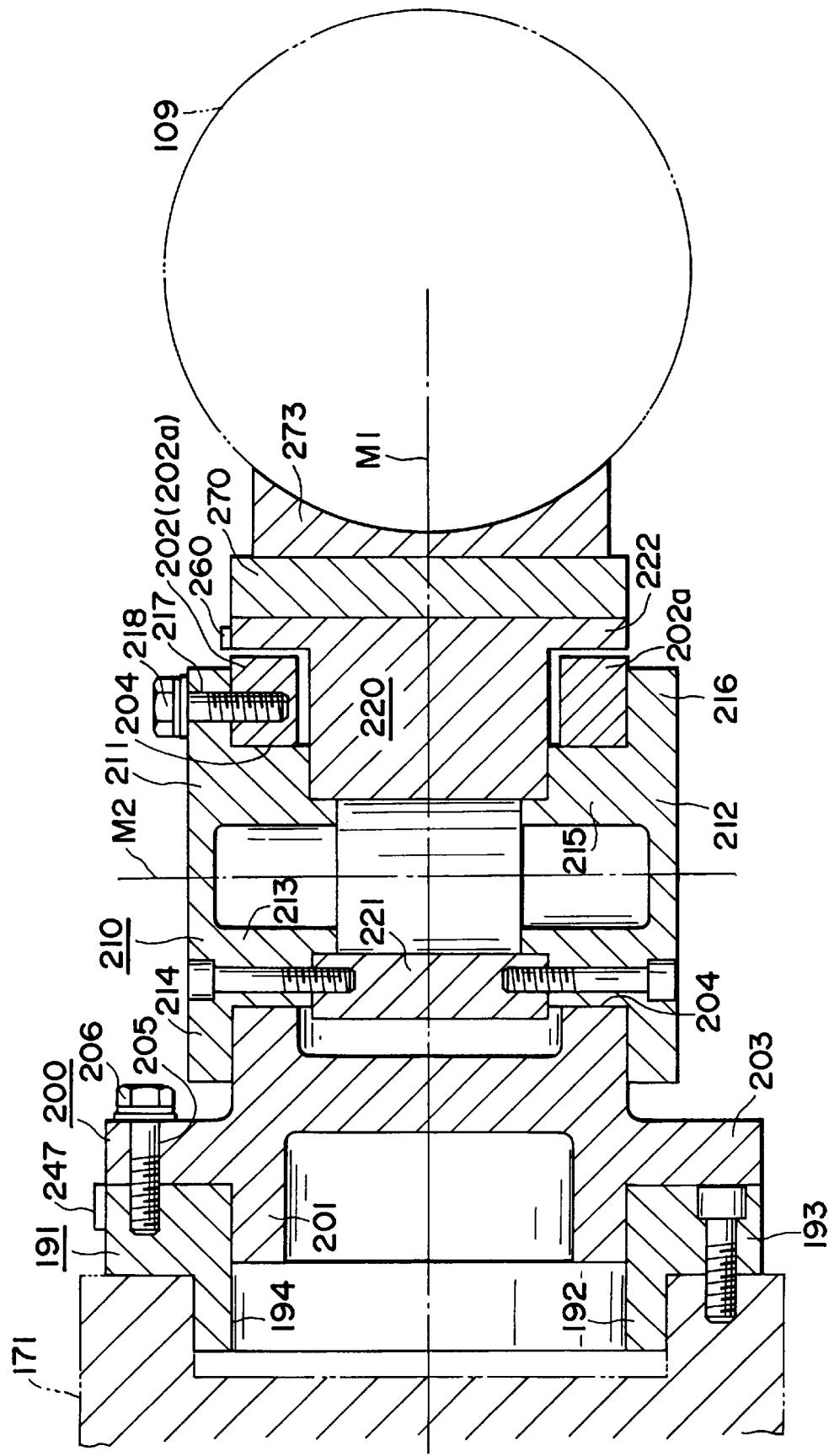
Figure 20:
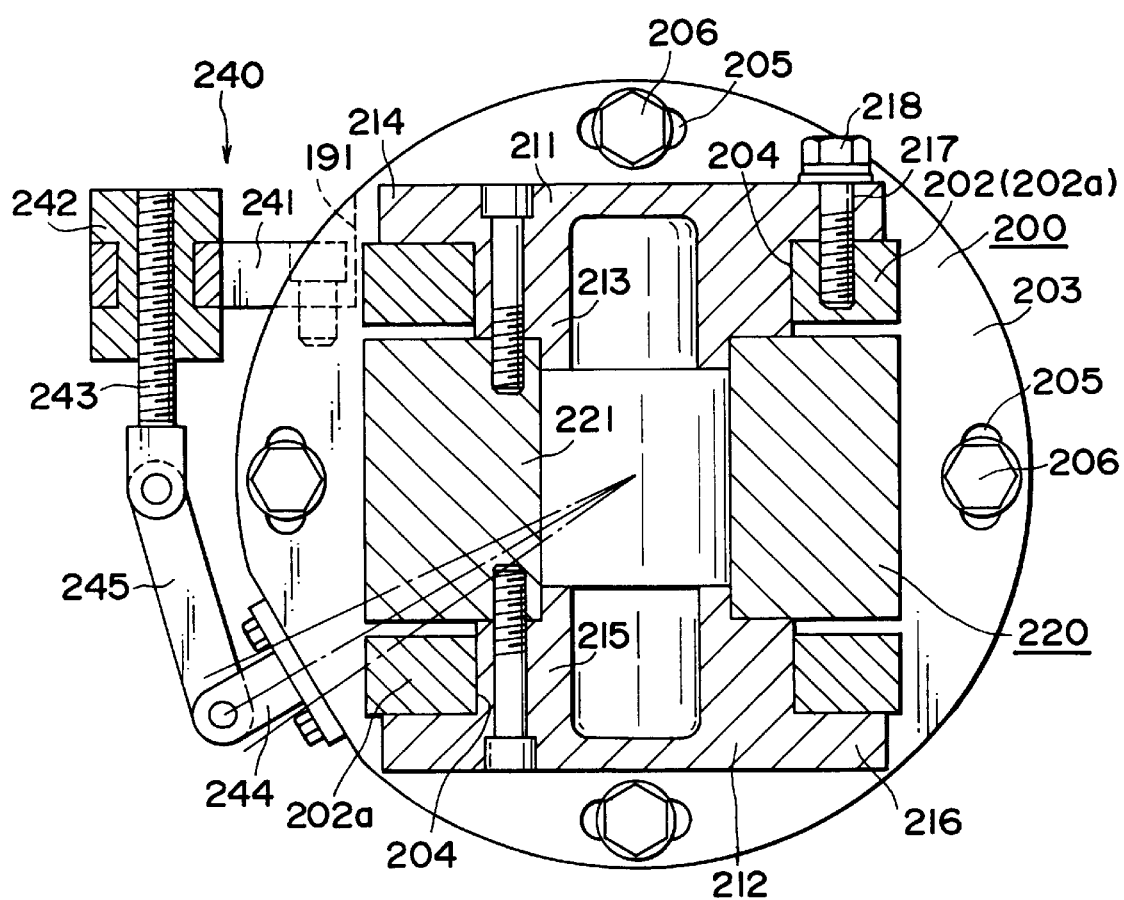
Figure 21:
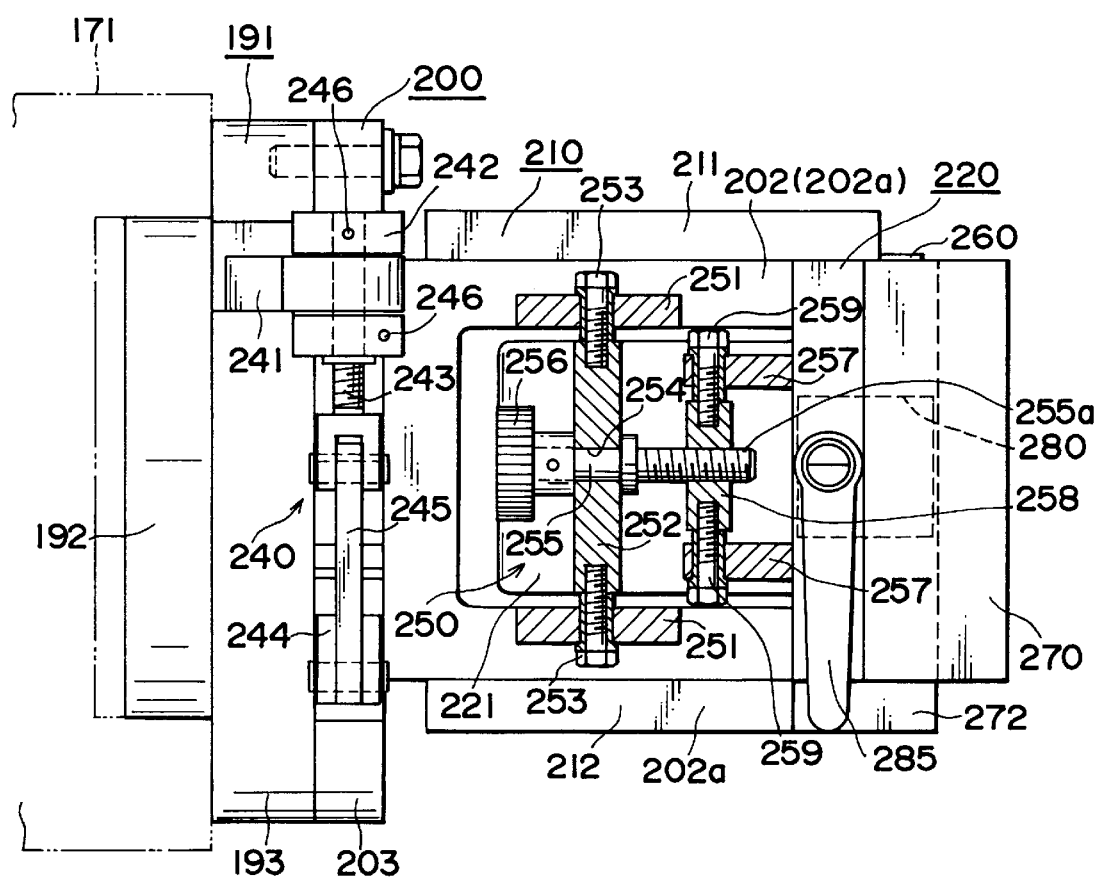
Figure 22:
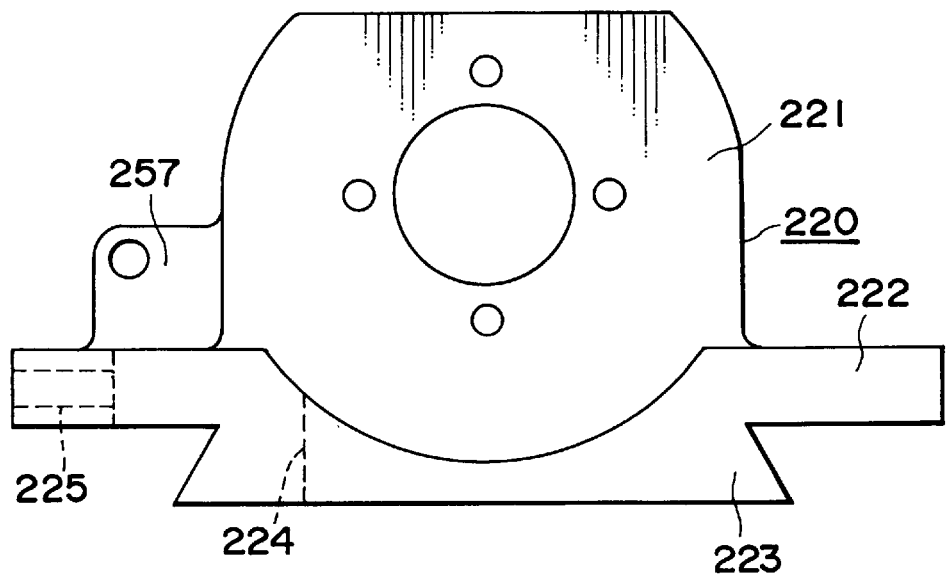
Figure 26:
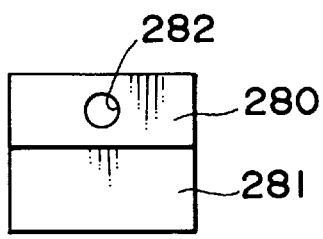
Figure 25:
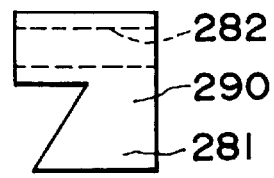
Figure 27:
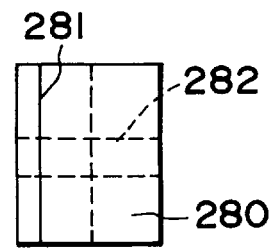
Figure 23:
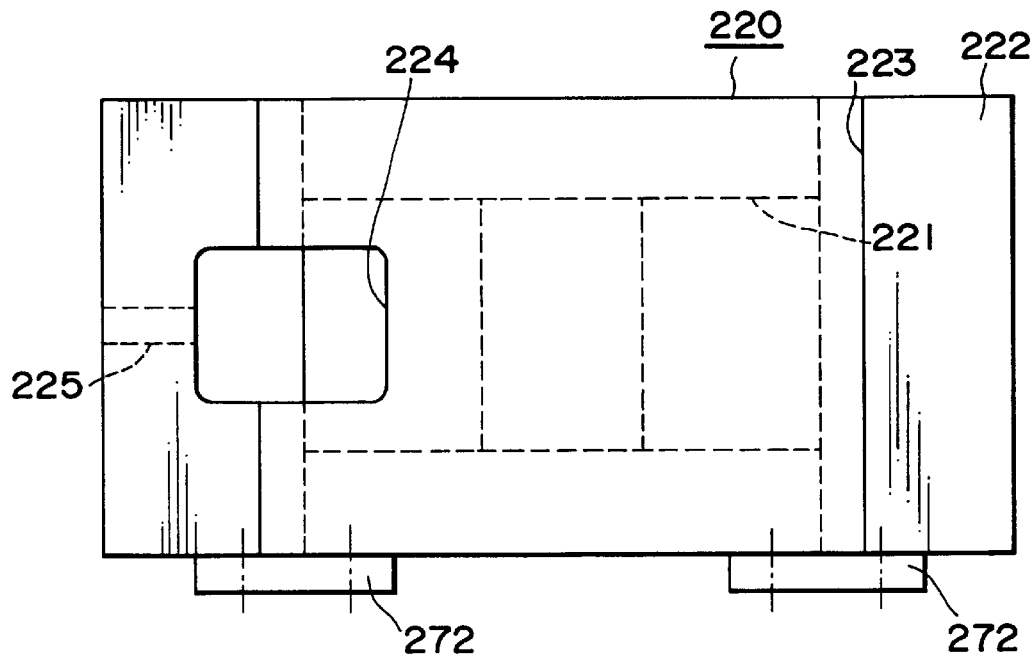
Figure 24:
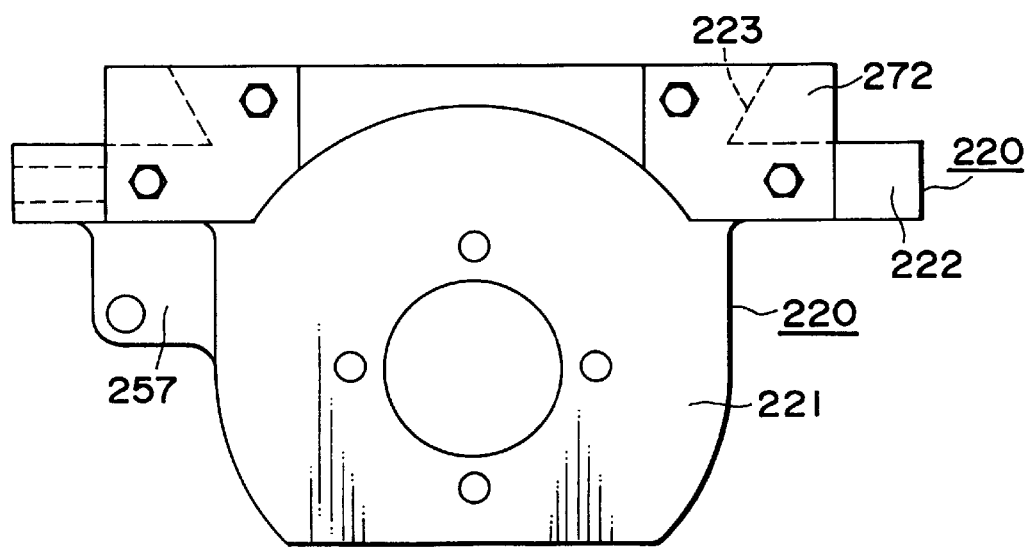
Figure 28:
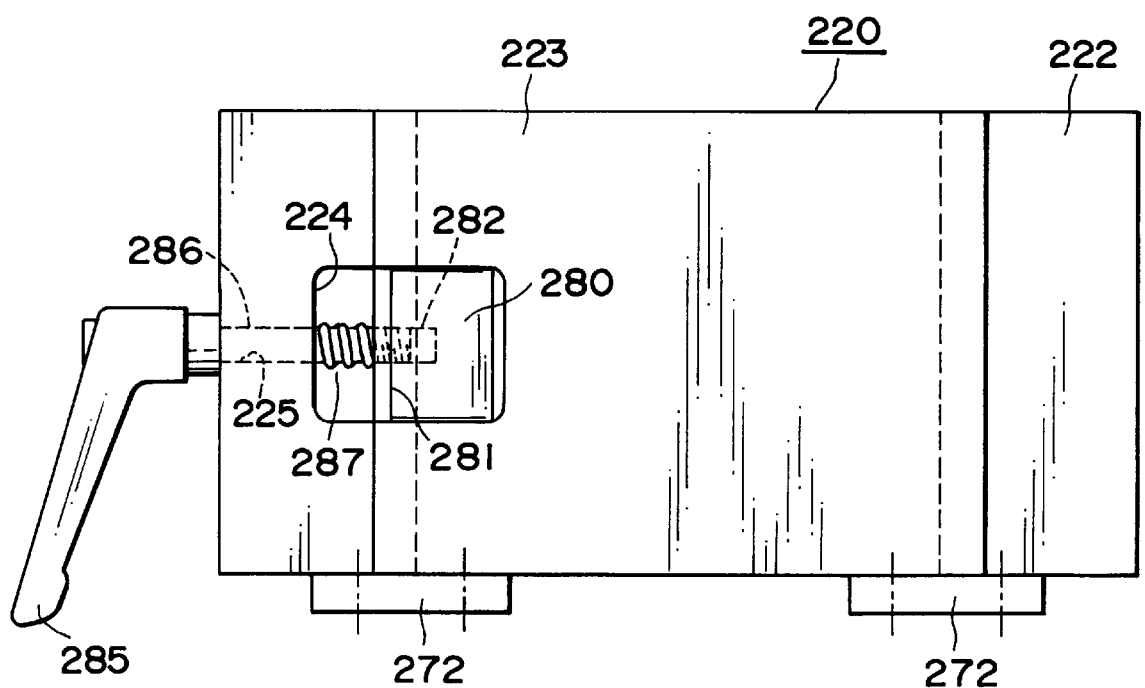
Figure 29:
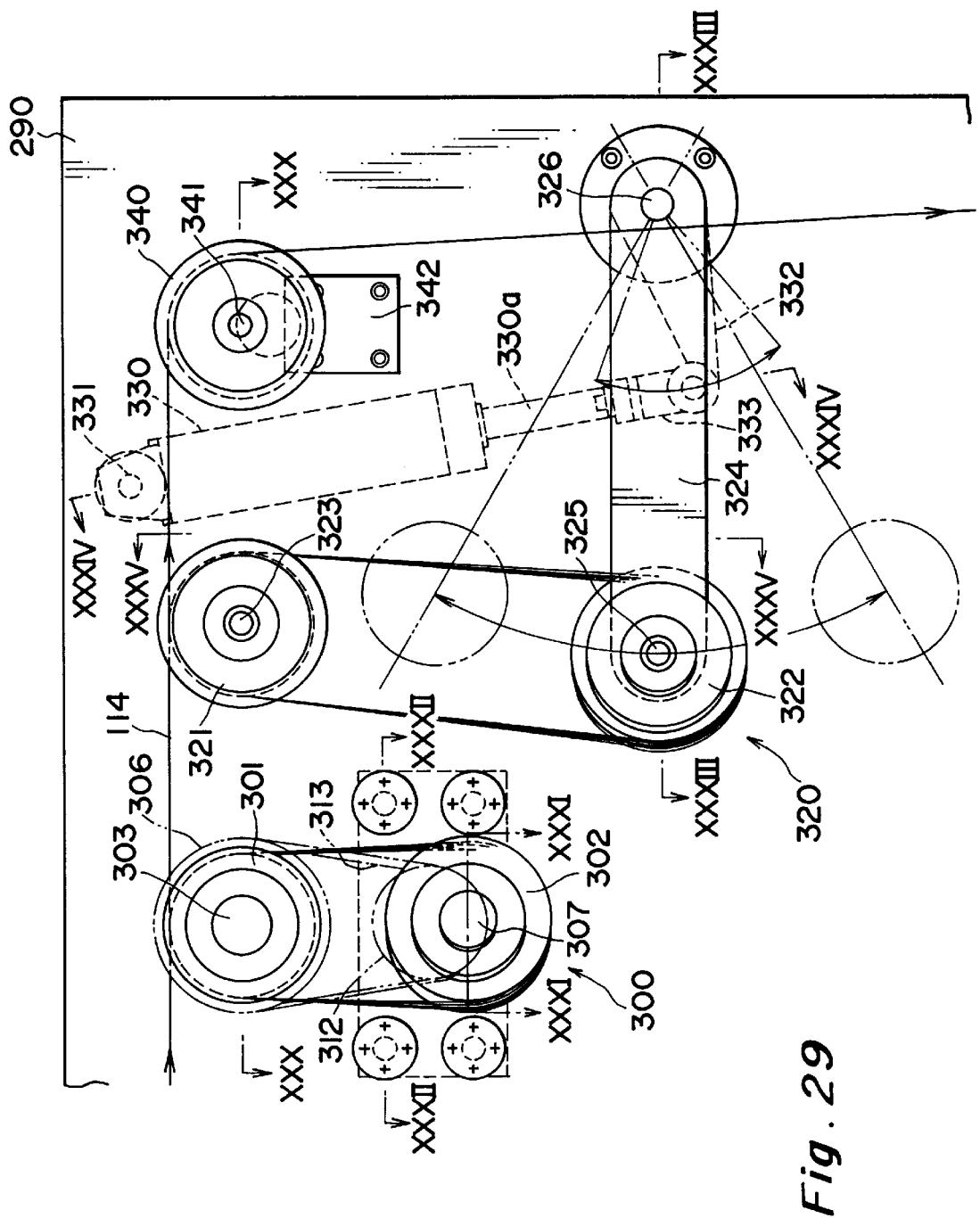
Figure 30:
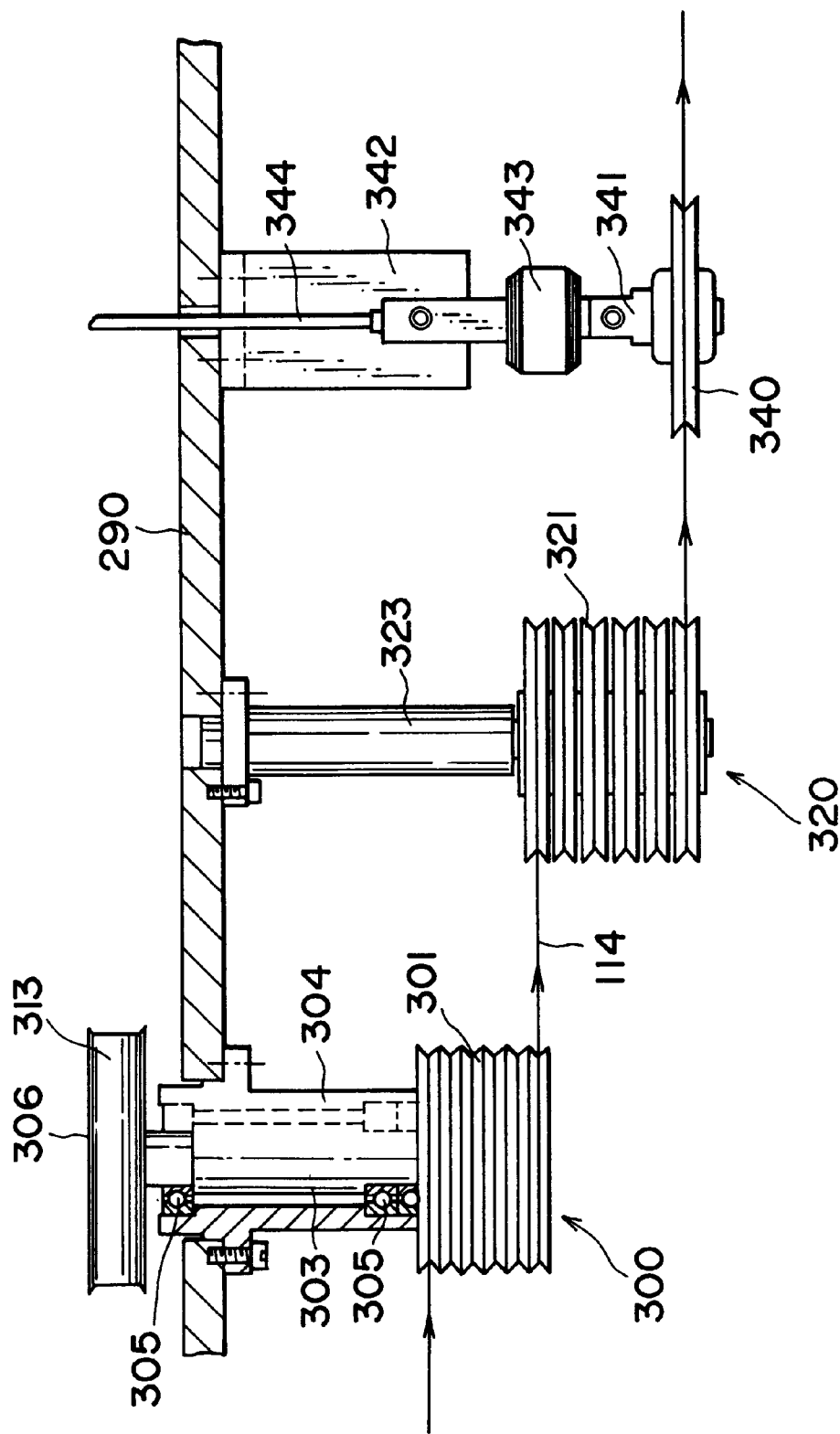
Figure 31:
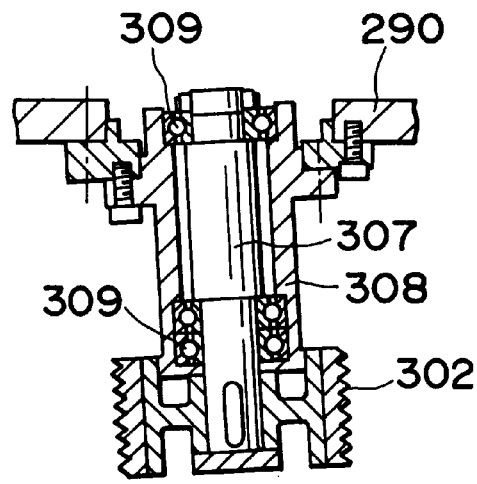
Figure 32:
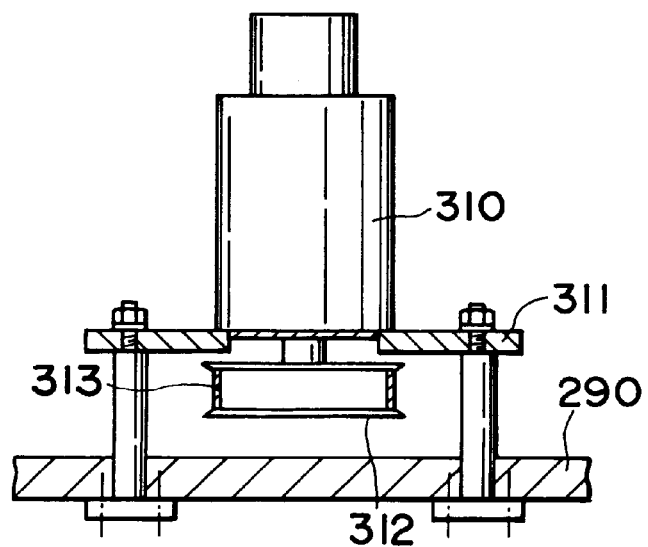
Figure 33:
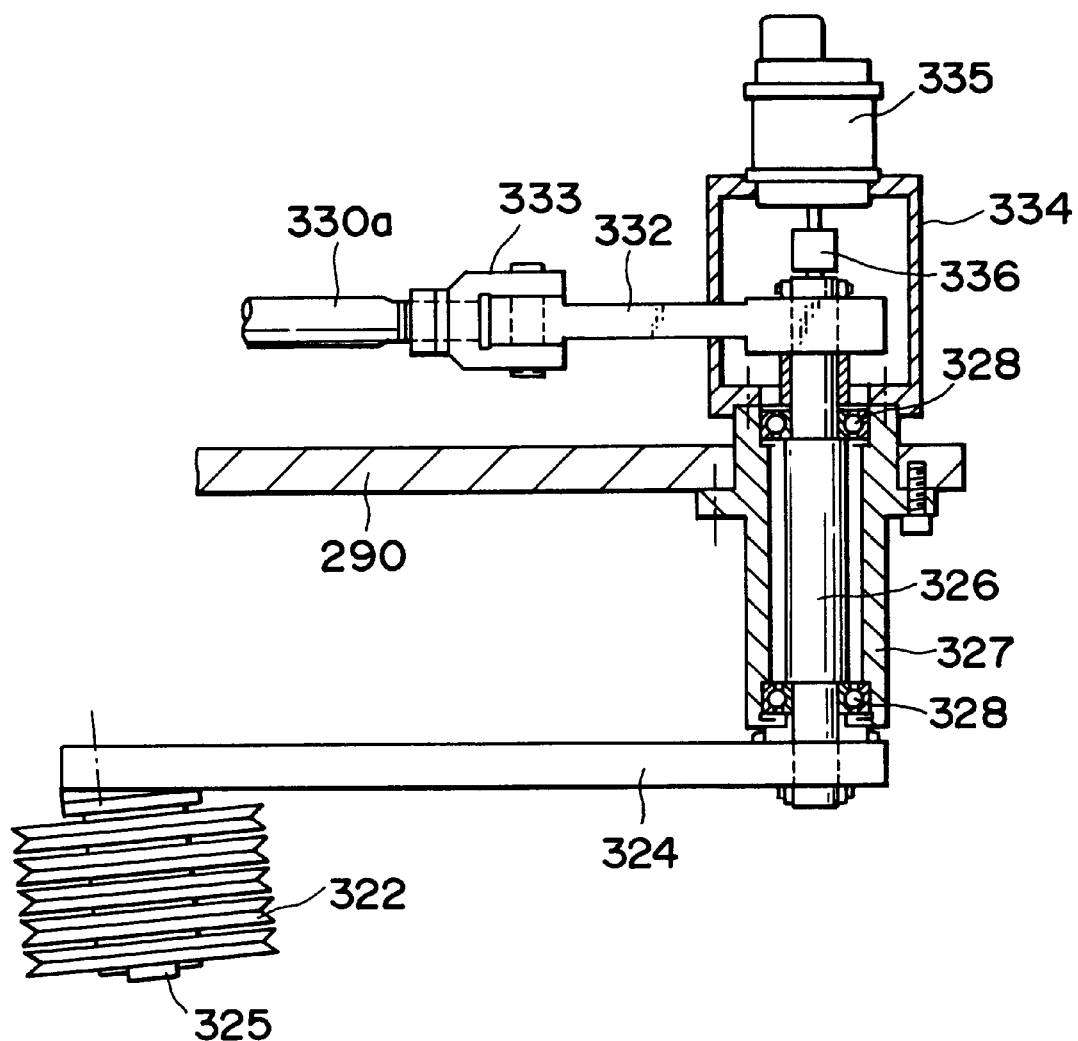
Figure 34:
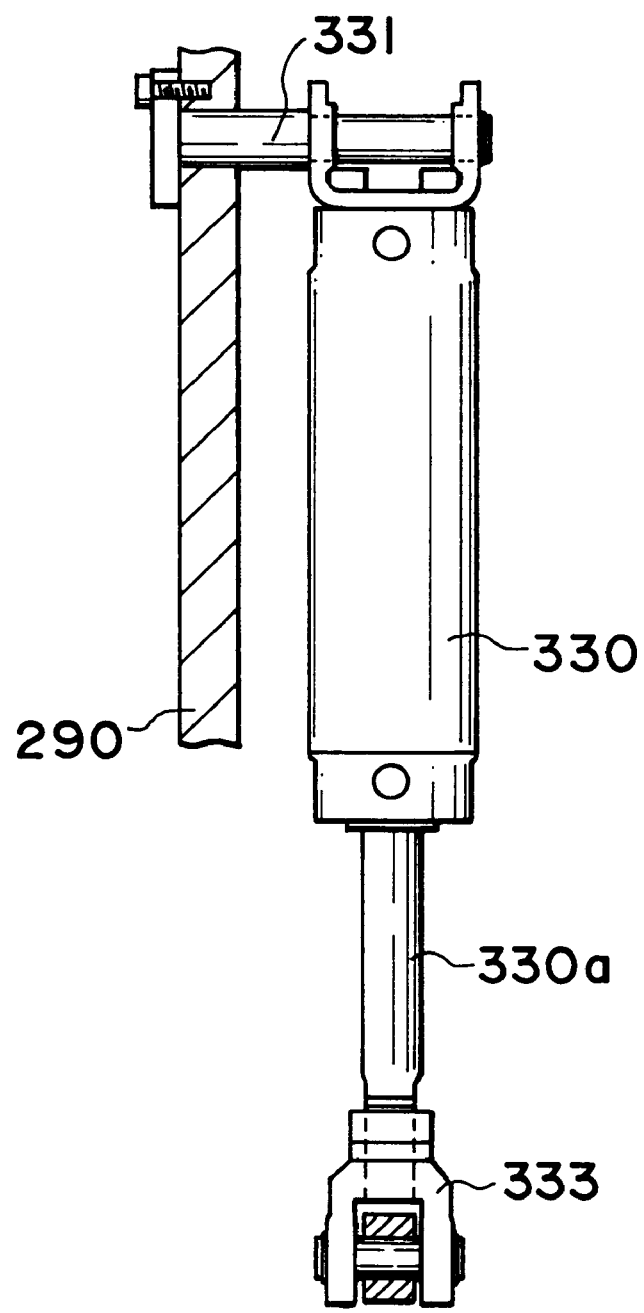
Figure 35:
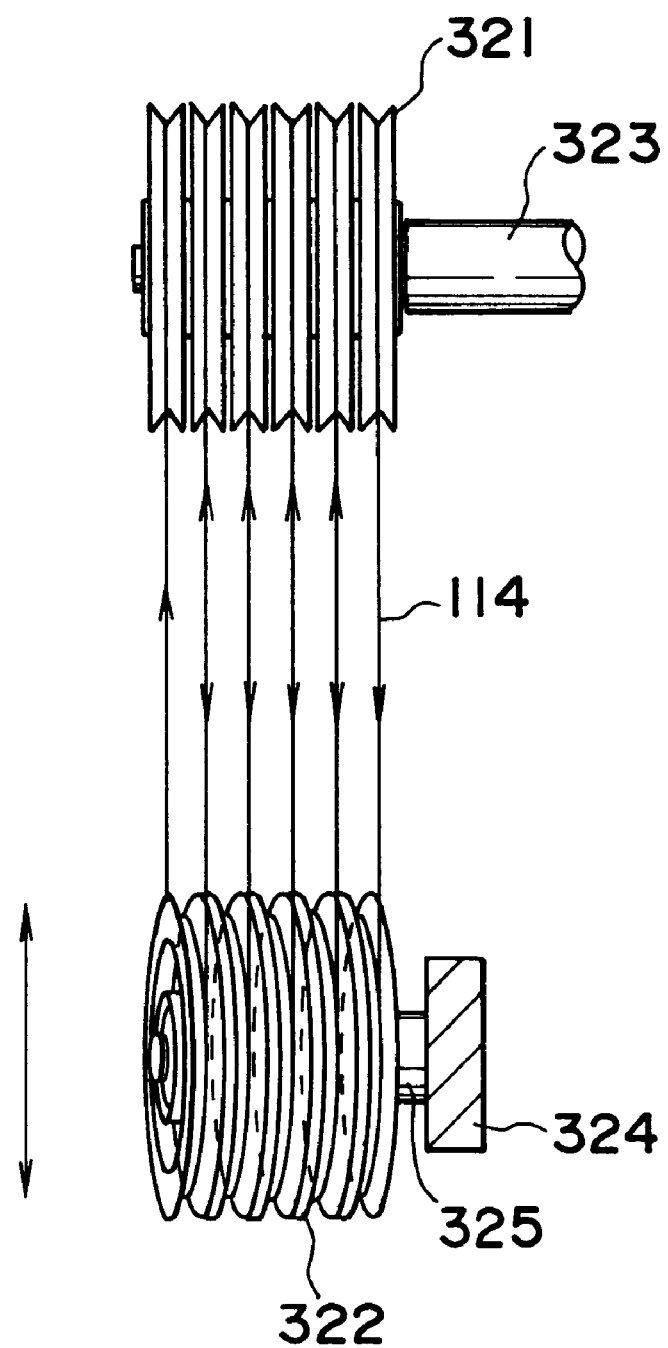

FIGS. 16 and 17 illustrate the structure of the workpiece feeding apparatus.

The workpiece feeding apparatus 170 is equipped with a moving body 171. Two rails 174 are attached in parallel to the lower side of the moving body 171 along the longitudinal direction of the moving body. Sliding mechanisms 173 are provided on the upper side (the side supporting the moving body) of a pedestal 172 secured to the base 120 by bolts and receive the rails 174 in a freely slidable manner. As a result, the moving body 171 is supported on the pedestal 172 so as to be free to move. A workpiece holder 190 is mounted on the forward end of the moving body 171. The details of the construction of the workpiece holder 190 will be described later.

A screw shaft 177 is freely rotatably supported by bearings 178, 179, which are provided on the pedestal 172, below the moving body supporting side of the pedestal 172. The screw shaft 177 extends along the traveling direction of the moving body 171 and is horizontally provided. A nut 176 is screwed onto the screw shaft 177 and is supported on a mounting member 175 so as to be free to turn. The mounting member 175 is secured to the lower side of the moving body 171. The moving body supporting side of the pedestal 172 is formed to have a groove 180, through which the mounting member 175 is passed, along the traveling direction of the moving body.

The aft end of the screw shaft 177 extends from the bearing 179 and projects rearwardly of the pedestal 172 and has a belt wheel 184 attached thereto. A driving motor 183 is secured to the pedestal 172 by a bracket. A belt wheel 181 is mounted on the shaft of the driving motor 183. A belt 182 is engaged with the two belt wheels 181 and 184.

Rotation of the motor 183 is transmitted to the screw shaft 177 through the belt wheel 181, the belt 182 and belt wheel 184, as a result of which the screw shaft 177 turns. Since the nut 176 travels along the screw shaft 177, the moving body 171 is advanced and retracted.

The forward portion of the moving body 171 projects toward the grooved roll unit from a window provided in a partitioning plate 188. A shielding plate 185 is provided so as to surround the projecting forward portion of the moving body 171. A circular shielding plate 187 is attached to the forward end of the moving body 171, and a bellows 186 is provided between the two shielding plates 185 and 187.

A linear encoder (not shown) which measures the amount of movement or position of the moving body 171 is provided. Reference is had to a feedback signal from the linear encoder to control the driving motor 183 in such a manner that the feed rate of the workpiece 109 matches a set value.

FIGS. 18 through 28 illustrate the details of the workpiece holder 190. The workpiece holder 190 is useful particularly in a case where the workpiece is single-crystal silicon or some other material which requires fine adjustment in the cutting direction. Since a single-crystal silicon rod has crystal orientation, it is required that the cutting direction of the rod be decided in relation to its crystal orientation (e.g. in a direction inclined by the gonio angle with respect to the crystal axis). The workpiece holder 190 rotates the held workpiece about the axis (indicated at M1 in FIG. 19) along the direction (horizontal) in which the workpiece is advanced and retracted and rotates the workpiece about the vertical axis (indicated at M2) that perpendicularly intersects the central axis of rotation M1, thereby making it possible to finely adjust the workpiece in two directions.

A supporting body 191 is secured by bolts to the distal end face of the moving body 171 of the workpiece feeding apparatus 170. The supporting body 191 has a cylindrical portion 192 and a flange portion 193 formed on one end of the cylindrical portion 192 as an integral part thereof. The inner peripheral surface 194 of the cylindrical portion 192 functions as a bearing or rotational guide for receiving and freely rotatably supporting a first rotary body 200, described next. The inner peripheral surface 194 defines a circle the center of which is the central axis of rotation M1.

The first rotary body 200, which has a somewhat complicated configuration, itself rotates about the central axis of rotation M1 and freely rotatably supports a second rotary body 210, described later. That is, the first rotary body 200 has a cylindrical shaft portion 201 which fits snugly in freely rotatable fashion into the inner peripheral surface 194 of the cylindrical portion 192 of supporting body 191, a support portion 202 connected to the shaft portion 201 for freely rotatably supporting the second rotary body 210, and an outwardly projecting flange 203 at a position between the shaft portion 201 and the support portion 202. The support portion 202 has two support pieces 202a, one above the other, each of which is provided with a circular hole 204 for accepting the second rotary body 210. The inner peripheral surface of the hole 204 functions as a bearing or rotational guide for freely rotatably supporting the second rotary body 210. The center of the circular hole 204 is the central axis of rotation M2. The central axes of rotation M1 and M2 perpendicular intersect at a position between the two support pieces 202a.

The shaft portion 201 of the first rotary body 200 is fitted into the cylindrical portion 192 of the supporting body 191 and the first rotary body 200 is supported so as to be free to rotate about the central axis of rotation M1. The flange 203 of the first rotary body 200 is in contact with the flange 193 of the supporting body 191. The flange 203 of the first rotary body 200 is provided with a plurality of oblong holes 205 at equal angular intervals. Fixing bolts 206 passed through the oblong holes 205 are screwed into the flange 193 of the supporting body 191 via washers. If the bolts 206 are fastened tightly, the first rotary body 200 is secured to the supporting body 191. When the bolts 206 are loosened, the first rotary body 200 is capable of being rotated within the limits of the oblong holes in the longitudinal direction thereof. A mechanism for turning the first rotary body 200 through small increments will be described later.

The second rotary body 210 is composed of two rotary body portions 211 and 212 joined by a workpiece holding member 220. The two rotary body portions 211 and 212 are identical in shape except for the fact that the rotary body portion 211 is provided with oblong holes 217. In regard to one of the rotary body portions, namely the rotary body portion 211, this is constituted by a cylindrical shaft portion 213 and a flange 214 formed on one end of the shaft portion 213. The shaft portion 213 is fitted snugly and in a freely rotatable fashion in the circular hole 204 of the upper support piece 202a of the first rotary body 200. Similarly, the other rotary body portion 212 is constituted by a cylindrical shaft portion 215 and a flange 216 and the shaft portion 215 is fitted snugly and in a freely rotatable fashion in the circular hole 204 of the lower support piece 202a of the first rotary body 200.

The workpiece holding member 220 is constituted by a substantially cylindrical (wall thickness differs depending upon the location) connecting portion 221 and a holding portion 222 elongated in the transverse direction. The connecting portion 221 is situated between the two rotary body portions 211, 212. The two rotary body portions 211 and 212 are secured to the connecting portion 221 of the workpiece holding member 220 by bolts. The flanges 214, 216 of the rotary body portions 211, 212 contact the upper and lower surfaces of the support piece 202a of the first rotary body 200. The two rotary body portions 211 and 212 are thus united and are supported on the first rotary body 200 so as to be free to rotate.

The flange 214 of the upper rotary body portion 211 is provided with the plurality of oblong holes 217 at equal angular intervals. Fixing bolts 218 passed through the oblong holes 217 are screwed into the support piece 202a of the first rotary body 200 via washers. Fastening the bolts 218 tightly secures the second rotary body 210 to the first rotary body 200. If the bolts 218 are loosened, the second rotary body 210 is will be free to rotate about the central axis of rotation M2. A mechanism for turning the second rotary body 210 through small increments will be described later.

A mechanism 240 for rotating the first rotary body 200 will now be described. Secured to the supporting body 191 is an arm 241 extending outwardly in the horizontal direction. A feed nut 242 is held on the distal end of the arm 241 so as to be free to rotate. A screw 243 is screwed into the nut 242. A mounting piece 244 is secured to the circumferential side face of the flange 203 of the first rotary body 200. One end of a link is pivotally attached to the end of the screw 243 not screwed into the nut 242, and the other end of the link is pivotally attached to the mounting piece 244. The circumferential surface of the nut 242 is provided at several locations with holes 246 into which a rotation aiding tool such as a wrench is inserted.

If the wrench is inserted into a hole 246 and the nut 242 is turned with the fixing bolts 206 being in the loosened state, the screw 243 will advance or retreat within the nut 242, depending upon the direction in which the nut 242 is turned. Since this advancing and retreating movement of the screw 243 is transmitted to the flange 203 of the first rotary body 200 through the link 245 and mounting piece 244, the first rotary body 200 rotates about the central axis of rotation M1. If the bolts 206 are tightened when the first rotary body 200 has attained a desired rotational position, the first rotary body 200 will be fixed at this rotational position. A scale plate 247 is secured to the outer circumferential surface of the flange 193 of the supporting body 191 (or graduations are cut into the outer circumferential surface), and an index marker 248 is cut into or noted on the outer circumferential of the flange 203 of the first rotary body 200 at a position corresponding to the scale 247. The rotational angle or angular position of the first rotary body 200 can be ascertained by the scale 247 and index mark 248.

A mechanism 250 which rotates the second rotary body 210 will now be described. The side portions of the upper and lower support pieces 202a of the first rotary body 200 are provided with outwardly projecting respective flanges 251. A vertical mounting member 252 is attached to the upper and lower flanges 251 at a position between them by bolts 253, which are freely rotatably passed through the flanges 251, so as to be capable of rotating about a vertical axis. The center of the mounting member 252 is provided with a hole 254. A rotating operating rod 255 is rotatably through the hole 254. The rod 255 cannot be advanced or retracted within the hole 254. One end of the rod 255 is provided with a knob 256 and the other end of the rod has threads 255a. The workpiece holding member 220 also is provided with upper and lower flanges 257, and a vertical member 258 is attached to the upper and lower flanges 257 at a position between them by bolts 259, which are freely rotatably passed through the flanges 257, so as to be capable of rotating about a vertical axis. The member 258 is formed to have female threads with which the threads 255a of the rod 255 are threadedly engaged.

If the knob 256 is turned with the fixing bolts 218 being in the loosened state, the threads 255a of the rod 255 advance or retreat in the female threads of the member 258. As a result, the second rotary body 210 integrated with the workpiece holding member 220 rotates about the central axis of rotation M2. If the bolts 218 are tightened when the second rotary body 210 has attained a desired angular position, the second rotary body 210 will be fixed at this rotational position. If the workpiece holding member 220 (or the second rotary body 210 if desired) is provided with a scale plate 260 and the first rotary body 200 is provided with an index mark 261 at a position corresponding to the scale plate, the rotational angle or angular position of the second rotary body 210 can be ascertained.

A workpiece mount 270 is attached to the workpiece holding member 220 by a dovetail structure in such a manner that the mount is free to be attached and detached. The holding portion 222 of the workpiece holding member 220 is formed to have a vertically extending dovetail 223. The workpiece mount 270 is formed to have a dovetail groove 271 corresponding to the dovetail. It is so arranged that the dovetail 223 is inserted into the dovetail groove 271 so that the workpiece mount 270 will be attached to the holding portion 222 of the workpiece holding member 220. A stopper 272 is secured to the lower end face of the holding portion 222 of workpiece holding member 220 by bolds. The workpiece mount 270 is received by the stopper 272.

The holding portion 222 of the workpiece holding member 220 is provided with a window 224 at a location reaching one side portion of the dovetail 223. A hole 225 is provided in one end face of the holding portion 222 so as to communicate with the window 224.

The interior of the window 224 contains a tightening piece 280 having a dovetail 281 that corresponds to the dovetail 223. The tightening piece 280 is formed to have a screw hole 282. A handle 285 has a shaft 286 freely rotatably passed through the hole 225 of the holding portion 222 of workpiece holding member 220. The distal end of the shaft 286 is formed to have male threads. The male threads are threadedly engaged with the screw hole 282 of the tightening piece 280. A push spring 287 is wound about the shaft 286 of the handle 285 between the tightening piece 280 and the side of the window 224, whereby the tightening piece 280 is biased away from the handle 285.

By turning the handle 285 to screw its shaft 286 into the screw hole 282 of the tightening piece 280, the tightening piece 280 moves in the direction toward the handle 285 and the dovetail 281 thereof comes into strong abutting contact with the dovetail groove 271 of the workpiece mount 270 so that the workpiece mount 270 is firmly secured to the workpiece holding member 220.

The workpiece 109 is attached to the workpiece mount 270 as by bonding via mounting piece 273.

Thus, as described above, the workpiece holder 190 is such that the first rotary body 200 is attached to the supporting body 191, which is secured to the moving body 171, so as to be free to rotate about the horizontal axis M1, and the second rotary body 210 is supported on the first rotary body 200 so as to be free to rotate about the vertical axis M2. Moreover, the horizontal axis of rotation M1 and the vertical axis of rotation M2 intersect perpendicularly. The workpiece holding member 220 is secured to the second rotary body 210. Accordingly, the orientation of the workpiece 109 can be finely adjusted in two directions and with a high degree of rigidity, thus making it possible to hold the workpiece firmly.

(5) Capstan mechanism and dancer mechanism

FIGS. 29 through 35 illustrates the capstan mechanism 300, the dancer mechanism 320 on the take-up side and the sheave 340.

The dancer mechanism 320 on the take-up side will be described first. The dancer mechanism 320 includes the stationary roll 321 and the dancer roll 322, as mentioned above.

The stationary roll 321 is constituted by a plurality of sheaves provided on a support shaft 323 so as to be free to turn. The support shaft 323 is secured perpendicularly to a vertical supporting wall 290.

The dancer roll 322 is mounted on the distal end of the arm 324. The dancer roll 322 also is constituted by a plurality of sheaves provided on a support shaft 325 so as to be free to turn. The support shaft 325 is horizontal and is secured to an arm 324 obliquely when viewed from above with the vertical supporting wall 290 serving as a reference.

As described above, the saw wire 114 is engaged with and passed back and forth between the stationary roll 321 and dancer roll 322 successively from a V-shaped groove (sheave) of the stationary roll 321 to a V-shaped groove (sheave) of the dancer roll 322, from a groove of the dancer roll 322 to a groove of the stationary roll 321, and so on. The support shaft 325 of the dancer roll 322 is skewed with respect to the support shaft 323 of the stationary roll 321 by an amount equivalent to one pitch of the roll grooves. As a result, the saw wire 114 is engaged so as to be in correct alignment with each groove of the rolls 321, 322 (i.e. in such a manner that all turns of the saw wire 114 travel vertically and in parallel with one another when viewed from the side) (see FIG. 35 in particular).

By virtue of this arrangement, the saw wire 114 travels stably along the grooves (V-shaped grooves) of the rolls 321, 322. In addition, the tension of the saw wire 114 is stabilized so that high-speed operation is possible. A further effect is that wear of the rolls 321, 322 is reduced, thereby prolonging the life of the rolls.

The base end of the arm 324 is fixedly attached to a rotary shaft 326. A holding cylinder 327 is erectedon the supporting wall 290 and the rotary shaft 326 is passed through the interior of the holding cylinder 327 and freely rotatably received in a bearing 328 provided within the holding cylinder 327. The rotary shaft 326 protrudes from the rear side of the supporting wall 290.

An air cylinder 330 is mounted by a shaft 331 on the rear side of the supporting wall 290 at its base end so as to be free to swing. One end of a link 332 is fixedly attached to the rotary shaft 326 projecting from the rear side of the supporting wall 290. The other end of the link 332 and the distal end of a piston rod 330a of the air cylinder 330 are connected by a joint 333 so as to be free to rotate.

Accordingly, by driving the air cylinder 330 to advance or retract its piston 330a, the arm 324 is swung about the rotary shaft 326 to change the height of the dancer roll 322. As described above, the air cylinder 330 is controlled by the electropneumatic converter 487 in such a manner that the tension sensed by the tension sensor 343 inclusive of the load cell will become equal to a set value.

The height of the dancer roll 322 is thus adjusted by the air cylinder 330. As a result, even if the set tension is changed at will, the tension on the take-up side can be controlled to follow up this change, thus making it possible to change the tension continuously (i.e. not in stages). It is also possible to change the set tension while the saw wire is traveling. Even if the position of the dancer roll changes, a fluctuation in tension is small because the rod of the air cylinder exhibits a very small inertia.

The attitude of the air cylinder 330 is not limited to the substantially vertical attitude as illustrated and may be inclined or horizontal. The arm 324 can be driven to swing continuously even if a servomotor and speed reducing mechanism are used instead of the air cylinder.

The synchro generator 335 is provided on the rear side of the supporting wall 290 via a mounting member 334. The synchro generator 335 has a shaft connected to the rotary shaft 326 by a coupling 336. As a result, the angle of rotation of the rotary shaft 326, i.e. the swing angle of the arm 324, and the height of the dancer roll 322 are detected by the synchro generator 335. The detection signal from the synchro generator 335 is used in controlling the amount of rotation of the take-up bobbin 550 (the amount of take-up) so that the height of the dancer roll 322 is held substantially constant at all times, as described earlier.

The capstan mechanism 300 includes the two stationary rolls 301 and 302. The upper stationary roll 301 is fixedly mounted on a rotary shaft 303. A holding cylinder 304 is erected on the supporting wall 290. The rotary shaft 303 is passed through the interior of the holding cylinder 304 and is freely rotatably received by a bearing 305 provided inside the holding cylinder 304. A belt wheel 306 is secured to a portion of the rotary shaft 303 protruding from the rear side of the supporting wall 290. The rotary shaft 303 is perpendicular to the supporting wall 290.

The lower stationary roll 302 also is secured to a rotary shaft 307. The rotary shaft 307 is freely rotatably received in a holding cylinder 308, which is provided on the supporting wall 290, via a bearing 309. The rotary shaft 307 is horizontal and skewed with respect to the supporting wall 290.

The two stationary rolls 301 and 302 are formed to have a plurality of V-shaped grooves with which the saw wire 114, extending between both rolls 301 and 302, is engaged successively. Since the lower stationary roll 302 is provided in skewed fashion in the capstan mechanism 300 as well, the saw wire 114 travels in parallel with the wall surface of the supporting wall 290 and is in correct alignment with the V-shaped grooves of the rolls 301, 302. Travel of the saw wire 114 is stabilized as a result.

The servomotor 310 is mounted on the rear side of the supporting wall 290 via a mounting member 311. The motor 310 has a shaft to which a belt wheel 312 is secured. A belt 313 is engaged with the two belt wheels 306 and 312. The upper stationary roll 301 is driven by the motor 310. As mentioned above, the drive of motor 310 is controlled in such a manner that equality is established between a set value and tension sensed by the tension sensor 482 which includes the load cell, whereby tension on the exit side of the grooved roll group is held substantially constant at all times.

More specifically, in intermittent two-way travel of the saw wire 114, the motor 310 rotates in a direction (the forward direction) in which it tensions the saw wire 114 traveling in the forward direction. As a result, the tension on the exit side of the grooved roll group is enlarged and the tension on the side of the take-up bobbin 550 declines. The motor 310 continues to rotate in the forward direction in the same manner even during travel of the saw wire 114 in the reverse direction. As a result, the motor 310 acts as a brake, the tension on the side of the grooved roll group remains high and the tension on the side of the take-up bobbin 550 remains low. Since the tension of the saw wire 114 taken up on the take-up bobbin 550 (travel in the forward direction) or paid out by the take-up bobbin 550 is kept comparatively low, the take-up bobbin 550 prepared need not be very strong and use of a comparatively inexpensive take-up bobbin is possible. The rotating speed of the motor 310 may be held constant at all times or may be varied in forward travel and reverse travel of the saw wire 114.

A brake and clutch may be provided between the belt wheel 312 and motor 310. By releasing the brake and applying the clutch during forward travel of the saw wire 114, the saw wire 114 is tensioned by the rotating force of the motor 310. Applying the brake and releasing the clutch during reverse travel applies breaking to the travel of the saw wire 114.

The sheave 340 is supported on a shaft 341 so as to be free to rotate. A bracket 342 is secured to the supporting wall 290 and is provided with the tension sensor 343 which includes the load cell. The shaft 341 is attached to the load cell 343. By virtue of this arrangement, the tension that acts upon the sheave 340 is sensed by the tension sensor 343. The tension sensed by the tension sensor 343 is applied to the tension controller 486 through a signal line 344 and is used in controlling the air cylinder 330. This is as described above. The other tension sensors 481, 482 inclusive of load cells also are mounted in the same manner as the tension sensor 343 and sense the tensions that act upon the corresponding sheaves.

FIGS. 36 through 39 illustrate the dancer mechanism 350 and the length measuring unit 370, on the delivery side, included in the saw wire delivery mechanism.

The dancer mechanism 350 on the delivery side also includes a stationary roll 351 and a dancer roll 352.

The stationary roll 351 is composed of a plurality of sheaves provided on a support shaft 353 so as to be free to rotate. The support shaft 353 is secured to the vertically supporting wall 290 so as to perpendicularly intersect the same.

The dancer roll 352 is mounted on the distal end of the arm 354. The dancer roll 352 also is composed of a plurality of sheaves provided on a support shaft 355 so as to be free to rotate. The support shaft 355 is horizontal and is secured to an arm 354 obliquely when viewed from above with the vertical supporting wall 290 serving as a reference.

The saw wire 114 is passed back and forth between the stationary roll 351 and dancer roll 352 and is successively engaged with the grooves (V-shaped grooves) thereof. The support shaft 355 of the dancer roll 352 is skewed with respect to the support shaft 353 of the stationary roll 351 by an amount equivalent to one pitch of the roll grooves. As a result, in a manner the same as that of the dancer mechanism 320 on the take-up side, the saw wire 114 is engaged so as to be in correct alignment with each groove of the rolls 351, 352 (i.e. in such a manner that all turns of the wire saw 114 travel vertically and in parallel with one another when viewed from the side). By virtue of this arrangement, the saw wire 114 travels stably along the grooves of the rolls 351, 352.

The base end of the arm 354 is fixedly attached to a rotary shaft 356. A holding cylinder 357 is erected on the supporting wall 290 and the rotary shaft 356 is passed through the interior of the holding cylinder 357 and freely rotatably received in a bearing 358 provided within the holding cylinder 357. The rotary shaft 356 protrudes from the rear side of the supporting wall 290.

An air cylinder 360 is mounted by a shaft 361 on the rear side of the supporting wall 290 at its base end in a substantially horizontal attitude so as to be free to swing. One end of a link 362 is fixedly attached to the rotary shaft 356 projecting from the rear side of the supporting wall 290. The other end of the link 362 and the distal end of a piston rod 360a of the air cylinder 360 are connected by a joint 363 so as to be free to rotate.

Accordingly, by driving the air cylinder 360 to advance or retract its piston rod 360a, the arm 354 is swung about the rotary shaft 356 to change the height of the dancer roll 352. As described above, the air cylinder 360 is controlled by the electropneumatic converter 484 in such a manner that the tension sensed by the tension sensor 481 which includes the load cell will become equal to a set value.

The height of the dancer roll 352 is thus adjusted by the air cylinder 360. As a result, tension can be changed continuously (i.e. not in stages) even during travel of the saw wire in a manner the same as that in the dancer mechanism 320 on the take-up side. In particular, even if the tension of the wire extending from the delivery bobbin 540 changes owing to winding disorder on the delivery bobbin 540 on the delivery side, the tension at the entrance to the grooved roll group is held constant at all times owing to a change in the position of the dancer roll 352 due to feedback control.

The synchro generator 365 is provided on the rear side of the supporting wall 290 via a mounting member 364. The synchro generator 365 has a shaft connected to the rotary shaft 356 by a coupling 366. As a result, the angle of rotation of the rotary shaft 356, i.e. the swing angle of the arm 354, and the height of the dancer roll 352 are detected by the synchro generator 365. The detection signal from the synchro generator 365 is used in controlling the amount of rotation of the delivery bobbin 540 (the amount of delivery) so that the height of the dancer roll 352 is held substantially constant at all times, as described earlier.

The length measurement unit 370 includes the two sheaves 371, 372 engaged by the saw wire 114. The sheath 371 is secured to the distal end of a rotary shaft 373. The latter is received in a support cylinder 374, which is erected on the supporting wall 290, by a bearing 375 so as to be free to rotate. Vanes 376 are secured to the end of the rotary shaft 373 that protrudes from the rear of the supporting wall 290 and are sensed by a photoelectric sensor 377 attached to the supporting wall 290. Accordingly, a signal conforming to the amount of rotation of the sheave 371 is output from the photoelectric sensor 371 and the length of the saw wire 114 that has been paid out is calculated based upon this signal.

The other sheave 372 is freely rotatably provided on a support shaft attached to the supporting wall 290. This support shaft is biased away from the sheave 371. As a result, the wire 114 between the sheaves 371 and 372 is kept taut at all times to make accurate measurement of length possible.

(6) Traverse mechanism

Figure 40:
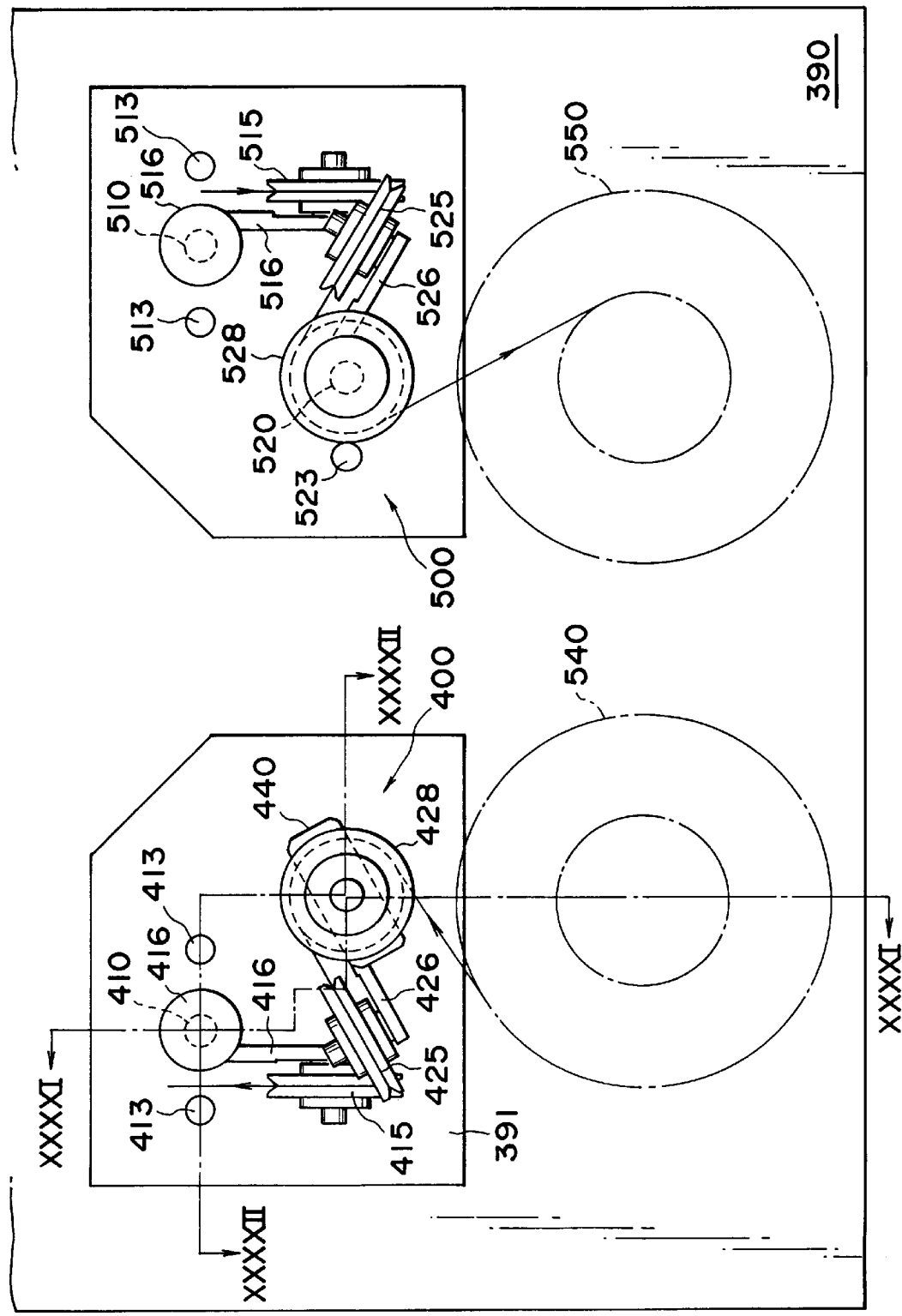
Figure 41:
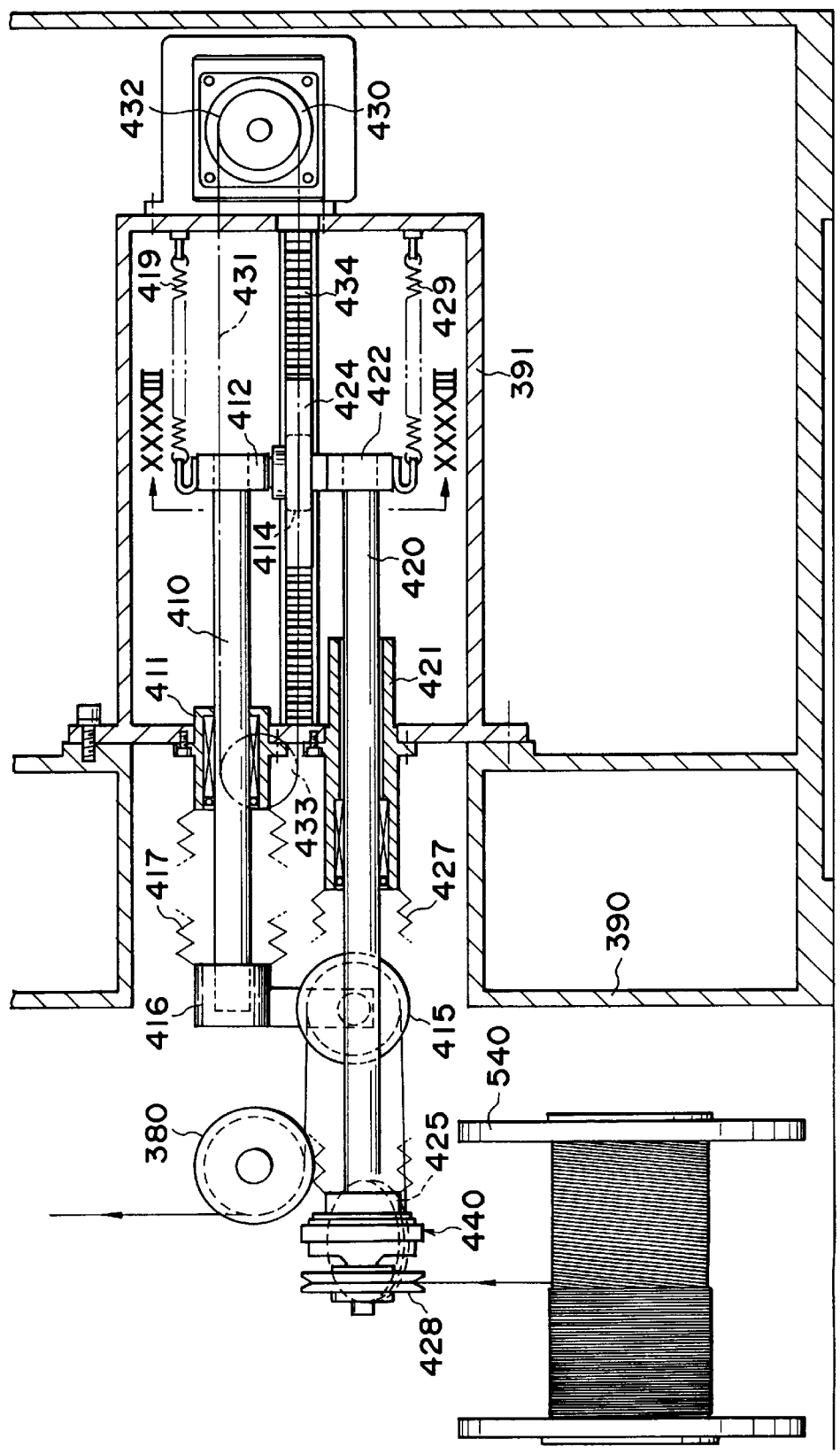
Figure 42:
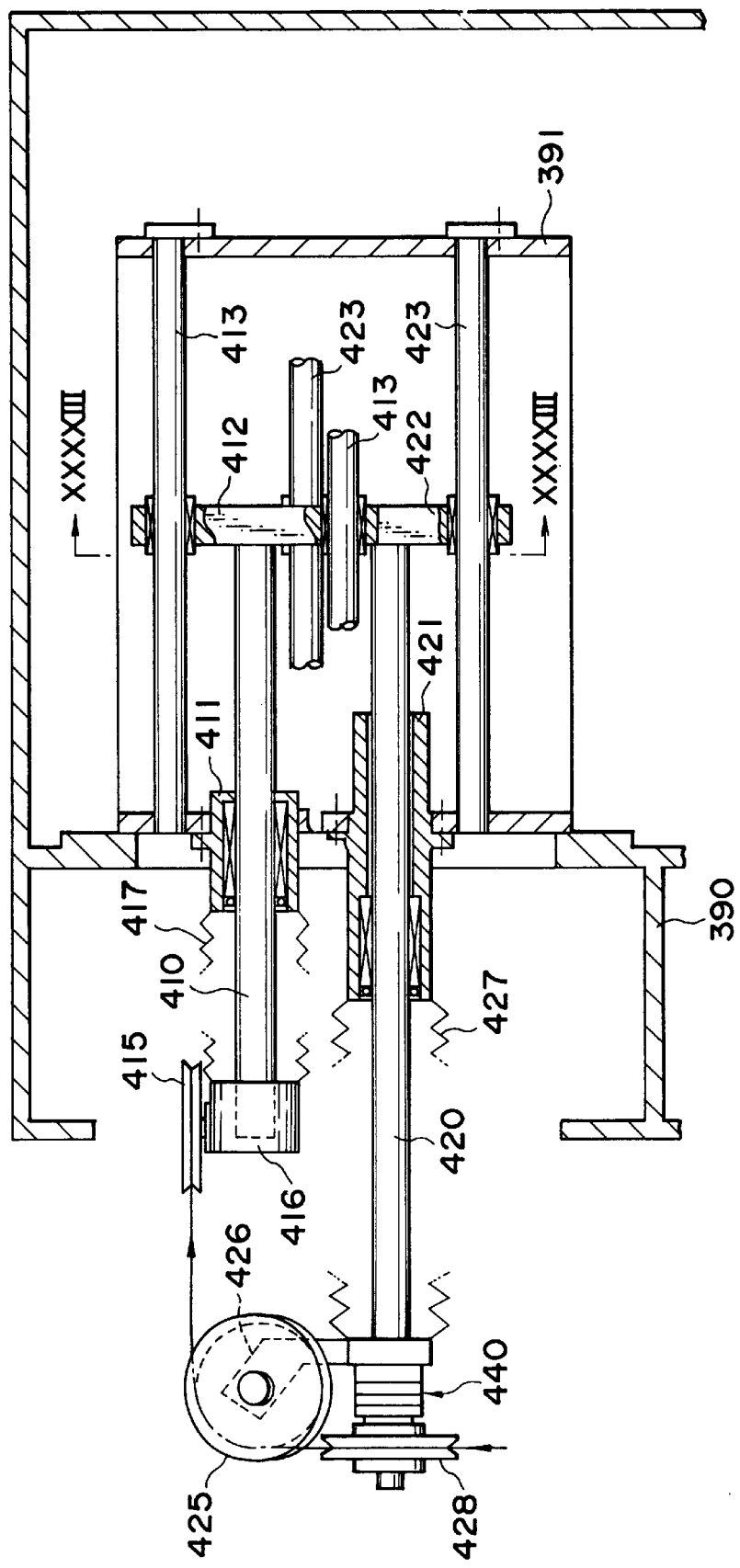
Figure 43:
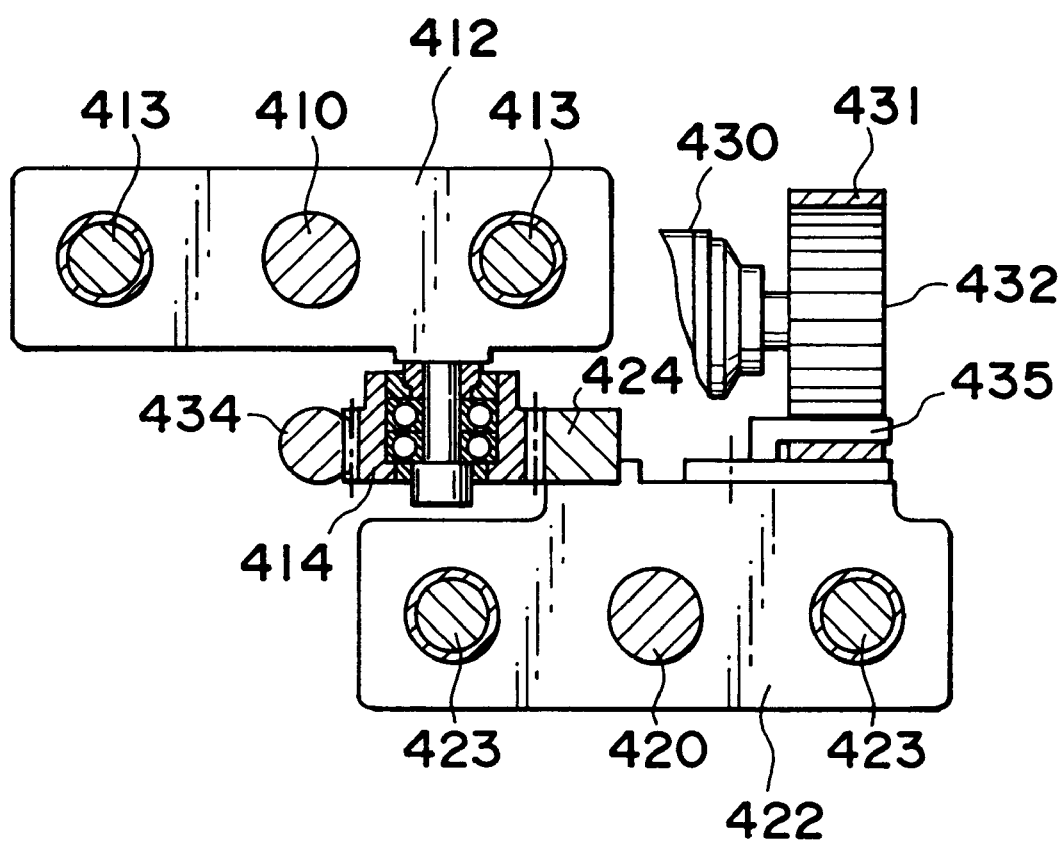
Figure 44:
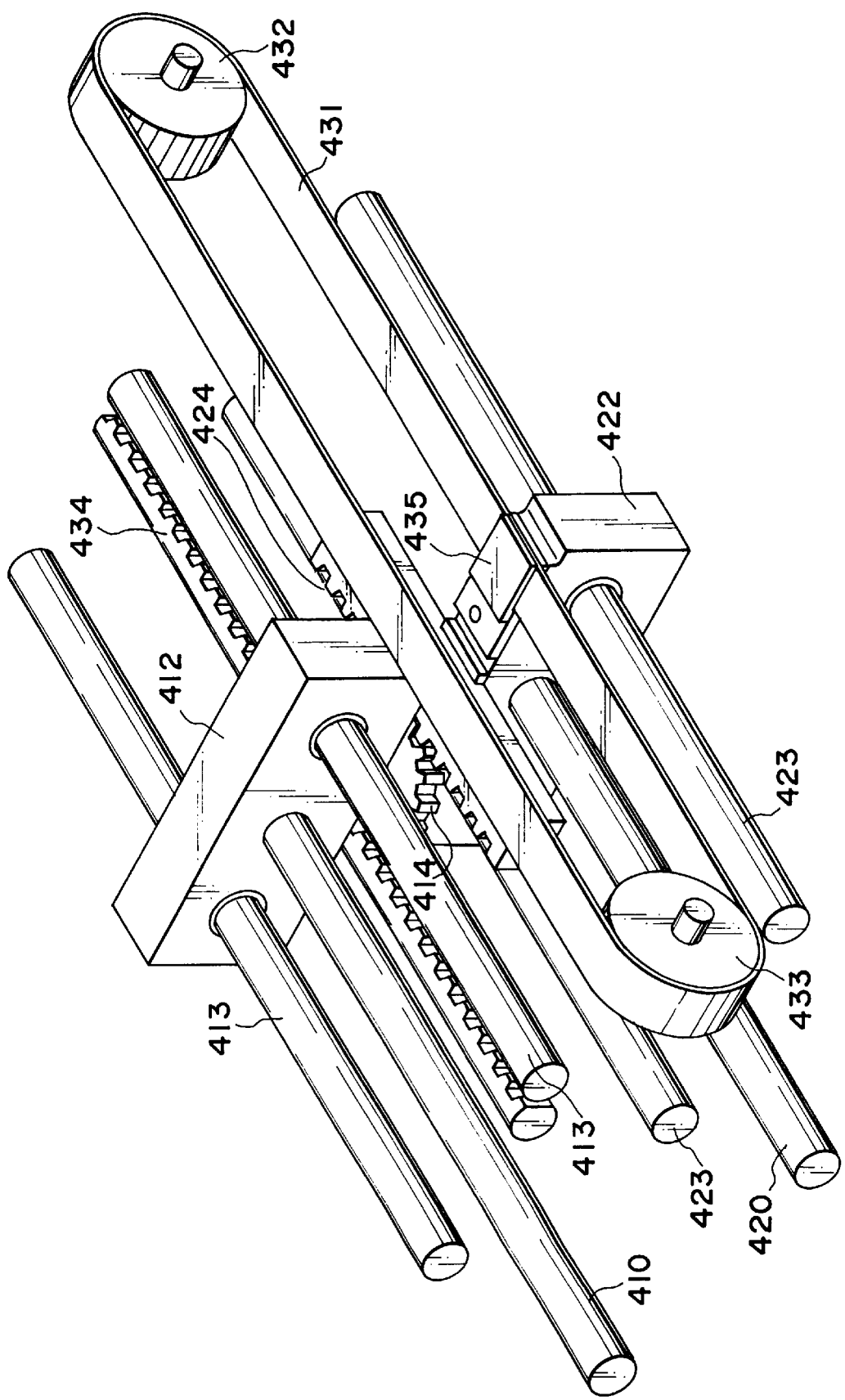

A front view of the traverse mechanism 400 on the delivery side and of the traverse mechanism 500 on the take-up side is depicted in FIG. 40. As will be understood from the drawing, the two traverse mechanisms basically have left-right symmetry in terms of structure and differ only in that a traverse sheave 428 of the traverse mechanism 400 on the delivery side is provided with the winding direction sensor 440 inclusive of a load cell. A traverse sheave 528 of the traverse mechanism 500 on the take-up side is not provided with a winding direction sensor. Accordingly, reference will be had to FIGS. 40 through 44 to describe the construction of the traverse mechanism on the delivery side.

The traverse mechanism 400 on the delivery side includes two movable shafts 410 and 420. The movable shafts 410, 420 pass through holding cylinders 411, 421, which include bearings, so as to be free to slide. The holding cylinders 411, 421 are provided on a traverse mechanism frame 391 attached to a machine frame 390 of the wire-type slicing machine. Blocks 412, 422 are secured to the aft ends of the movable shafts 410, 420, respectively. The blocks 412, 422 are each provided with holes on both sides and parallel guide shafts 413, 423 are passed through respective ones of the holes. The blocks 412, 422 are free to slide along the respective guide shafts 413, 423. Both ends of the guide shafts 413, 423 are secured to the frame 391. Accordingly, the movable shafts 410, 420 are supported so as to be free to slide horizontally along the guide shafts 413, 423 while being guided by the respective holding cylinders 411, 421 and guide shafts 413, 423. The blocks 412, 422 are biased to the rear by pulling springs 419, 429, respectively.

A pinion 414 is mounted on the lower side of the block 412 so as to be free to rotate. A movable rack 424 extending in parallel with the movable shaft 420 is secured to the upper side of the block 422 and is in mesh with the pinion 414. A stationary rack 434 is secured at both its ends to the frame 391 on the side opposite the movable rack 424. The stationary rack 434 also is disposed in parallel with the movable shaft 410. The pinion 414 is in mesh with the stationary rack 434.

A traverse servomotor 430 is attached to the rearward portion of the frame 391. A belt wheel 432 is secured to the rotary shaft of the servomotor 430. A belt wheel 433 is provided on the forward end of the frame 391. A belt 431 is engaged with the belt wheels 432 and 433. The belt 431 is fixed at its intermediate portion to the block 422 by a fixing member 435.

Rotatively driving the servomotor 430 moves the block 422, namely the movable shaft 420, in the longitudinal direction thereof via the belt wheels 432, 433 and belt 431. Since the movable rack 424 secured to the block 422 meshes with the pinion 414 and the pinion 414 is provided on the block 412 and in mesh with the stationary rack 434, the pinion 414 moves along the stationary rack 434. Accordingly, the movable shaft 410 moves longitudinally thereof. The amount of movement of movable shaft 410 is half the amount of movement of movable shaft 420.

A guide sheave 415 is provided immediately beneath the distal end of the movable shaft 410 by a mounting member 416 so as to be free to rotate. A traverse sheave 428 is provided on the distal end of the movable shaft 420 so as to be free to rotate. The traverse sheave 428 has a shaft in alignment with the axis of the movable shaft 420. As will be described later, the winding direction sensor 440 is provided on the distal end of the movable shaft 420. The shaft of the traverse sheave 428 is attached to the sensor 440. A guide sheave 425 is freely rotatably provided in the vicinity of the distal end of movable shaft 420 by a mounting member 426 in a manner inclined to one side. Bellows 417, 427 are provided between the distal end of movable shaft 410 and the holding cylinder 411 and between the distal end of movable shaft 420 and the holding cylinder 421, respectively, whereby the movable shafts 410, 420 and the bearings within the holding cylinders 411, 421 are protected.

The saw wire 114 paid out from the delivery bobbin 540 is engaged with the sheave 380 via the traverse sheave 428 and guide sheave 425 of the movable shaft 420 and the guide sheave 415 of the movable shaft 410 and is supplied to the above-mentioned distance measuring unit 370. In intermittent two-way travel of the saw wire 114, while the saw wire 114 is paid out from the delivery bobbin 540 or the saw wire 114 is taken up by the delivery bobbin 540, the movable shaft 420 is advanced or retracted in dependence upon the pay-out position or take-up position of the wire from the delivery bobbin 540, whereby the traverse sheave 428 always arrives directly above the wire pay-out position or take-up position.

Figure 36:
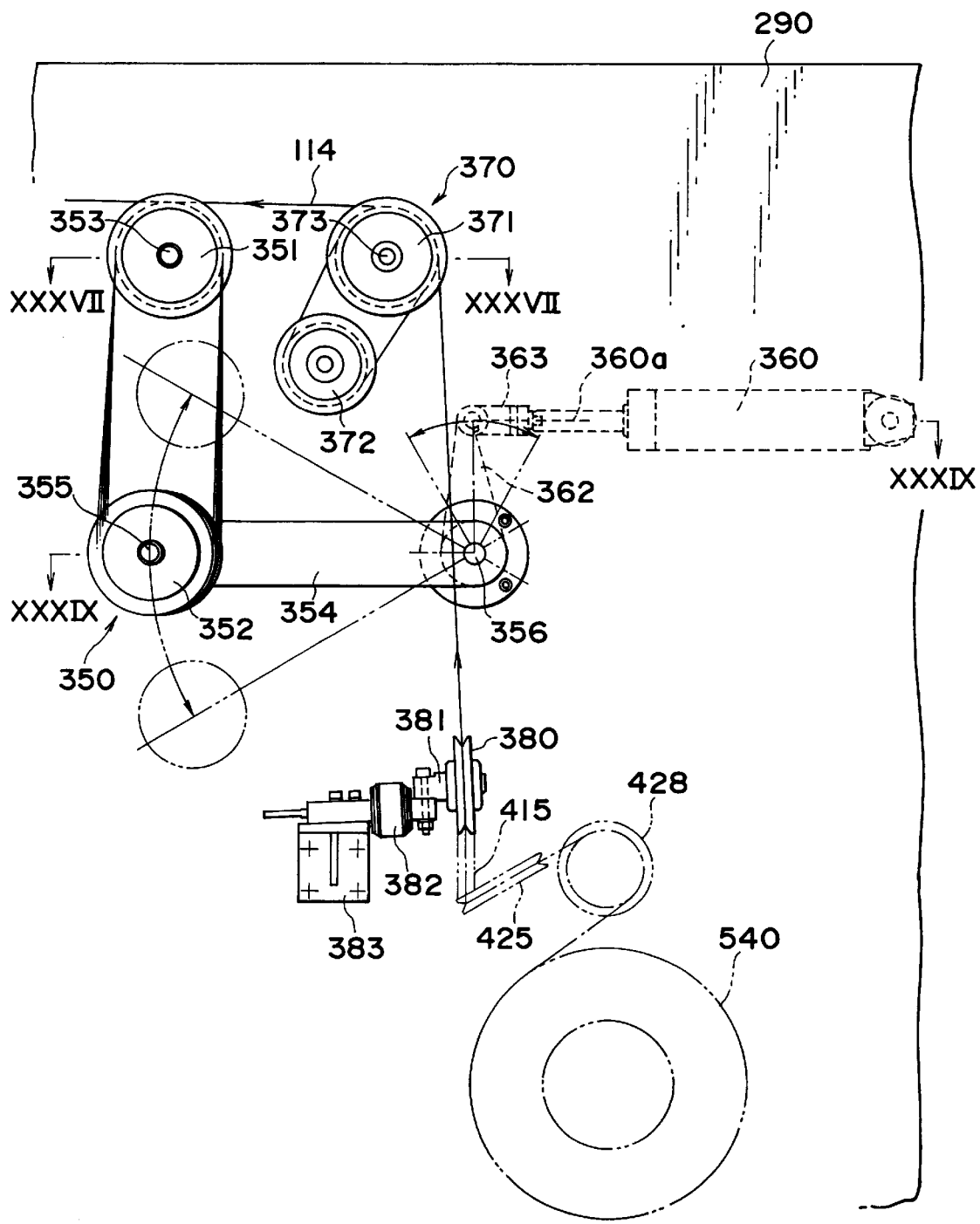
Figure 37:
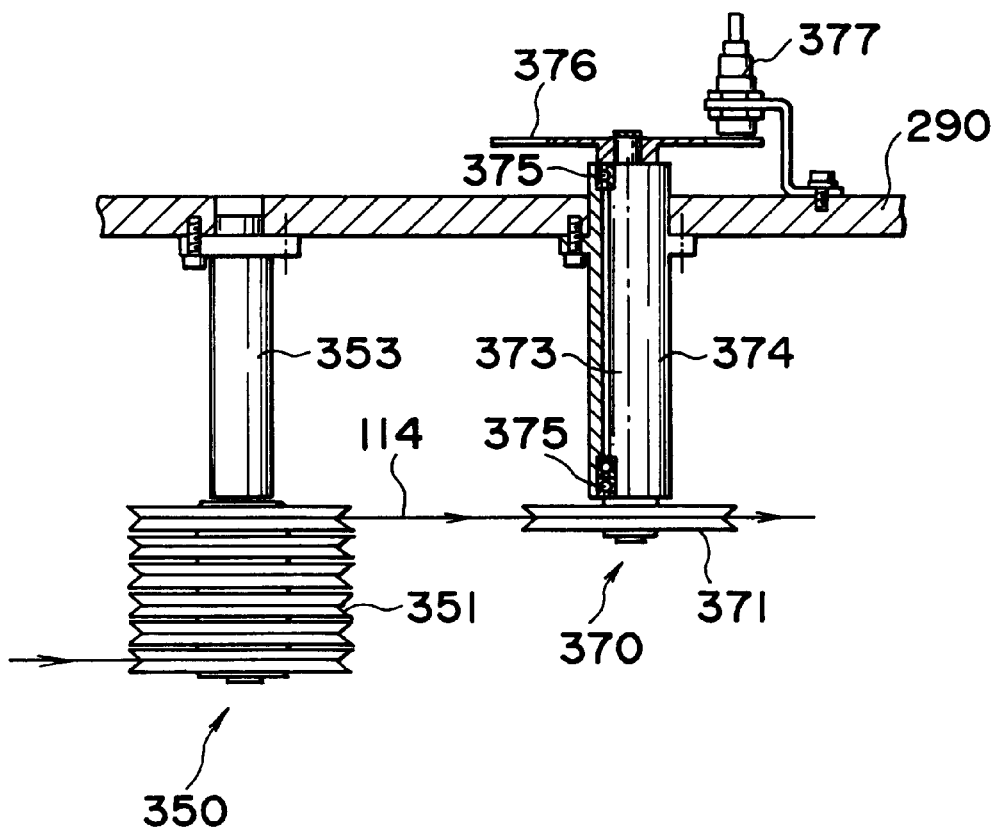
Figure 38:
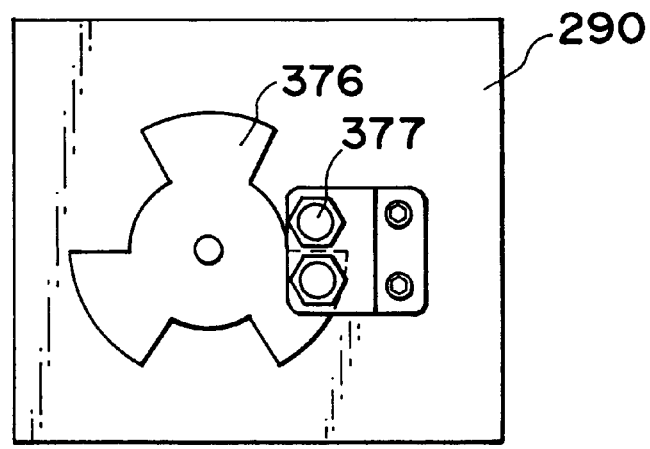
Figure 39:
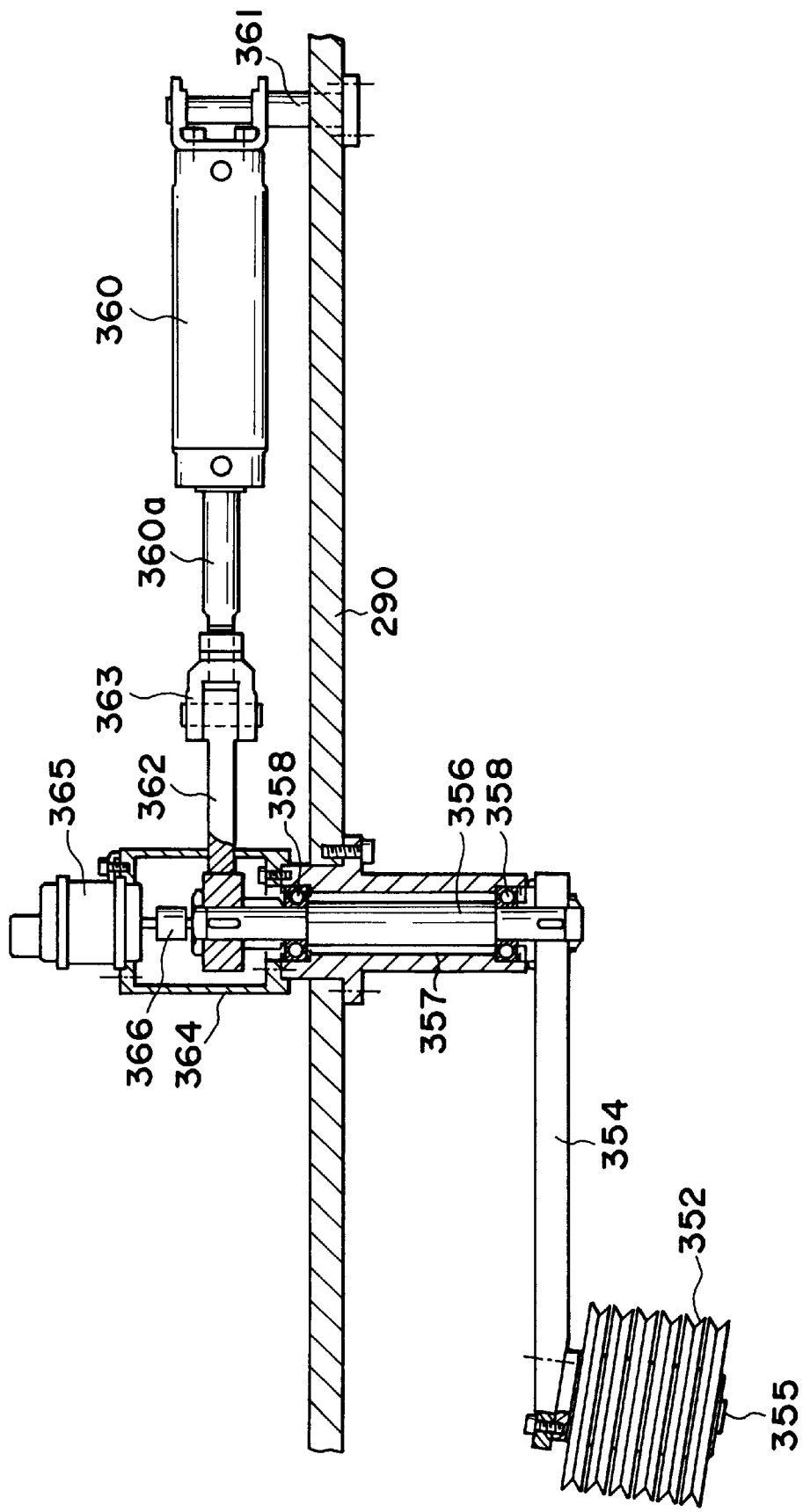

As shown in FIG. 36, the sheave 380 has a shaft 381 that is attached to the tension sensor 382 which includes the load sensor. The tension sensor 382 is secured to the frame by a mounting member 383 and senses the tension that acts upon the sheave 380. The sensed tension is used for display purposes.

In regard to the traverse mechanism 500 on the take-up side, FIG. 40 illustrates movable shafts 510, 520, guide shafts 513, 523, a guide sheave 515 and its mounting member 516, a guide sheave 525 and its mounting member 526, and a traverse sheave 528.

The saw wire 114 fed in through the sheave 340 of the take-up mechanism is engaged with the traverse sheave 528 via the guide sheaves 515, 525 and is taken up by the take-up bobbin 550. In intermittent two-way travel of the saw wire 114, with the taking up of the saw wire 114 by the take-up bobbin 550 or the paying out of the saw wire 114 from the take-up bobbin 550, the movable shaft 520 is advanced or retracted, whereby the traverse sheave 528 always arrives directly above the wire take-up position or pay-out position.

On the take-up side the take-up of the saw wire on the take-up bobbin 550 starts from one end (which is decided in advance) of the take-up bobbin 550. Further, the take-up of the wire is performed under the control of the traverse controller 493 on the take up side. As a result, take-up is performed accurately and the take-up state can be ascertained. The saw wire is wound upon the delivery bobbin 540 at the saw wire factory. Accordingly, whether the wire has been wound precisely in unknown. In addition, it is not known where the end of the wire is located on the delivery bobbin 540 or on which end of the bobbin the wire is located. For this reason traverse control in the traverse mechanism 400 on the delivery side and traverse control in the traverse mechanism on the take-up side are carried in different ways.

Figure 45:
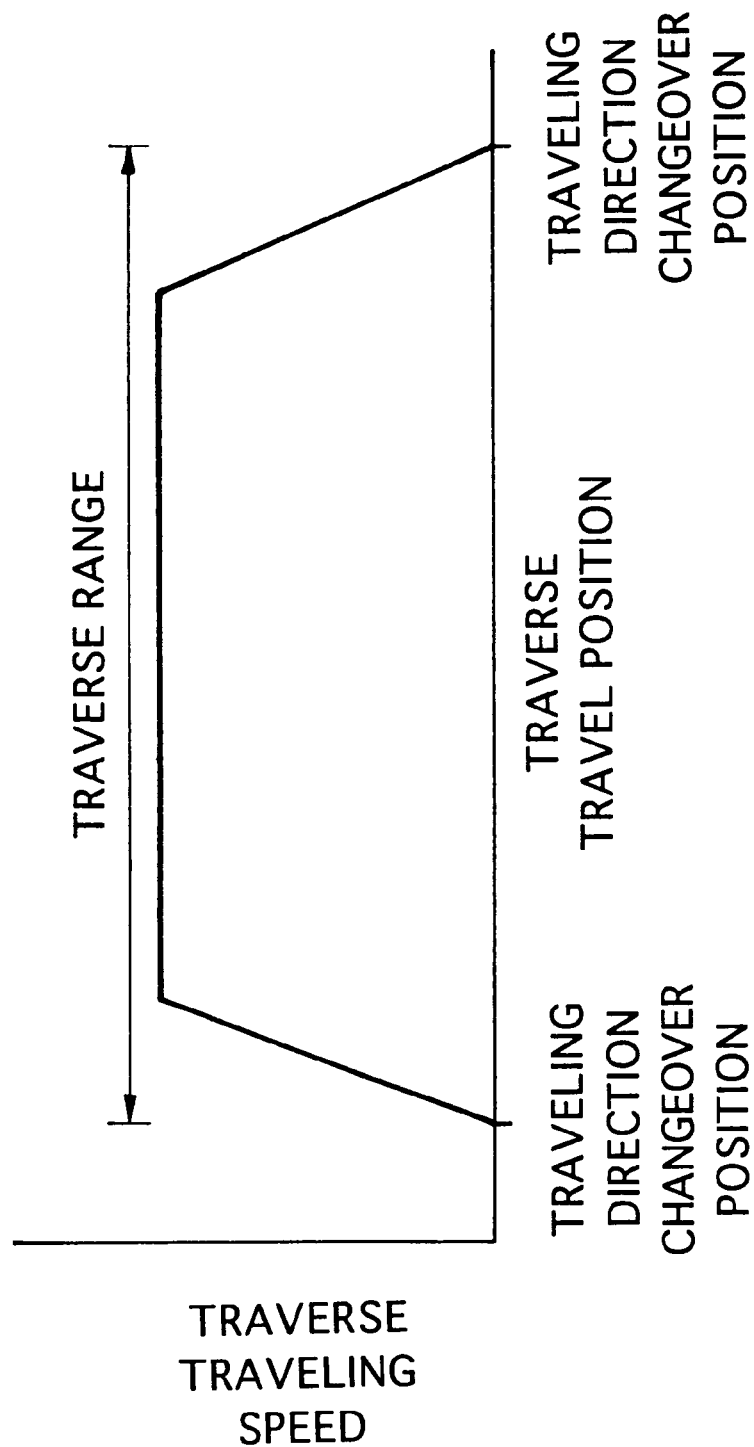

Traverse control on the take-up side will now be described. The motor 530 for traverse drive is a servomotor. Control of rotation of the servomotor can be carried out by deciding a control pattern in advance. FIG. 45 illustrates a traverse traveling speed pattern used when the traverse sheave 528 on the take-up side is subjected to positioning control. The traveling direction of the traverse sheave 528 is changed over at positions corresponding to both ends of the take-up bobbin 550. The traverse traveling speed also is changed in dependence upon the amount of wire wound upon the take-up bobbin 550. By setting the traverse traveling speed pattern in the traverse controller 493 in advance, speed control of the motor 530 can be performed in accordance with the pattern. This is because it has been decided that winding of the saw wire should start from one end of the take-up bobbin 550. A further reason is that by performing take-up in accordance with the above-mentioned speed pattern, the state of wire take-up should also be in accordance with the speed pattern. As a result, it is unnecessary to provide sensors for sensing that the traverse sheave 528 has reached the positions at both ends. This makes it possible to prevent overrun which tends to occur when position sensors are provided and the traveling direction is switched based upon detection signals from the position sensors. The traverse range can be controlled so as to be constant at all times. Furthermore, the range over which speed is capable of being varied is broadened and it is possible to realize a fine winding pitch by using a servomotor.

Delivery of wire from the take-up bobbin 550 also is carried out in intermittent two-way travel of the saw wire. In delivery of the wire, control may be performed by following the speed pattern of FIG. 45 in the opposite direction starting from the position at which the changeover is made from take-up to delivery.

Traverse control on the delivery side will now be described.

If the delivery bobbin is exclusively for paying out wire, a traverse mechanism is not always necessary on the delivery side. Since the saw wire travels intermittently in two directions in this embodiment, as described above, the wire is wound upon the delivery bobbin 540 as well.

The traverse controller 491 cannot verify whether the wound state of the saw wire in the delivery bobbin manufactured at a factory or the like is acceptable or not. Further, at which position on the delivery bobbin the end of the saw wire is located in not known. This makes it necessary to start up the machine upon confirming the winding direction of the wire when a delivery bobbin has been newly installed. The winding direction sensor 440 is provided to sense the winding direction.

Figure 46:
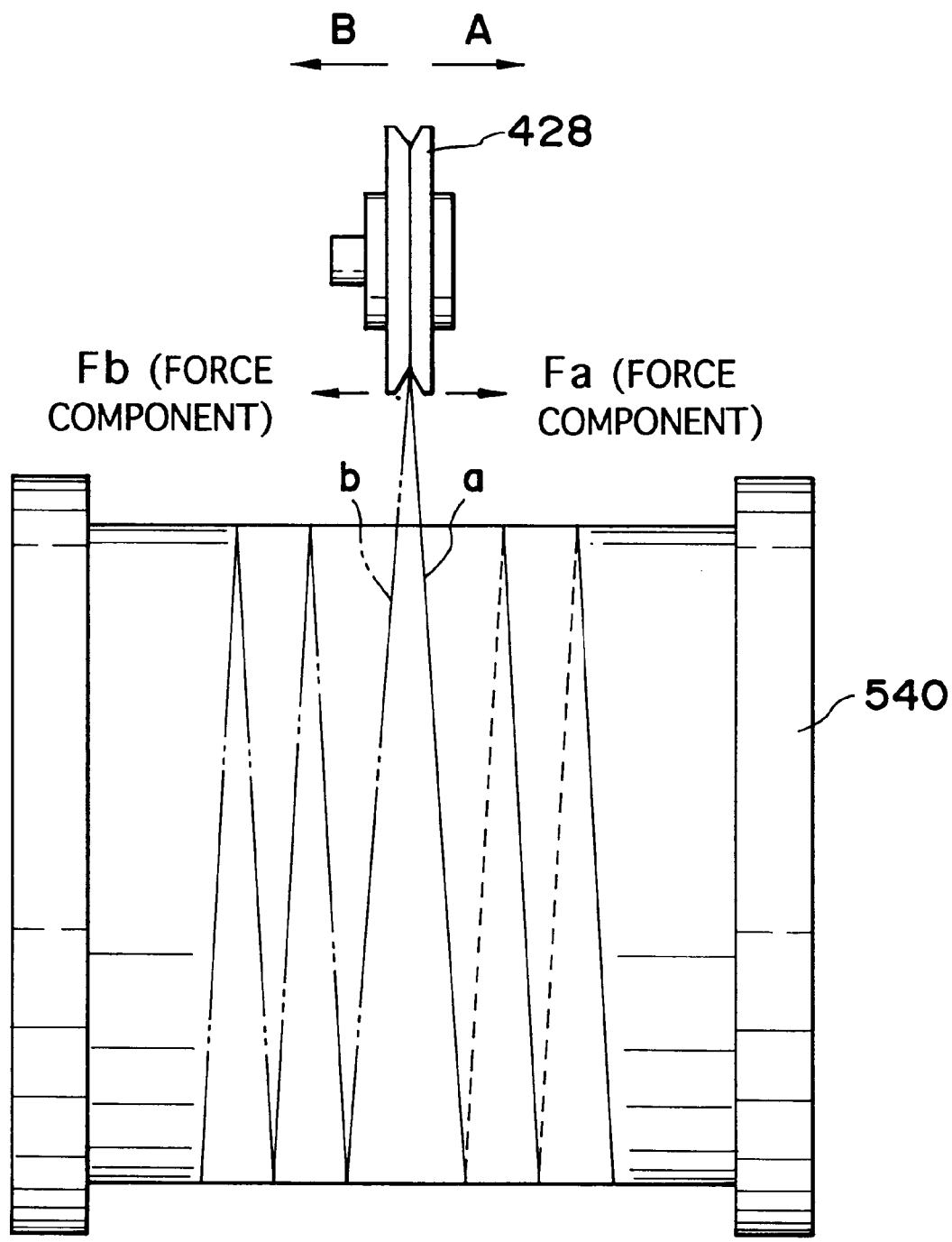

There are two winding directions, as shown in FIG. 46. Depending upon the winding direction of the saw wire, a component force Fa or Fb of wire tension acts upon the traverse sheave 428 when the saw wire is paid off from the delivery bobbin 540. The winding direction sensor 440 senses the force component. If the winding direction is a, the force component Fa acts upon the sheave 428, at which time the sheave 428 is moved in the direction of arrow A. If the winding direction is b, the force component Fb acts upon the sheave 428, in which case the sheave 428 is moved in the direction of arrow B. The driver controller 491 automatically judges the winding direction of the saw wire in the bobbin 540, decides the direction of movement of the sheave 428 and starts traverse control.

The detection of winding direction and traverse control based upon detection can be carried out not only when a new delivery bobbin is installed but also when wire traveling direction is changed over in intermittent two-way travel or under other conditions as well. For example, the winding direction detection signal from the winding direction sensor 440 is constantly acquired by the traverse controller 491 so that the winding direction is monitored at all times. The direction of movement of the traverse sheave 428 is corrected in conformity with the sensed winding direction when agreement between the sensed winding direction and the direction of movement of the traverse sheave 428 is lost.

Figure 47:
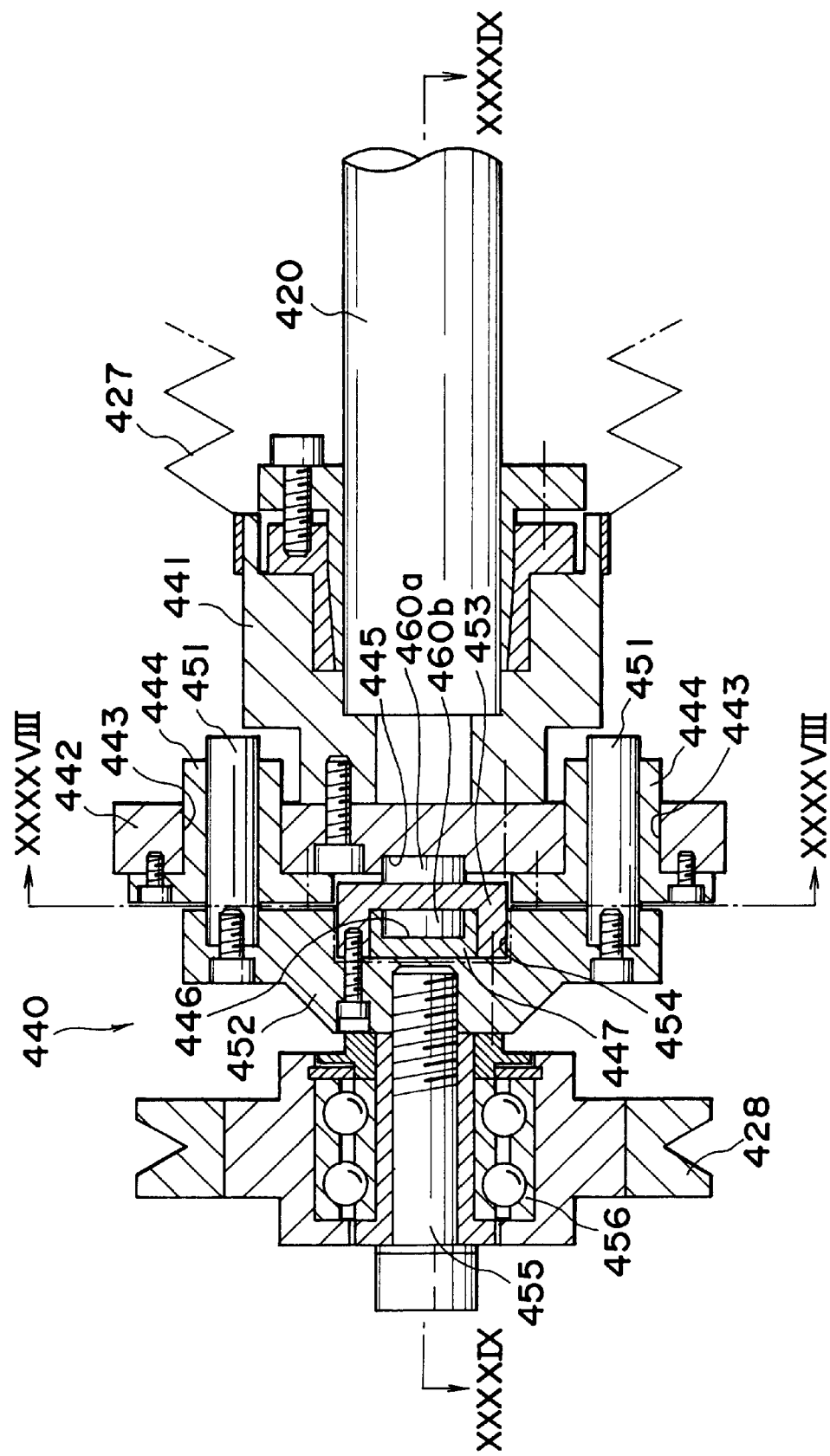
Figure 48:
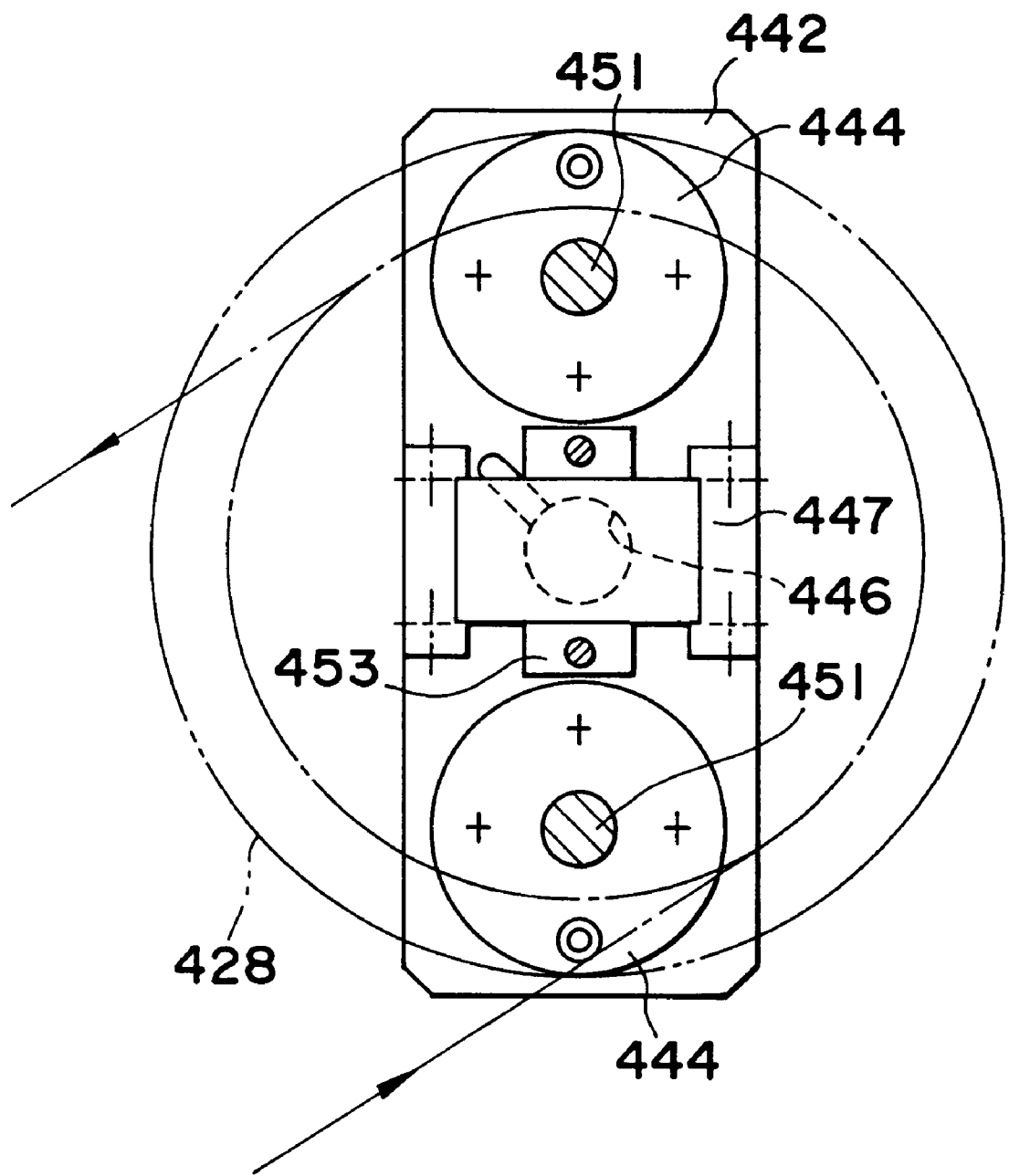
Figure 49:
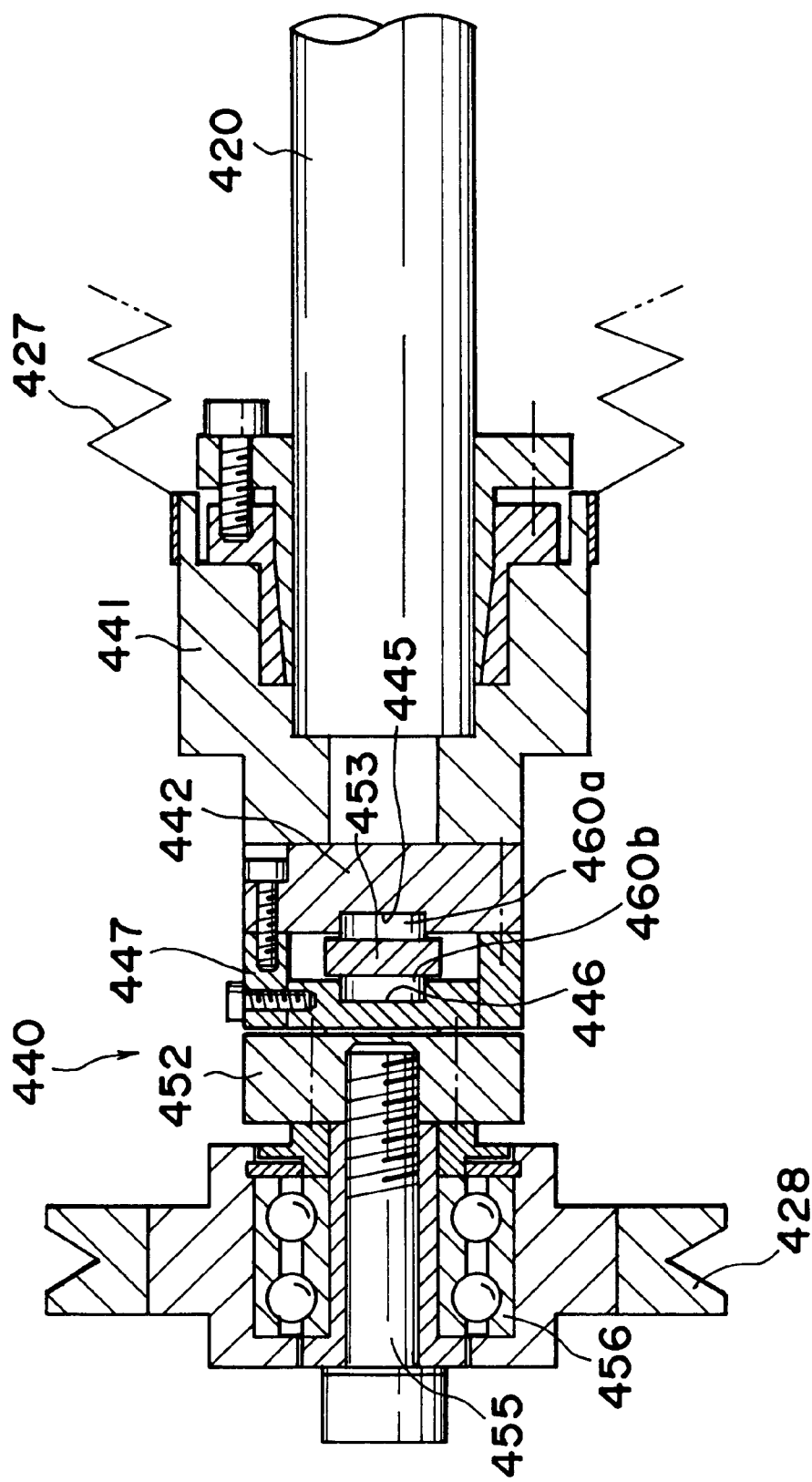
Figure 50:
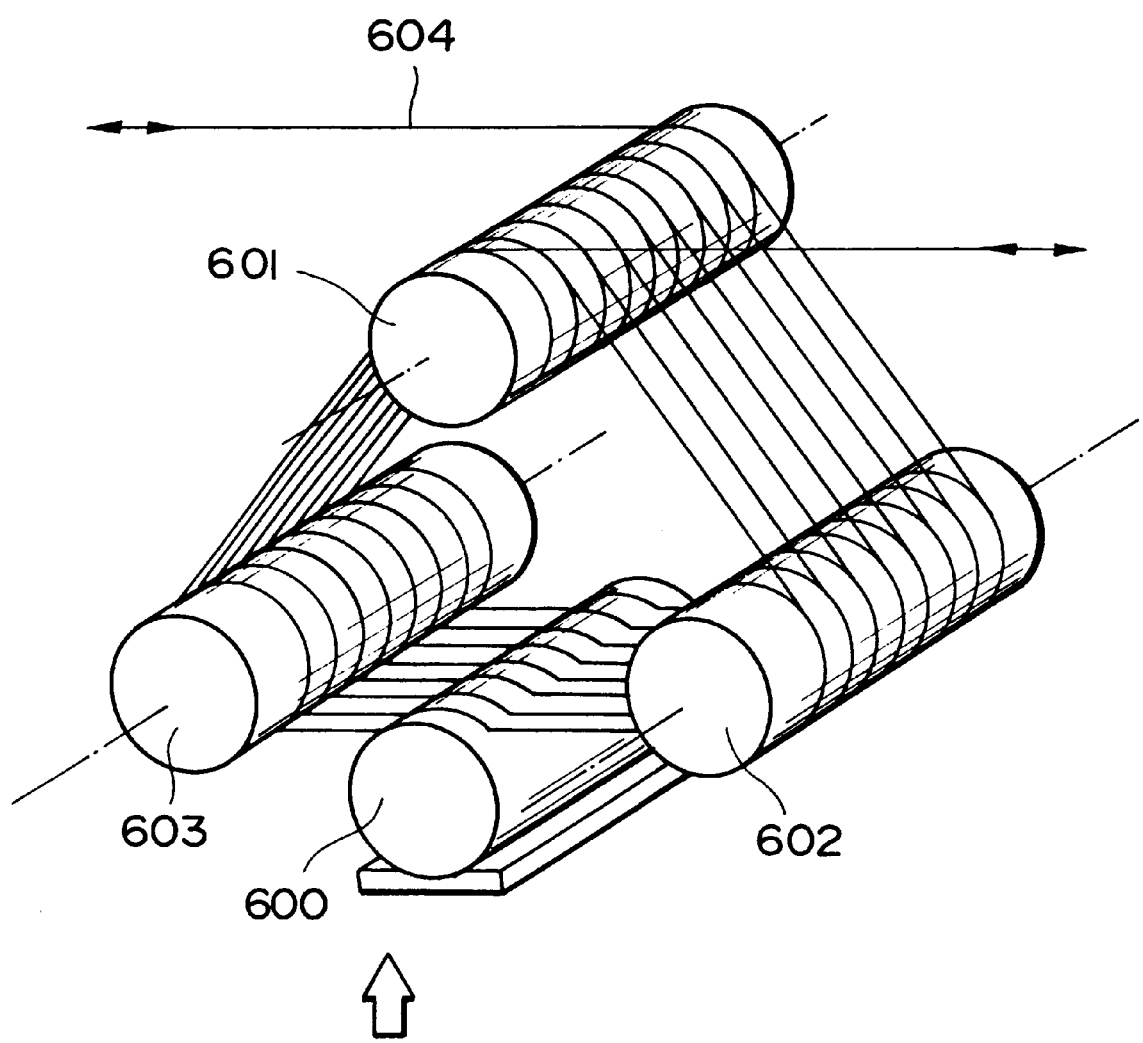
FIG. 50 is a perspective view, illustrative of the prior art, showing the arrangement of grooved rollers and the traveling direction of a workpiece.
Figure 51:
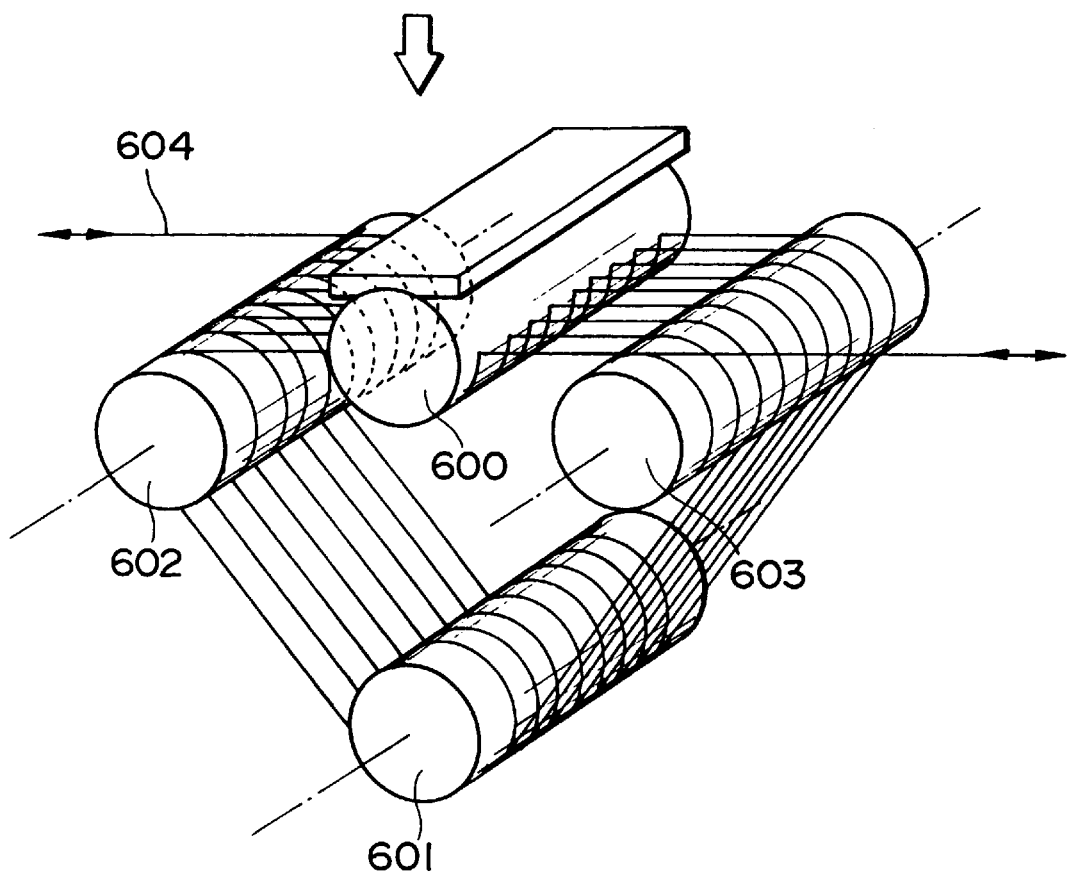
FIG. 51 is a perspective view, illustrative of another example of the prior art, showing the arrangement of grooved rollers and the traveling direction of a workpiece.

The details of construction of the winding direction sensor will be described with reference to FIGS. 47 through 49.

A boss 441 is fixedly secured to the distal end of the movable shaft 420. An elongated, approximately rectangular backing plate 442 is secured to the forward end face of the boss 441 by bolts. The backing plate 442 is provided with two holes 443 into which receiving cylinders 444 each having a flange are inserted. The receiving cylinders are secured to the backing plate 442 by bolts. A circular recess 445 is formed at the center of the front side of the backing plate 442. The recess 445 accommodates a load cell 460a.

A shaft 455 is erected on the raised central portion of a generally rectangular supporting plate 452. The traverse sheave 428 is provided on the shaft 455 via a bearing 456 so as to be free to rotate. Shafts 451 extending in a direction opposite that of the shaft 455 are secured to both ends of the supporting plate 452 by bolts. The shafts 451 are inserted in the receiving cylinders 444 so as to be free to slide. Furthermore, the central portion of the supporting plate 452 is formed to have a depression 454 in the side facing the backing plate 442.

Two C-shaped (angular) holding members 447 and 453 are provided. One holding member 447 is constructed by bolting together three pieces and the other holding member 453 is formed as a unitary body. The two holding members 447 and 453 are combined so as to face and embrace each other in a perpendicularly intersecting state. The holding member 447 is formed to have a circular recess 446 in which a load cell 460b is accommodated. The load cell 460b is embraced by the two holding members 447 and 453.

The combination of the holding members 447 and 453 is received in the depression 454 of the supporting plate 452. The back face of the holding member 453 is in contact with the load cell 460a. The holding member 447 is secured to the backing plate 442 by bolts, and the other holding member 453 is secured to the supporting plate 452 by bolts.

In the arrangement described above, an axially directed component force which acts upon the traverse sheave 428 has its direction and magnitude sensed by the two load cells 460a and 460b. Output signals from the load cells 460a and 460b are applied to a differential circuit, whereby the difference between these outputs is calculated. When the component force Fa acts, the load cell 460a is pressed by the holding member 453, as a result of which the force is sensed mainly by the load cell 460a. When the component force Fb acts, a force is applied to the load cell 460b by the holding member 447. As a result, the load cell 460b generates a large detection signal.

We claim:

1. A wire-type slicing machine for slicing a workpiece by engaging a cutting wire with at least three grooved rolls arranged in parallel, causing the cutting wire to travel by rotatively driving at least one of the grooved rolls and supplying a working fluid containing an abrasive, characterized in that:

a first and second grooved rolls are arranged one above the other in such a manner that the cutting wire travels substantially vertically between these grooved rolls;

a third grooved roll is placed at a height substantially the same as that of the lower second grooved roll of said first and second grooved rolls arranged one above the other; and a workpiece feeding apparatus is provided for advancing and withdrawing the workpiece substantially horizontally toward and away from the cutting wire which travels substantially vertically.

2. The wire-type slicing machine according to claim 1, wherein said third grooved roll is a driving roll driven by a motor, and rotating power of said driving roll is transmitted to said two grooved rolls via a power transmission mechanism.

3. The wire-type slicing machine according to claim 2, wherein said power transmission mechanism includes belt wheels provided in correspondence with respective ones of said two grooved rolls arranged one above the other and said third grooved roll, and a belt engaged with these belt wheels.

4. The wire-type slicing machine according to claim 3, wherein couplings, having torques capable of being controlled are provided between shafts of said two grooved rolls arranged one above the other and the belt wheels provided in correspondence with these grooved rolls, and the belt wheel provided in correspondence with said third grooved roll is secured to a shaft of said third grooved roll.

5. The wire-type slicing machine according to claim 1, further comprising:

a motor for rotatively driving said third grooved roll;

a power transmission mechanism, which has output shafts corresponding to the said two grooved rolls, for transmitting rotating power of said motor to said output shafts; and torque-controllable couplings provided between the shafts of the said two grooved rolls and said output shafts corresponding thereto.

6. The wire-type slicing machine according to any one of claim 1, wherein said two upper and lower grooved rolls and said third grooved roll are supported on a frame so as to be free to rotate, and the frame is freely removably attached to a base of the wire-type slicing machine.

7. The wire-type slicing machine according to claim 6, wherein an output shaft of a drive device provided in the wire-type slicing machine and the shaft of at least one of said grooved rolls are coupled by a freely attachable and detachable shaft coupling.

8. The wire-type slicing machine according to any one of claims 1, wherein a wire delivery mechanism which feeds the cutting wire into said grooved rolls and a wire take-up mechanism which takes up the cutting wire from said grooved rolls are both disposed on one side of said grooved rolls.

9. The wire-type slicing machine according to claim 1, wherein a wire guide, having a groove through which the cutting wire is passed, is provided between two grooved rolls arranged one above the other, among said three grooved rolls and a path along which the workpiece is transported.

10. The wire-type slicing machine according to claim 9, wherein a nozzle which supplies the cutting wire with the working fluid is arranged between said wire guide and the path along which the workpiece is transported.

11. The wire-type slicing machine according to claim 1, characterized in that a wire delivery mechanism which feeds the cutting wire into said grooved rolls and a wire take-up mechanism which takes up the cutting wire from said grooved rolls are provided, at least one of said wire delivery mechanism or wire take-up mechanism being provided with a dancer mechanism for adjusting tension of the cutting wire; and said dancer mechanism includes a freely rotatable stationary roll and a movable roll free to move up and down, the cutting wire extends between and is engaged with both of these rolls and said movable roll is supported by a continuously positionally adjustable mechanism.

12. The wire-type slicing machine according to claim 11, wherein said continuously positionally adjustable mechanism includes an air cylinder.

13. The wire-type slicing machine according to claim 1, further comprising a wire delivery mechanism for supplying the cutting wire to said grooved rolls, and a wire take-up mechanism which includes a bobbin for taking up the cutting wire from said grooved rolls, wherein only said wire take-up mechanism is provided with a capstan mechanism and wire tension on the side of said take-up bobbin is adjusted by said capstan mechanism so as to be less than wire tension on the side of said grooved rolls.

14. The wire-type slicing machine according to claim 1, wherein said workpiece feeding apparatus is provided with a workpiece holder, the workpiece holder includes a supporting body, a first rotary body and a second rotary body, said supporting body supports said first rotary body so as to be free to rotate about a first axis, said first rotary body supports said second rotary body so as to be free to rotate about a second axis perpendicular to said first axis, and the workpiece is mounted on said second rotary body.

15. The wire-type slicing machine according to claim 1, wherein there are provided a wire delivery mechanism which feeds the cutting wire into said grooved rolls and a wire take-up mechanism which takes up the cutting wire from said grooved rolls, said wire delivery mechanism includes a traverse mechanism, the traverse mechanism includes a movable body free to move parallel to a shaft of a wire delivery bobbin, a distal end portion of the movable body is provided with a winding direction sensor, and the winding direction sensor has:

a pad member provided on the distal end of the movable body;

a supporting body held on said pad member so as to be free to slide axially of the delivery bobbin;

a traverse sheave freely rotatably provided on the supporting body by a shaft parallel to the shaft of the delivery bobbin; and a sensor provided between said pad member and the supporting body for sensing a component force in the axial direction of the delivery bobbin that acts upon the cutting wire delivered from the delivery bobbin and engaged with the traverse sheave.

16. The wire-type slicing machine according to claim 1, wherein there are provided a wire delivery mechanism which feeds the cutting wire into said grooved rolls and a wire take-up mechanism which takes up the cutting wire from said grooved rolls, said wire take-up mechanism includes a traverse mechanism, and the traverse mechanism:

includes a movable body free to move parallel to a shaft of a wire take-up bobbin;

a traverse sheave provided on a distal end portion of the movable body; and a motor for driving movement of said movable body;

wherein said motor is a servomotor and is controlled in accordance with a predetermined traverse traveling speed and amount of movement.

17. A wire-type slicing machine for slicing a workpiece by engaging a cutting wire with a plurality of grooved rolls arranged in parallel, causing the cutting wire to travel by rotatively driving at least one of the grooved rolls and supplying a working fluid containing an abrasive, characterized in that:

three grooved rolls are provided and said grooves rolls are disposed at positions which substantially correspond to the vertices of a right triangle having a vertical side and a horizontal side.

18. The wire-type slicing machine according to claim 17, wherein said plurality of grooved rolls are provided on a frame so as to be free to rotate, and the frame is freely removably attached to a base of the wire-type slicing machine.

19. The wire-type slicing machine according to claim 17, wherein there is provided a workpiece feeding apparatus for advancing and withdrawing the workpiece substantially horizontally toward and away from the cutting wire that is engaged with two grooved rolls, arranged one above the other, among said three grooved rolls, and that travels substantially vertically.

20. A grooved roll unit used in a wire-type slicing machine for slicing a workpiece by engaging a cutting wire with a plurality of grooved rolls arranged in parallel, causing the cutting wire to travel by rotatively driving at least one of the grooved rolls and supplying a working fluid containing an abrasive, wherein:

said plurality of grooved rolls are provided on a frame so as to be free to rotate, and the frame is freely removably attached to a base of the wire-type slicing machine.

21. The grooved roll unit according to claim 20, wherein three grooved rolls are provided and said grooves rolls are disposed at positions which substantially correspond to the vertices of a right triangle having a vertical side and a horizontal side.

22. The grooved roll unit according to claim 21, wherein sides of the frame with the exception of a side through which the workpiece is advanced and withdrawn are provided with a cover, and a bottom side of the cover between the two lower grooved rolls is formed to have a receptacle for receiving cutting scraps.

23. The grooved roll unit according to any one of claim 20, wherein annular resilient seals are provided on the frame so as to surround the shafts of the grooved rolls that project from said frame.

24. A wire-type slicing method for slicing a workpiece by engaging a cutting wire with at least three grooved rolls arranged in parallel, causing the cutting wire to travel by rotatively driving at least one of the grooved rolls and supplying a working fluid containing an abrasive, characterized by:

arranging a first and second grooved rolls one above the other whereby the cutting wire is made to travel substantially vertically between these grooved rolls;

placing a third grooved roll at a height substantially the same as that of the lower second grooved roll of said first and second grooved rolls arranged one above the other; and advancing and withdrawing the workpiece substantially horizontally toward and away from the cutting wire which travels substantially vertically.

25. The wire-type slicing method according to claim 24 further including feeding the cutting wire into said grooved rolls from one side of said grooved rolls and taking up the cutting wire by pulling the cutting wire to said one side from said grooved rolls.

26. A wire-type slicing machine for slicing a workpiece by engaging a cutting wire with at least two grooved rolls arranged in parallel, causing the cutting wire to travel by rotatively driving at least one of the grooved rolls and supplying a working fluid containing an abrasive, characterized in that:

a wire guide is provided in close proximity to and along side of at least one of the grooved rolls, and is formed, to have a groove through which the cutting wire is passed.

27. The wire-type slicing machine according to claim 26, wherein said wire guide is disposed at a position between a workpiece transport path and at least one grooved roll, said position lying along the traveling direction of the cutting wire upstream relative to the workpiece transport path.

28. A wire-type slicing machine having a grooved roll group which includes a plurality of grooved rolls arranged in parallel and engaged by a cutting wire, a wire delivery mechanism for supplying the cutting wire to said grooved roll group, and a wire take-up mechanism for taking up the cutting wire from said grooved roll group, characterized in that:

at least one of said wire delivery mechanism or wire take-up mechanism is provided with a dancer mechanism for adjusting the tension of the cutting wire; and said dancer mechanism includes a freely rotatable stationary roll and a movable roll free to move up and down, the cutting wire extends between and is engaged with both of these rolls and said movable roll is supported by a continuously positionally adjustable mechanism.

29. The wire-type slicing machine according to claim 28, wherein one shaft of a shaft of the stationary roll and a shaft of the movable roll in said dancer mechanism or one shaft of shafts of the two rolls in said capstan mechanism is skewed with respect to the other in such a manner that turns of the cutting wire extending between and engaged with the two rolls a plurality of times are rendered parallel.

30. A wire-type slicing machine having a grooved roll group which includes a plurality of grooved rolls arranged in parallel and engaged by a cutting wire, a wire delivery mechanism for supplying the cutting wire to said grooved roll group, and a wire take-up mechanism which includes a take-up bobbin for taking up the cutting wire from said grooved roll group, characterized in that:

only said wire take-up mechanism is provided with a capstan mechanism and wire tension on the side of said take-up bobbin is adjusted by said capstan mechanism so as to be less than wire tension on a side of said grooved rolls.

31. The wire-type slicing machine according to claim 28, wherein said capstan mechanism has at least two rolls, the cutting wire being engaged with these rolls.

32. The wire-type slicing machine according to claim 30, in which the cutting wire is capable of traveling back and forth, the machine having a device for driving at least one of the said two rolls in a direction in which said cutting wire is pulled from said grooved roll group toward said wire take-up mechanism at forward travel in which said cutting wire is fed from said wire delivery mechanism to said wire take-up mechanism via said grooved roll group, and a device for braking rotation of at least one of the said two rolls at travel which is the reverse of said forward travel.

33. A workpiece holder used in a wire-type slicing machine for slicing a workpiece by engaging a cutting wire with a plurality of grooved rolls arranged in parallel, causing the cutting wire to travel by rotatively driving at least one of the grooved rolls, advancing the workpiece with respect to the traveling cutting wire and supplying a working fluid containing an abrasive, the holding device comprising:

a supporting body, a first rotary body and a second rotary body, said supporting body having a portion supporting said first rotary body so that said first rotary body is free to rotate about a first axis, said first rotary body having a portion supporting said second rotary body so that said second rotary body is free to rotate about a second axis which is perpendicular to and intersects said first rotary axis, and said second rotary body having a portion supporting the workpiece.

34. An apparatus, which is provided in a traverse mechanism that includes a movable body free to move parallel to a shaft of a wire delivery bobbin, for sensing winding direction of a wire fed from the delivery bobbin, comprising:

a pad member provided on the distal end of the movable body;

a supporting body held on said pad member so as to be free to slide axially of the delivery bobbin;

a traverse sheave freely rotatably provided on the supporting body by a shaft parallel to the shaft of the delivery bobbin; and a sensor provided between said pad member and the supporting body for sensing a component force in the axial direction of the delivery bobbin that acts upon the cutting wire delivered from the delivery bobbin and engaged with the traverse sheave.

* * * * *